(12) United States Patent
Greenwood et al.

(10) Patent No.: US 11,318,869 B2
(45) Date of Patent: May 3, 2022

(54) SINGLE PIECE PLENUM

(71) Applicant: GENTHERM INCORPORATED, Northville, MI (US)

(72) Inventors: Shane Kyle Greenwood, Northville, MI (US); Ajay Murgod, Novi, MI (US); Chad Vincent Pacilli, Windsor (CA); Denis Michel Miron, Windsor (CA); Tim Normand, LaSalle (CA); Vladimir Jovovic, Pasadena, CA (US)

(73) Assignee: GENTHERM INCORPORATED, Northville, MI (US)

( * ) Notice: Subject to any disclaimer, the term of this patent is extended or adjusted under 35 U.S.C. 154(b) by 0 days.

(21) Appl. No.: 17/243,736

(22) Filed: Apr. 29, 2021

(65) Prior Publication Data

US 2021/0300218 A1 Sep. 30, 2021

Related U.S. Application Data

(63) Continuation of application No. PCT/US2020/016349, filed on Feb. 3, 2020, and a continuation of application No. PCT/US2019/063919, filed on Dec. 2, 2019, and a continuation of application No. PCT/US2019/063918, filed on Dec. 2, 2019.
(Continued)

(51) Int. Cl.
*B60N 2/56* (2006.01)
*B60N 2/06* (2006.01)

(52) U.S. Cl.
CPC ......... *B60N 2/5642* (2013.01); *B60N 2/5657* (2013.01)

(58) Field of Classification Search
CPC .... B60N 2/5642; B60N 2/565; B60N 2/5657; B60N 2/5664
See application file for complete search history.

(56) References Cited

U.S. PATENT DOCUMENTS

| 4,923,248 A | 5/1990 | Feher |
| 5,176,424 A | 1/1993 | Tobita et al. |
(Continued)

FOREIGN PATENT DOCUMENTS

| CN | 201610114709 A | 5/2016 |
| EP | 0805064 A2 | 11/1997 |
(Continued)

OTHER PUBLICATIONS

International Search Report and Written Opinion for International Application for PCT/US2019/063919, dated Feb. 21, 2020.
(Continued)

*Primary Examiner* — Shin H Kim
(74) *Attorney, Agent, or Firm* — The Dobrusin Law Firm, P.C.

(57) ABSTRACT

An air distribution system that includes a plenum, which has a bottom wall, a peripheral wall connected to the bottom wall and extending around a periphery of the plenum to define one or more open spaces in the plenum, and one or more connection recesses in the bottom wall adapted to connect to a blower. A top surface of the peripheral wall is configured to contact a bottom surface of a cushion of a vehicle seat to enclose the one or more open spaces.

14 Claims, 21 Drawing Sheets

Related U.S. Application Data

(60) Provisional application No. 62/802,793, filed on Feb. 8, 2019, provisional application No. 62/776,155, filed on Dec. 6, 2018, provisional application No. 62/776,157, filed on Dec. 6, 2018.

(56) References Cited

U.S. PATENT DOCUMENTS

| | | | |
|---|---|---|---|
| 5,626,386 A | 5/1997 | Lush | |
| 6,064,037 A | 5/2000 | Weiss et al. | |
| 6,291,803 B1 | 9/2001 | Fourrey | |
| 6,546,578 B1 | 4/2003 | Steimmeier | |
| RE38,128 E | 6/2003 | Gallup et al. | |
| 6,626,488 B2 | 9/2003 | Pfahler | |
| 6,629,724 B2* | 10/2003 | Ekern | B60N 2/5635 297/452.47 |
| 6,676,207 B2 | 1/2004 | Rauh et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,976,734 B2 | 12/2005 | Stoewe | |
| 7,083,227 B2* | 8/2006 | Brennan | A47C 7/74 297/452.42 |
| 7,111,713 B2* | 9/2006 | Tamada | F16F 7/00 188/371 |
| 7,213,876 B2 | 5/2007 | Stoewe | |
| 7,322,643 B2 | 1/2008 | Ishima et al. | |
| 7,338,117 B2* | 3/2008 | Iqbal | A47C 7/72 297/180.12 |
| 7,356,912 B2 | 4/2008 | Iqbal et al. | |
| 7,452,028 B2 | 11/2008 | Knoll et al. | |
| 7,475,938 B2* | 1/2009 | Stoewe | B60N 2/5657 297/180.13 |
| 7,478,869 B2 | 1/2009 | Lazanja et al. | |
| 7,506,938 B2 | 3/2009 | Brennan et al. | |
| 7,587,901 B2* | 9/2009 | Petrovski | B60N 2/5657 62/3.61 |
| 7,607,339 B2 | 10/2009 | Nakae et al. | |
| 7,971,931 B2 | 7/2011 | Lazanja et al. | |
| 2004/0195064 A1* | 10/2004 | Tamada | B60R 19/18 188/371 |
| 2005/0173950 A1* | 8/2005 | Bajic | A47C 7/74 297/452.45 |
| 2005/0264086 A1 | 12/2005 | Lofy et al. | |
| 2007/0158981 A1* | 7/2007 | Almasi | B60N 2/5614 297/180.12 |
| 2009/0218855 A1 | 9/2009 | Wolas | |
| 2010/0011502 A1* | 1/2010 | Brykalski | A47C 21/048 5/423 |
| 2010/0207443 A1* | 8/2010 | Brncick | B60N 2/686 297/452.48 |
| 2010/0295339 A1 | 11/2010 | Siu | |
| 2010/0327636 A1* | 12/2010 | Stoll | B60N 2/565 296/146.7 |
| 2011/0109128 A1 | 5/2011 | Axakov et al. | |
| 2011/0221242 A1 | 9/2011 | Juric | |
| 2012/0144844 A1 | 6/2012 | Park et al. | |
| 2013/0106148 A1 | 5/2013 | Lazanja et al. | |
| 2015/0008716 A1 | 1/2015 | Dry et al. | |
| 2015/0329027 A1 | 11/2015 | Axakov | |
| 2016/0114709 A1 | 4/2016 | Kim et al. | |
| 2016/0332549 A1 | 11/2016 | Marquette et al. | |
| 2017/0015226 A1* | 1/2017 | Wolas | B60N 2/06 |
| 2017/0096088 A1 | 4/2017 | Persson et al. | |
| 2017/0136926 A1 | 5/2017 | Dry et al. | |
| 2018/0056834 A1 | 3/2018 | Line et al. | |
| 2020/0406797 A1* | 12/2020 | Greenwood | B60N 2/5685 |
| 2021/0300218 A1* | 9/2021 | Greenwood | B60N 2/5642 |
| 2021/0339660 A1* | 11/2021 | Oomen | B60N 2/565 |
| 2021/0339661 A1* | 11/2021 | Pacilli | B60N 2/5642 |

FOREIGN PATENT DOCUMENTS

| | | |
|---|---|---|
| EP | 0805064 A3 | 11/1997 |
| EP | 2181887 A1 | 5/2010 |
| KR | 10124481 B1 | 3/2013 |

OTHER PUBLICATIONS

International Search Report and Written Opinion for International Application for PCT/US2019/063918, dated Feb. 21, 2020.

International Search Report and Written Opinion for International Application for PCT/US2020/016349, dated Apr. 28, 2020.

* cited by examiner

SINGLE PIECE PLENUM

PRIORITY

This application claims the benefit of U.S. 62/776,157 filed Dec. 6, 2018 and PCT/US2019/063919 filed Dec. 2, 2019; U.S. 62/776,155 filed Dec. 6, 2018 and PCT/US2019/063918 filed Dec. 2, 2019; and U.S. 62/802,793 filed Feb. 8, 2019 and PCT/US2020/016349 filed Feb. 3, 2020, all of which are incorporated by reference herein for all purposes.

FIELD

These teachings relate generally an air distribution system, and more particularly to a plenum that connects a blower to a cushion of a vehicle seat and assists in distributing fluid to areas of a vehicle seat such as a bolster and/or leg region.

BACKGROUND

For many years, industry has been concerned with designing improved conditioning or air distribution systems for articles of manufacture such as seats, steering wheels, automotive vehicles, or other transportation vehicles. Examples of such conditioning systems are disclosed in U.S. Pat. Nos. 5,626,386; 6,291,803; and 7,607,739; and U.S. Patent Application Publication No. 2016/0114709 all of which are expressly incorporated herein by reference for all purposes.

Many systems include a conditioner with a blower that is located on a bottom of a vehicle seat and air is moved from a remote location to an insert to distribute air. Some systems include an extended tail that extends from a location on top of the seat to a location behind or under the seat where the blower is located. These systems include a blower that is connected to the seat frame and the tail connects the insert to the blower. Some systems have attempted to connect a blower and insert to a back side of a seat and distribute fluid from the back side of the seat.

What is needed is a conditioner or air distribution system that connects to a cushion of a vehicle seat, and the cushion and the single piece plenum form an open space therebetween. What is needed is a plenum with baffles that distribute, guide, or direct a fluid within the plenum. It would be desirable to have a plenum that includes walls that form a perimeter around the plenum. What is needed is a plenum that includes baffles that taper in a direction towards the blower.

SUMMARY

These teachings provide a conditioner or air distribution system that connects to a cushion of a vehicle seat, and the cushion and the single piece plenum form an open space therebetween. These teachings provide a plenum with baffles that distribute, guide, or direct a fluid within the plenum. The plenum includes walls that form a perimeter around the plenum. The plenum that includes baffles that taper in a direction towards the blower. The plenum is a single layer or pan that connects to a bottom surface of a cushion and the bottom surface of the cushion forms a top layer or surface of the plenum.

The present teachings include: a distribution system comprising: (a) one or more plenums each including: (I) a rear or bottom wall; (ii) one or more open spaces; (iii) a peripheral wall connected to the rear wall and extending around a periphery of the plenum to define the one or more open spaces; and (iv) one or more connection recesses in the rear wall adapted to connect to one or more blowers; wherein the peripheral wall is configured to contact a cushion of a vehicle seat to enclose the one or more open spaces so that the plenum directs air from the one or more blowers though the cushion.

The present teachings provide an air distribution system that connects to a back side of a cushion and the cushion and the single piece plenum form an open space. The present teachings provide a plenum with baffles that distribute a fluid within the plenum. The present teachings provide a plenum that includes walls that form a perimeter around the plenum. The present teachings provide a plenum that includes baffles that taper as the baffles extend towards the blower.

These teachings provide an air distribution system that includes a plenum configured to attach to a cushion of a vehicle seat. The plenum includes a body; one or more extensions; one or more expansion members connecting the one or more extensions to the body; and one or more ventilation holes defined in the body and/or in the one or more extensions. The one or more expansion members are configured to expand or contract relative to the body.

These teachings provide an air distribution system that includes a plenum configured to attach to a cushion of a vehicle seat. The plenum includes: a body, one or more extensions, one or more flexible regions connecting the one or more extensions to the body, and one or more ventilation holes in the body and the one or more extensions. The one or more flexible regions are sufficiently flexible so that: the one or more extensions are extendable or movable outside of a plane of the body portion; the one or more extensions are longitudinally extendable within a same plane as the body; the one or more extensions flex with the cushion as an occupant moves; or (iv) a combination thereof.

The present teachings provide an air distribution system that connects to a cushion of a seat and is configured to conform to the shape of the cushion or seat so that the air distribution system may be adapted to different seating configurations. The present teachings provide a plenum with one or more bodies or solid regions and one or more flexible regions that move with an occupant or to conform to a shape of a seat. The present teachings provide a plenum that is adjustable with one or more regions of a vehicle seat. The present teachings provide a plenum that includes one or more bellows or flexible regions that allow the plenum to be movable, shapeable, extendable, expandable, contractible, or a combination thereof. The present teachings provide a plenum with a plurality of rigid sections connected by one or more flexible sections or baffles.

These teachings provide a plenum having one or more flexible regions that include one or more ventilation holes. The plenum may have two extensions, and each extension is located on an opposing edge of the body. The plenum may have three extensions. The plenum may have three extensions, and the extensions are connected to each other with one of the one or more flexible regions. The one or more extensions may be extendable in a direction away from the body. One or more of the one or more extensions may include one or more connection recesses that connect one or more blowers to the one or the one or more extensions. The air distribution system may have an "M" shape. The one or more extensions may extend laterally from the body into bolsters of the cushion. The one or more ventilation holes are connected to one or more ducts that extend into a hole within the cushion.

DETAILED DESCRIPTION

Figure 1:
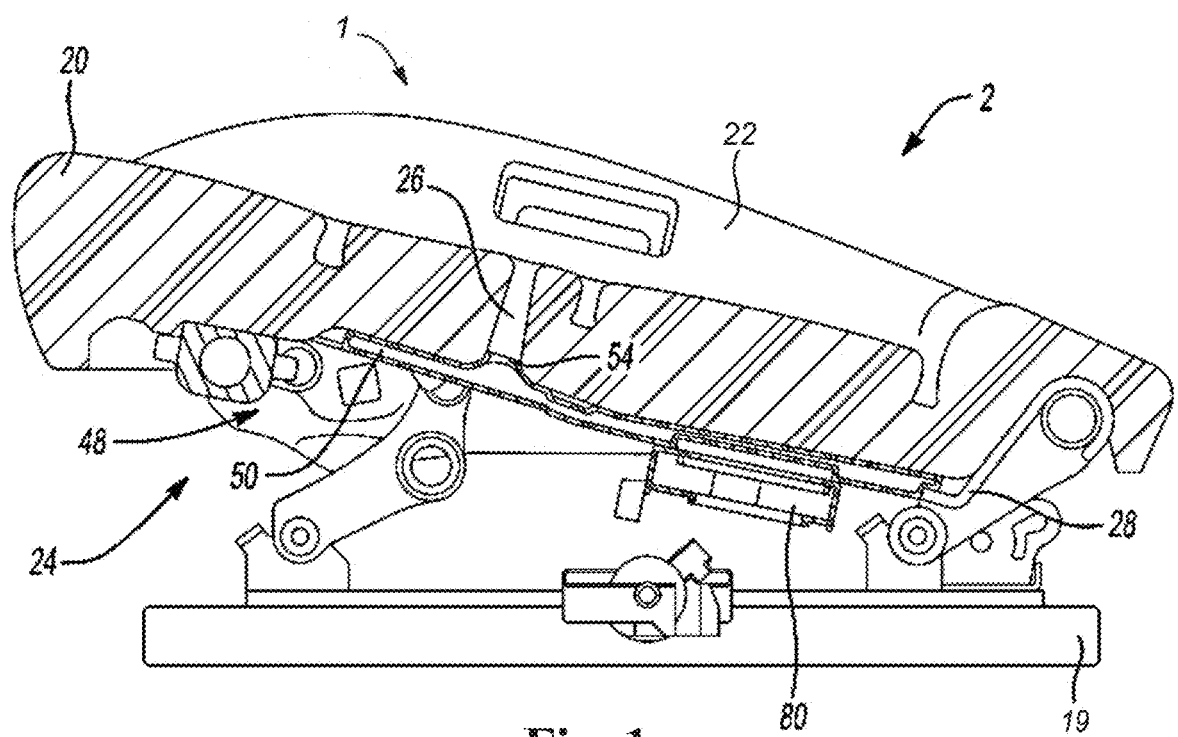
FIG. 1 is a side view of an air distribution system connected to a cushion of a vehicle seat and supported by the seat suspension.

The present teachings are predicated upon providing an improved conditioning system suitable for integration into a vehicle. For example, the conditioning system may be integrated into or attached to carriers (e.g., members, structures, panels, floors, walls, cushions, seat suspensions, or the like) of various articles of manufacture such as buildings, furniture, transportation vehicles, (e.g., boats, trains, airplanes, motorcycles, all-terrain vehicles, busses, snowmobiles, or otherwise) or the like. Alternatively, the conditioning system may be integrated into or attached to various components of transportation vehicles such as seats, benches, panels, footwells, floor mats, or other components. Preferably, the conditioning system is integrated into a vehicle seat. More preferably, the conditioning system is integrated on a rear side (e.g., B-side of a vehicle seat).

The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may be located between two layers of the seat. The conditioning system may be located under a fabric layer (e.g., cloth, leather, synthetic leather, or the like) and under a cushion or backrest (e.g., a foam support for the user). In one aspect, the present teachings employ a structure that makes it particularly suited for use beneath a perforated leather seat cover or perforated synthetic leather seat cover. The present conditioning system is particularly attractive for use in combination with a conditioned seat (e.g., a ventilated, actively cooled (such as by use of a thermoelectric device or module), or actively heated seat). The conditioning system may be integrated with the seat foam support by way of moulding, gluing, or other attachment methods. Preferably, the conditioning system includes a distribution system, and the distribution system is connected to a seat suspension without use of any adhesives, gluing, or both. More preferably, the conditioning system is included underneath the cushion of the seat and the cushion assists in distributing air from the conditioning system to an occupant, predetermined locations, or both. The conditioning system may be located proximate to a seat but free of any connection features that extend from the connection system to the cushion. The conditioning system may include one or more blowers and one or more inserts (i.e., plenums); one or more heaters, one or more thermoelectric devices, or a combination thereof.

A conditioned seat may include one or more air movers (air movers and blowers are used interchangeably herein). The one or more air movers may move air through one or more inserts that are located within or are located behind the backrest cushion, seat cushion, or both. The one or more plenums may distribute the air from the air mover. The one or more air movers may push air, pull air, both, or switch between pushing and pulling air. The one or more air movers may be an axial fan, a radial fan, or both. Preferably, the one or more air movers are a radial fan. The one or more air movers may include a Thermoelectric Device (TED). The TED may heat air as it enters the air mover or as it leaves the air mover. The TED may cool air as the air enters the air mover or as the air leaves the air mover. The one or more air movers may include a heating device, a cooling device, or both (i.e., a thermoelectric device (TED)). The TED may be used to heat air and/or cool air that is blown onto the user. The air mover and TED may be placed in the seat in many different configurations or in communication with a vehicle seat insert. For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes. The TED and heater may both produce heat at the same time; however, it is contemplated that the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user. The air may be blown through the insert, a heater, perforations in the seat cover (e.g., trim layer), holes or perforations in a cushion, or a combination thereof. Some examples air permeable seats and heating device are U.S. Pat. Nos. 6,064,037 and 6,869,140 both of which are incorporated by reference herein for all purposes. The TED may blow hot air while the heater contemporaneously heats the seat; thereby, providing both conduction heating and convection heating.

The conditioning system may be used in conjunction with an occupant sensor. An occupant sensor may be used on any seat in conjunction with a conditioning system. Preferably, an occupant senor may only be used on passenger seats. The occupant senor may be any type of occupant senor that senses a passenger in a vehicle seat. The occupant senor may be a membrane sensor, a capacitive sensor, a force sensor, a mass sensor, or a combination thereof. A microprocessor may monitor the occupant senor for a passenger. For example, the microprocessor may be attached to an occupant senor and when the occupant senor measures that the seat is free of an occupant the conditioning system may remain off even if all of the other conditions are met such as the conditioning system being turned on. The occupant sensor may be in contact with a plenum. Preferably, the occupant sensor is located on a top of a cushion and the plenum is located under the cushion. The conditioning system may include one or more distributions systems.

The one or more distribution systems function to guide a fluid towards or away from an occupant contact region. The one or more distribution systems preferably are located in or under a bun, a backrest, or both of a vehicle seat. The distribution system may include one or more blowers, one or more plenums, one or more flexible regions, or a combination thereof. The distribution system may distribute air or vacuum (pull air) to one or more locations of interest. The distribution system may evenly distribute air or vacuum. The location of the blower, the location of baffles, configuration of a plenum, or a combination thereof may move fluid so that the fluid evenly moves from or to the occupant. The distribution system may unevenly distribute air or vacuum. For example, the plenum, air mover, holes, baffles, or a combination thereof may be configured to direct more or less air to or from one or more locations of interest.

The plenum functions to fluidly connect an air mover to a cushion and assist in transporting fluid through the cushion. Preferably, the plenum functions to fluidly connect a blower to a rear side of a cushion. The plenum may be an insert, a bag, a portion of a bag, or a combination thereof. Preferably, the plenum may be a single piece. The plenum may be a plurality of pieces. The plenum may be rigid. The plenum may be flexible. The plenum may be a film. The plenum may be plastic. The plenum may be molded, blow molded, injection molded, extruded, or a combination thereof. The plenum may be free of a top, free of a top layer, free of a top wall, or a combination thereof. The plenum may be open. The plenum may include an open space that is formed between a peripheral wall and a rear wall, which may also be referred to herein as a bottom or back wall. The plenum may have an open space that is closed off by being sandwiched between a cushion and a seat suspension so that the cushion forms the top wall. The plenum may be one solid piece. The plenum may extend only under a body of a cushion. The plenum may extend under both the body and the bolsters of the cushion. The plenum may have a peripheral wall that varies in height depending on a section of the plenum that the peripheral wall extends under. For example, the peripheral wall may be taller under the bolster than the peripheral wall under the body of the cushion. The plenum may be free of a fixed connection to a cushion. The plenum may be free of any fasteners that extend between the plenum and the cushion. The plenum may be sandwiched between the cushion and the seat suspension. The plenum may create an open space. Preferably, the plenum creates an open space so that fluid is movable along a rear side of the cushion. The plenum may resist crushing when an occupant sits in a vehicle seat. The plenum may have an open space that is self-supporting or that supports all or a portion of the cushion. The plenum may have an open space that is free of additional material to maintain the openness of the open space. The plenum may include one or more baffles, one or more walls, or both that assist in directing the flow of air between a cushion and an air mover. The plenum may be made of or include a polymer, plastic, metal, a thermoset, an elastomer, high density polyethylene (HDPE); acrylonitrile butadiene styrene (ABS), or a combination thereof. The plenum may be vacuum formed, injection molded, made of a single piece, or a combination thereof. The plenum may include one or more sections or regions. The plenum may only include a body. The plenum may include a body and an extension.

The plenum may be free of a top, free of a top layer, free of a top wall, or a combination thereof. The plenum may be open (e.g., on the top, sides, or both). The plenum may include one or more baffles, one or more walls, or both that assist in directing the flow of air between a cushion or occupant and an air mover, maintaining an open space, or both. The plenum may be made of or include a polymer, plastic, metal, a thermoset, an elastomer, high density polyethylene (HDPE); acrylonitrile butadiene styrene (ABS), or a combination thereof. The plenum may be vacuum formed, injection molded, made of a single piece, or a combination thereof. The plenum may include one or more sections or regions. The plenum may include two or more sections that are connected together to form the plenum. For example, a top layer and a bottom layer may be connected together to form the plenum. The plenum may only include a body. Preferably, the plenum may include a body and an extension. The body and the extensions may be connected together via a flexible region, expansion members, or both.

The body of the plenum function to move air into a main portion or body of a cushion (e.g., a portion of the cushion that is located under or behind a back, butt, thighs, or a combination thereof of an occupant). The body of the plenum may be a main portion of a plenum. The body of the plenum may include or be connected to a blower. The body of the plenum may form the open space. The plenum may only include a body. The body may be a region bounded by the peripheral wall. The body may be located inside a peripheral wall and be subdivided by one or more baffles. The body may be a single continuous piece. The body may include one or more sections and the one or more sections may be movable relative to each other. For example, the body may include a main portion that is located below an occupant and two sections that are connected to the body and extend under thighs of the occupant where the two sections are movable relative to each other. The body may be a portion that is free of extension outside of a main portion of a cushion. For example, the body may be bounded on one or more sides by a bolster, head rest, bite line, or a combination thereof. The body may be connected to one or more extensions. The body may be free of contact with extensions. The body and the extensions may be separate pieces. Preferably, the body and the extensions are connected together.

The body may function to distribute fluid to a main portion, an occupant, a back of an occupant, a buttock of an occupant, thighs of an occupant, shoulders of an occupant, or a combination thereof. The body may be connected to a cushion. The body may remain static. The body may be connected to one or more blowers. The body may distribute fluid. The body may be square, rectangular, round, oval, "U" shaped, "M" shaped, "W" shaped, or a combination thereof. The body may be a hub for extensions. The body may be connected one or more extensions. The body may be connected to a plurality of extensions, include one or more baffles, include one or more flexible regions, one or more shoulders, one or more connection members, or a combination thereof.

The one or more extensions may function to provide fluid communication to a location of a cushion or seat located outside of a main portion of a body of the seat or cushion. A plurality of extensions may be connected to a body. The extensions may be fixed to the body and may be immobile relative to each other. The one or more extensions may be movable relative to the body. The body, plenum, distribution system, or a combination thereof may be free of extensions. The one or more extensions may extend under or into a bolster, under a thigh, between a thigh and a knee, to a location under an occupant's arm, a location behind an occupant's neck, a location behind an occupant's head, a region of the cushion proximate to a leg contact region of an occupant, or a combination thereof. The one or more extensions may be located within the peripheral wall. The one or more extensions may be located within a separate peripheral wall that is connected to an extends from the peripheral wall around the body of the plenum. The one or more extensions may be in fluid communication with the body of the plenum. The one or more extensions may have an open space that is fluidly connected to the open space of the body. The one or more extensions may have an open space that is fluidly disconnected from the open space of the body. The one or more extensions and the body may be one unitary piece, may include a common rear wall, or both. There may be two or more extensions, three or more extensions, or even four or more extensions. The extensions may extend from opposing sides of the body. The extensions may include one or more connection recesses. The extensions may be free of one or more connection recesses. The one or more extensions may be movable relative to the body. The connection recesses may be located in the rear wall of the body and may supply fluid to the extensions.

The air may enter or exit the plenum through the rear wall. The rear wall functions to connect the blower to the conditioning system, the distribution system, the plenum, or a combination thereof. The rear wall may form one side of an open space. The rear wall may extend parallel to a rear of a cushion. The rear wall may be planar. The rear wall may be concave. For example, the rear wall may be dish shaped where a portion of the wall extends away from the cushion. A portion of the rear wall may be concave so that a blower may be located within the concave portion. The concave portion of the rear wall may allow a portion of the blower to be located within a plane that is closer to the cushion than the rear wall is located to the cushion. The rear wall may be free of any holes or recesses. Preferably, the rear wall only incudes connection recesses that connect to or receive one or more blowers. The blower housing may include one or more housing connectors that extend into contact with the rear wall, a concave wall of the rear wall, or both. The blower housing may house an impeller. The blower housing may connect to bottom wall, a concave wall, or both. The rear wall may extend behind a body of a cushion, a bolster of a cushion, a head rest, or a combination thereof. The rear wall may be one continuous piece. The rear wall may be segregated into one or more sections by one or more baffles. For example, the rear wall may be segregated into a body and one or more extensions, one or more walls, or both. The rear wall may be divided to include one or more open spaces. The rear wall may be fluid impermeable. The rear wall may support one or more peripheral walls, one or more baffles, include a concave wall, or a combination thereof.

The concave wall may function to create a void, a recess, a space, or a combination thereof that receives all or a portion of the blower so that the blower and plenum are low profile, a portion of the blower height is located within the plenum, or both. The concave wall may form a right angle with a plane of the bottom layer. The concave wall may be located in a plane between the cushion and the bottom wall of the plenum. The concave wall may be located in a plane so that a portion of the blower is located closer to the cushion than the rear wall is located to the cushion. The concave wall may extend at an angle greater than 90 degrees with the bottom layer. The concave wall may extend towards the connection recess. The concave wall may be arcuate. The concave wall may be a series of interconnected angles. The concave wall may include one or more curves, bends, or both. The concave wall may form a recess within the bottom layer that has a shape that is a full or half square, rectangle, circle, diamond, pentagon, hexagon, octagon, or a combination thereof. The concave wall may be located between the top layer and the bottom layer. One or more blower connection features may be located within or proximate to the concave wall.

The peripheral wall may function to create an open space. The peripheral wall may function to support the rear wall, be connected to the rear wall, or both. The peripheral wall may extend around a periphery of the rear wall. The peripheral wall may support the rear wall a distance from a rear of a cushion. The peripheral wall may create a seal between the rear wall and the cushion. At least a portion of the peripheral wall (i.e., a top surface) may be in contact with a cushion to enclose an open space between the plenum and the cushion. At least a portion of the peripheral wall (i.e., a top surface) may be free of contact with a cushion. The peripheral wall may locate the rear wall a distance from the cushion. The peripheral wall may contact the cushion. The peripheral wall may be one continuous wall. The peripheral wall be two or more walls that are located proximate to each other. The peripheral wall may extend around an exterior region of the rear wall. The peripheral wall may extend around a terminal edge of the rear wall. For example, the peripheral edge may define a volume of the open space. The peripheral edge may extend to the bolsters, a head rest, a body, or a combination thereof of a cushion. The peripheral edge may have a height. The height of the peripheral edge may be sufficiently high so that when an occupant sits within the cushion and the cushion is compressed the peripheral edge assists in maintaining an open space. The height of the peripheral wall may be substantially uniform along a length of the peripheral wall. A height of the peripheral wall may vary along a length of the peripheral wall. The height of the peripheral wall may be located at a top edge of the peripheral wall. The top edge of the peripheral wall may contact the cushion. The peripheral wall may have a height of about 1 cm or more, about 2 cm or more, about 3 cm or more, about 4 cm or more, about 5 cm or more, or about 6 cm or more. The peripheral wall may have a height of about 12 cm or less, about 10 cm or less, or about 8 cm or less. The peripheral wall may mirror the shape of the rear wall. Thus, if the rear wall is square the peripheral wall may have a square shape. The shape of the peripheral wall may be geometric, symmetrical, asymmetrical, square, rectangular, "H" shaped, "U" shaped, a trapezoid, triangular, "I" shaped, "T" shaped, or a combination thereof. The peripheral wall preferably is a single wall. The peripheral wall may be located proximate to or connected to one or more baffles.

The one or more baffles may function to distribute air within the open space, distribute air to the cushion or blower, provide uniform distribution of air, or a combination thereof. The one or more baffles may create a path between the one or more cushion holes and the blower so that fluid passes through each of the cushion holes and not only the holes closest to the blower. The plenum may include one or more baffles. The plenum may include a plurality of baffles. The one or more baffles may be a portion of the rear wall, the peripheral wall, or both that extend into the open space to create a fluid barrier. The one or more baffles may be added into open space before the plenum is placed proximate to the cushion. The one or more baffles (i.e., a top surface thereof) may contact the cushion and divide the plenum into one or more open spaces, create one or more open spaces, or both. The one or more baffles (i.e., a top surface thereof) may be free of contact or spaced apart from a bottom surface of the cushion. The one or more baffles may be curved, substantially straight, teardrop shaped, have a curved portion, have a straight portion, or a combination thereof. The one or more baffles may radiate outwards away from the blower. The one or more baffles may be located proximate to the blower and assist in distributing air between the blower and the one or more ventilation holes. For example, the baffles may assist the blower in moving an equal amount of air through a ventilation hole that is located within 10 cm of the blower as the blower moves through a ventilation hole that is between 25 cm and 40 cm away. The one or more baffles may be shaped in a way to assist the flow of air from the blower to the one or more cushion holes in an even fluid speed. The one or more baffles may be connected to the peripheral wall. The one or more baffles may be free of directly contacting or connecting with the peripheral wall. The one or more baffles may extend inward from the peripheral wall. The one or more baffles may be discrete from the peripheral wall. The one or more baffles may be formed from part of the rear wall. The one or more baffles may be a portion of the rear wall that extends inward. The rear wall at the baffles may include a recess. The baffles may direct a fluid between the body of the plenum and the extension of the plenum. The baffles may contact a rear side of the cushion and create one or more channels of open space that fluid may move through. The baffles may have a height that is substantially the same as the height of the peripheral wall. The baffles may have a height that reduces along a length of the baffle. The height of the baffles may reduce as the baffles extend toward the peripheral wall, toward the blower, or both. The height of the baffles may be sufficiently tall to maintain an open space when an occupant is located within the cushion. The baffles may be arranged in a spiral shape or pattern when viewed from above. The baffles may include tapered portions that curve or point towards the connection recess. The height may taper as the baffles extend towards the air mover.

The taper may function to direct air between the air mover and the cushion holes. The taper may assist in equally distributing air within an open space of the plenum. The baffles may taper towards the one or more connection recesses. The taper may extend into the one or more connection recesses. The taper may be a reduction in height of the baffle. The taper may reduce a height of the baffle until the baffle terminates, terminates into the rear wall, or both. The one or more baffles may turn at an angle as the one or more baffles taper. The taper may be on a curved segment, a straight segment, a curve, or a combination thereof. The taper may reduce a maximum height of the baffles by about 0.25 or more, about 0.5 or more, or about 0.75 or more. The taper may reduce a maximum height of the baffles so that the baffles are eliminated. The taper may extend towards a connection recess and terminate proximate to the connection recess. The taper may extend all the way to the connection recess.

The connection recess may be a hole within the plenum that is in communication with a blower. The connection recess and the rear wall may be coplanar. The connection recess may receive all or a portion of a blower. The connection recess may receive air from a blower, air from the cushion, or both. The connection recess may assist in creating positive pressure within the open space of the plenum. The connection recess may assist in creating negative pressure within the open space of the plenum. The connection recess may include a flange or a blower connection feature that a blower connects to so that the blower and plenum are in fluid communication.

The blower connection feature may function to create an air seal between the blower and rear wall. The blower connection feature may be shaped like a funnel, cylinder, or combination thereof. The blower connection feature may include a flange, be a flange, or both that a blower connects.

The blower connection feature includes a flange, a concave wall, or both. Preferably, the blower connection feature is one or more fasteners that connect a blower to the plenum. The blower connection feature may be a threaded member that extends through a portion of a housing of a blower and into the plenum. The blower connection feature may connect the blower to a rear wall of the plenum so that the blower is aligned with the connection recess. The blower connection feature may suspend the blower from the plenum. The blower connection feature may function to direct air to the open space and further to the cushion holes.

The open space may function to create an open area between the cushion and the rear wall. The open space may prevent the rear wall and the cushion from being moved into contact. Preferably, the open space may be maintained by the peripheral wall, the baffles, or both contacting the cushion. The open space may be free of additional material. The open space may be void or devoid of any material. The open space may resist compression by one or more baffles or walls extending therethrough. The open may be an absence of material that is located between the cushion and the rear wall. The open space may include one or more features such as a baffle or a connection layer that extend therethrough. The open space may be in fluid communication with the blower and air may move from the blower to the open space or from the open space to the blower.

The blower functions to push air, pull air, or both. The blower may be movable with the cushion, the plenum, or both as an occupant sits on the cushion or leaves the cushion. The blower may be an axial fan. Preferably, the blower may be a radial fan. The blower may include one or more impellers that move air through the blower, the blower housing, the plenum, or a combination thereof. The blower housing may be connected to the rear wall of the plenum. The blower housing may include one or more housing connectors that are in contact with the concave wall, the bottom wall, or both of the plenum. The blower includes an inlet and an outlet. The inlet may be on the bottom side or the top side. Preferably, the inlet is in the bottom side of the blower. The inlet or the outlet is connected to the plenum via the attachment ring, a clip, a blower connection feature, or a combination thereof so that air may be pushed or pulled into the plenum. The blower may be connected to a rear wall of the plenum by one or more flanges. The inlet and outlet may allow air to move into and out of the housing.

The housing functions to connect the blower within a system, direct air to a predetermined location, pressurize air, or a combination thereof. The housing may connect the blower to a seat, a cushion, a frame, a blower connection feature, a plenum, or a combination thereof. The housing may be rigid. The housing may be flexible. The housing may include rigid regions and flexible regions. The housing may include one or more integral parts (e.g., a part that is formed with the housing) that connect the housing, the blower, or both to a cushion, a plenum, or both. The housing may include parts that are added to the housing after the housing is formed and the parts may assist in connecting the housing, the blower, or both to the cushion, a plenum, or both. The housing may include one or more parts (e.g., clips, eyelets, or bands). The housing may be located within one or more flanges of a plenum.

The one or more flanges may extend outward from the plenum so that the blower may connect to the plenum. The one or more flanges may concave and may extend inward. The one or more flanges may receive all or a portion of a blower. The one or more flanges may create a recess that the blower extends into so that a profile (e.g., thickness) of the plenum and the blower is reduced relative to a maximum thickness of the plenum and a maximum thickness of the blower. The flange may curve inward toward the connection recess. The flange may be a wall that tapers inward towards a cushion, into an open space, or both. The flange may be annular. The flange may be a single flange. The flange may be a plurality of parts that extend from the plenum. The flange may contact the housing, the blower, a housing connector, or both.

The one or more housing connectors function to prevent movement of the blower relative to the plenum. The one or more housing connectors may align the blower with the connection recess. The one or more housing connectors may space the blower apart from the plenum. The one or more housing connectors may be an extension of the housing. The one or more housing connectors may be located between the plenum and the housing. The one or more housing connectors contact a flange and prevent lateral movement of the blower relative to the rear wall, the flange, or both. The one or more housing connectors may maintain the blower and the plenum relative to the cushion.

The one or more cushions may function to support an occupant, a conditioning system, or both. The one or more cushions may extend over a bottom or a back of a frame to form a portion of a vehicle seat. The one or more cushions may be made of an open cell foam, a closed cell foam, or both. The one or more cushions may be located between a trim layer and a frame. The one or more cushions may be located between an occupant and a conditioning system, a plenum, a blower, or a combination thereof. The cushion may include one or more supports, one or more seat suspensions, or both that assist in connecting a plenum, a blower, or both to the cushion. One or more cushions of the seat may include ventilation, active cooling, active heating, or a combination thereof. The seat may include one or more air movers (i.e., blower) in fluid connection to the one or cushions so that air may be blown onto the user or so that air may be pulled away from the user. The cushion may be connected to or part of a conditioning system, support, a seat suspension, or a combination thereof. The cushion may be a back cushion, a seat cushion, or both. The cushion may be made of foam. The cushion may be located above suspension, a support, or both. The cushion may have a forward surface that an occupant contacts and a rear side or "b" side. The cushion may have cushion holes that extend from a forward side to a rear side of a cushion.

The cushion holes may allow fluid to transport between a forward surface and a rear side of the cushion. The cushion holes may have a cross-section that increases or decreases between the forward side and the rear side. The cushion holes may have a constant cross-section from the forward side and the rear side. The cushion holes may align with an open space of the plenum. The cushion holes may be located in a body of the cushion, a bolster of a cushion, a head rest, or a combination thereof.

The body of the cushion may function to support an occupant. The body of the cushion may be a central portion of the cushion. A body of a seat may be located below an occupant's butt, thighs, or both. A body or a backrest may be located behind a back of an occupant. The body may include a bolster on one or more sides.

The bolsters of the cushion may be an area of a cushion located outside of the body. The bolsters may be a periphery of the cushion. The bolsters may contact an outside of a leg, an arm, or both. The bolsters may extend out of a plane from the body of the cushion so that the bolsters assist in retaining an occupant within a vehicle seat.

The rear of the cushion may be in communication with the distribution system, the plenum, or both. The rear may be covered by the plenum. The rear of the cushion and the plenum may form an open space. The rear of the cushion may include one or more cushion holes. The rear of the cushion may be supported by the plenum, the seat suspension, or both.

The seat suspension may movably support the plenum and the cushion. The seat suspension may be spaced apart from the cushion by the plenum. The seat suspension be connected to a support, the vehicle, or both. The seat suspension may be wires, springs, flexible materials, or a combination thereof that support the cushion relative to the seat support.

The seat support connects the cushion, conditioning system, or both to a vehicle. The seat support may be movable within a seat. The seat support may be a primary part of a vehicle seat that connects the cushion to the vehicle.

The one or more baffles may function to distribute air within the open space, distribute air to the ventilation holes, provide uniform distribution of air, or a combination thereof. The one or more baffles may create a path between the one or more ventilation holes and the blower so that fluid passes through each of the ventilation holes and not only the holes closest to the blower. The one or more baffles may be a portion of the top layer, the bottom layer, or both that extend into the open space to create a fluid barrier. The one or more baffles may be added into the open space before the plenum is sealed. The one or more baffles may be located within the body, the extension, the flexible regions, or a combination thereof. The one or more baffles may be curved, substantially straight, teardrop shaped, crescent shaped, serpentine shaped, have a curved portion, have a straight portion, or a combination thereof. The baffles may be rounded on either end. The tear drop baffles are defined as a baffle with a body that decrease in width from one end to the other end. The baffles that are tear drop shaped may have sides that are substantially straight, concave, convex, curved, or any combination thereof. For example, the teardrop shaped baffle may have substantially straight sides with rounded ends. For example, the teardrop shaped baffle may have a middle body that is less in diameter than either end of the baffle. The one or more baffles may radiate outwards away from the blower attachment feature. The one or more baffles may be located proximate to the blower attachment feature and assist in facilitating air between the blower and the one or more ventilation holes. For example, the baffles may assist the blower in moving equal amounts of air through a ventilation hole that is located within 10 cm of the blower as the blower moves through a ventilation hole that is between 25 cm and 40 cm away. The one or more baffles may be shaped in a way to assist the flow of air from the blower to the one or more ventilation holes in an even fluid speed. The one or more baffles may have a shape to promote laminar flow. For example, the baffles may be generally straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. The one or more baffles may be configured to prevent turbulent flow. For example, the baffles may be straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. For example, the baffles may increase in cross-sectional width as air moves away from the blower connection feature. For example, the baffles may increase in cross-sectional width as air moves towards to the blower connection feature. The one or more baffles may be a connection layer or may be in addition to a connection layer. The one or more baffles may be located within the body, a shoulder between the body and the extension, the extensions, or a combination thereof.

The one or more shoulders may function to connect the body to the one or more extensions. The one or more shoulders may function to change a direction of the plenum, air flow, or both. The one or more shoulders may be connected to the body. The one or more shoulders may extend outward and away from the body. The one or more shoulders may be connected to a body by one or more flexible regions. The one or more shoulders may include the one or more flexible regions. The one or more shoulders may be located between a flexible region and an extension, a flexible region and a body, an extension and a body, or a combination thereof. The one or more shoulders may connect the plenum to a cushion, seat suspension, or both. The one or more shoulders may include a curve, a bend, or both. The one or more shoulders may fluidly connect one or more extensions to the body, the blower, or both. The one or more shoulders may be located proximate to one or more connection members. The one or more shoulders may extend parallel to the connection members.

The one or more connection members may function to restrict movement of one or more extensions, the body, or both. The one or more connection members may connect an extension to the body. The one or more connection members may extend from a body to an extension to restrict in plane movement of the extension relative to the body. One or more connection members or even two or more connection members may extend between and connect a body to the extension. The body may have one or more connection members extending from each side or two or more connection members that extend from each side. The connection members may be symmetrically or asymmetrically located about the plenum, the body, or both. The one or more connection members may be flexible in one direction and inflexible in a second direction. For example, the connection member may be movable in a direction out of plane so that when an occupant sits in the cushion the flexible member may move with the cushion as the cushion expands and contracts. In another example, the one or more connection members may restrict the one or more extensions from moving in plane relative to the body (i.e., an in-plane distance between the body and the extensions may remain constant). The one or more connection members may be made of or include plastic, a polymer, elastomer, elastic, metal, steel, a thermoset, a thermoplastic, a woven material, a synthetic material, a natural material, one or more members linked together, or a combination thereof. The one or more connection members may permit the extensions to move out of plane and restrict movement of the extensions in-plane.

The one or more extensions may function to provide fluid communication to a location of a cushion or seat located outside of a main portion of a body of the seat or cushion. The one or more extensions may be movable within a plane, out of plane, or both relative to a plane of the body. The one or more extensions may be flexible. The one or more extensions may be flexible due to a connection with the one or more flexible regions. A plurality of extensions may be connected to a body. The extensions may be fixed to the body and may be immobile relative to each other. Preferably, the one or more extensions may be movable relative to the body. The one or more extensions may extend under a bolster, under a thigh, between a thigh and a knee, to a location under an occupant's arm, a location behind an occupant's neck, a location behind an occupant's head, or a combination thereof. The one or more extensions may be located within the peripheral wall. The one or more extensions may be located within a separate peripheral wall that is connected to an extends from the peripheral wall around the body of the plenum. The one or more extensions may be in fluid communication with the body of the plenum. The one or more extensions may have an open space that is fluidly connected to the open space of the body. The one or more extensions may have an open space that is fluidly disconnected from the open space of the body. The one or more extensions may be movable relative to the body, another extension, or both. The one or more extensions may be smaller than the body. The one or more extensions may deliver fluid to a remote portion of the seat, to a movable portion of the seat, and adjustable portion of the seat, or a combination thereof. The one or more extensions and the body may be one unitary piece, may include a common bottom layer (e.g., rear wall), or both. There may be two or more extensions, three or more extensions, or even four or more extensions. The one or more extensions may be complementary in shape to a neck, thigh, bolster, leg, back, sides of an occupant body, or a combination thereof. The one or more extensions may be rectangular, square, circular, oval, round, have a curved end, or a combination thereof. The extensions may extend from opposing sides of the body. The extensions may include one or more connection recesses. The extensions may be free of one or more connection recesses. The connection recesses may be located in the bottom layer of the body and may supply fluid to the extensions. The one or more flexible regions may permit the one or more extensions to move relative to the body.

The one or more flexible regions function to permit the one or more extensions to move relative to the body. The one or more flexible regions may move in any direction. The flexible regions may connect one or more extensions to the body. The flexible regions may include an open space that permits movement of fluid between the body and the one or more extensions. The flexible regions may create an open space between the body and the one or more extensions. The one or more flexible regions may permit solid pieces to articulate relative to each other. The one or more flexible regions may move in an x-direction, y-direction, z-direction, along an axis, rotate about an axis, or a combination thereof of a coordinate system. The one or more flexible regions may directly connect a body to an extension, an extension to a shoulder, or both. Each extension may be connected to a body or shoulder via a flexible region. The flexible regions may move in any direction of a coordinate system. The flexible regions may longitudinally extend. The flexible regions may laterally extend. The flexible regions may rotationally move. The flexible regions may be arced. The one or more flexible regions may be laterally movable, longitudinally movable, movable rotationally, arced, or a combination thereof relative to a body or a plane of the body. For example, the flexible regions may longitudinally extend within the plane of the body. The one or more flexible regions may be flexed into a "J" shape, a "U" shape, a "C" shape, or a combination thereof. The flexible regions may elastically deform. The one or more flexible regions may be plastically deformable. The one or more flexible regions may be formable. For example, the flexible regions may be moved into a shape or position and the flexible regions may maintain that shape or position until the flexible regions are reformed. The flexible regions may retain a shape. The flexible regions may expand and contract. A cross-sectional thickness of the flexible regions may increase and decrease as the flexible regions move. For example, as the extension moves further from the body, a cross-section of the flexible region may reduce. The cross-sectional thickness of the flexible regions may remain constant as the flexible region moves. The flexible region may be a solid material but may include joints that permit the flexible regions to be movable. For example, the flexible region may be made of a hard plastic or metal and the plastic or metal may include joints or deformable pieces that permit the extension to move. The flexible regions may be made of a pliable material that permits movement of the flexible regions by the material elastically deforming. For example, the flexible regions may be made of or include an elastomer and the elastomer may allow the flexible regions to bend and stretch so that the extension is movable relative to the body. The flexible regions may be an accordion, a baffle, a series of interconnected pieces, or a combination thereof. The flexible regions may be made of a plurality of expansion members.

The one or more expansion members function to maintain a shape but to allow for movement of an extension. The one or more expansion members may connect to another expansion member, a shoulder, a body, an extension, or a combination thereof so that the plenum is movable while maintaining a fluid connection. The one or more expansion members may stretch, deform, change from concave to convex, pop out, or a combination thereof so that the expansion members allow the flexible regions to flex. The flexible regions may include a plurality of expansion members. The expansion members may be connected together to create a desired amount of travel, rotation, flexing, or a combination thereof. The expansion members may be movable relative to another expansion member. The expansion members may be movable relative to the body, an extension, or both. The expansion members may be moved relative to a center line or longitudinal axis of the expansion member, body, plenum, seat, vehicle, or a combination thereof. The expansion members may be moved along the aforementioned center line or longitudinal axis, or at any angle relative to the aforementioned center line or longitudinal axis. The expansion members may include an open space (e.g., create a conduit for air to move through the expansion member). The expansion member may be or may comprise one or more conduits allowing air to move between the body and the one or more extensions. The expansion members may be identical. Each of the expansion members may be movable between a relaxed state and an extended state.

The relaxed state may be where the material is not stretched, elastically deformed, moved out of plane, not deformed, or a combination thereof. The relaxed state may be where no force is being imparted upon the flexible region, the expansion members, or both. The relaxed state may be where the flexible regions are in a line, in a plane, not flexed, not extended, are a shortest, or a combination thereof. The relaxed state may be a state where an occupant is not located within a vehicle seat, the vehicle seat is adjusted from a neutral state, or both. The flexible regions may change from a relaxed state to an extended state once a force is imparted on the flexible regions. A cross section of the expansion member in the relaxed state may be the same size, larger, or smaller than a cross section of the expansion member in the expanded state.

The extended or expanded state may be where an occupant, a part of the vehicle seat, installation, or a combination thereof occur so that the extension is moved relative to the body, the shoulders, or both. The extended state may be where an extension is move out of plane relative to a body. The extended state may be where an extension is moved within a plane away from a body, a relaxed state, or both. The extended state may be where the flexible region, the expansion members, or both are curved, extended, flexed, or a combination thereof. The extended state may be where some force is imparted on the flexible region, the expansion members, the extension, or a combination thereof so that some movement is imparted. The extended state may be where one or more expansion members are deformed. The extended state may be where one or more of the expansion members or a flexible region are moved. The extended state may have movement in an "x" direction, "y" direction, "z" direction, about an axis, along an axis, or a combination thereof. The extended state may move an extension relative to the plenum but fluidly maintain a connection between the extension and body so that air may move into or out of the plenum and preferably a top layer of the plenum. The extended state may be when one or more of the expansion members are in a different position than when the expansion member is in a relaxed state. The extended state may be when an expansion member is expanded or deformed or otherwise made to be longer than when in the relaxed state. A cross section of the expansion member in the expanded state may be the same size, larger, or smaller than a cross section of the expansion member in the relaxed state.

The top layer may function to distribute air flow to predetermined locations. The top layer may include one or more ducts (e.g., ventilation holes). The top layer may include a plurality of ducts or ventilation holes. The one or more ventilation holes may be aligned with cushion holes in a cushion. The one or more ventilation holes may be connected to one or more ducts that extend into a hole within the cushion. The one or more ventilation holes may distribute air to or receive air from the plenum at locations that correspond with regions of an occupant (e.g., lower back or legs). The one or more ventilation holes may be an absence of material. The one or more ventilation holes may be formed by removing material. The one or more ventilation holes may be formed by cutting the top layer. The one or more ventilation holes may function to align a plenum with a cushion, to connect a plenum to a cushion, or both. The one or more connection holes may extend through any portion of the plenum. The one or more connection holes may extend through a seam, extra material, an ear along one or more edges of the plenum, or a combination thereof. Preferably, the one or more ventilation holes extend through the top layer of the plenum. The one or more ventilation holes may only be used to align the trim bag with the cushion, holes in the cushion, or both. The one or more ventilation holes may be free of connection and may be used for alignment by temporarily being contacted during attachment. Preferably, the one or more ventilation holes assist in connecting the plenum to the cushion. The plenum may be adhesively connected to the cushion. Preferably, the plenum is free of an adhesive connection to the cushion. The ventilation holes may extend axially outward from the top layer of the plenum. The ventilation holes may include one or more funnels, cylinders, or both. The one or more ventilation holes may be different diameters relative to another ventilation hole to assist with optimal air flow to the seat cushion. The one or more funnels may function to extend into one or more cushion holes. The one or more funnels may assist in creating a connection with the cushion holes. The one or more funnels may have a cross-sectional length that is greater than a cross-sectional length of the cushion holes. The funnels may create a friction fit with the cushion holes. The funnels may have an angle that is "steeper" than an angle of the cushion holes. The funnels may have one or more barbs that grip the cushion. The funnels may create a friction fit, a seal, or both with the cushion so that air is transferred between the plenum and the cushion. The plenum may include one or more connection recesses so that the plenum connects to a blower and the plenum connects to a cushion. The top layer and the bottom layer may be made of the same material. The top layer and the bottom layer may be made of any of the materials discussed herein for the plenum. The top layer and the bottom layer may be connected together around edges to form a seam or connection. The top layer and bottom layer may be connected together by a connection layer. The top layer and the bottom layer may be ultrasonically bonded together, melted together, glued together, heat staked, or a combination thereof.

The one or more connection layers may function to support the top layer, the bottom layer, or both so that the open space is not closed off. The one or more connection layer may be an integral part of the top layer, the bottom layer, or both. The connection layer may be added after the top layer, the bottom layer, or both are created. The connection layer may be created by bonding the top layer and the bottom layer together within any additional materials. The connection layer may be additional material that is added between the top layer and the bottom layer. The connection layer may be added by welding, ultrasonic welding, adhesive, or a combination thereof. Preferably, the connection layer extends between the top layer and the bottom layer.

The bottom layer may function to allow air to enter into the plenum and to direct air towards exit locations. The bottom layer may be permeable. Preferably, the bottom layer may be impermeable, include an impermeable coating, or both. The bottom layer may be a porous material. The bottom layer may be a solid. The bottom layer may be made of a polymeric material. The bottom layer and the top layer may be made of the same material. The bottom layer and the top layer may be one co-created piece. The bottom layer and the top layer may be formed separately and then connected together. The bottom layer may be one or more layers. Preferably, the bottom layer is a single layer. The bottom layer may be separated from a top layer by an open space. The bottom layer may include one or more recesses that are in communication with one or more blowers. The bottom layer may include a bower connection feature that creates a seal with the blower and bottom layer. The bottom layer may include one or more connection recesses that assist in connecting the blower to the plenum.

The connection recess may be a hole within the plenum that is in communication with a blower. The body may include one or more connection recesses that may connect one or more blowers to the body, an extension, or both. The connection recess and the bottom layer may be coplanar. The connection recess may be a recess that is located inward towards a top wall or forward layer so that the connection recess is located between top wall or the forward layer and the bottom layer. The connection recess may receive all or a portion of a blower. The connection recess may receive air from a blower, air from the cushion, or both. The connection recess may assist in creating positive pressure within the open space of the plenum. The connection recess may assist in creating negative pressure within the open space of the plenum. The connection recess may include a flange or a blower connection feature that a blower connects to so that the blower and plenum are in fluid communication. The connection recess, the bottom layer, or both may include one or more concave walls that extend into the open space, towards the top layer, or both so that all or a portion of a blower is located between a plane of the top wall and a plane of the bottom layer.

The concave wall may function to create a void, a recess, a space, or a combination thereof that receives all or a portion of the blower so that the blower and plenum are low profile, a portion of the blower height is located within the plenum, or both. The concave wall may form a right angle with a plane of the bottom layer. The concave wall may extend at an angle greater than 90 degrees with the bottom layer. The concave wall may extend towards the connection recess. The concave wall may be arcuate. The concave wall may be a series of interconnected angles. The concave wall may include one or more curves, bends, or both. The concave wall may form a recess within the bottom layer that has a shape that is a full or half square, rectangle, circle, diamond, pentagon, hexagon, octagon, or a combination thereof. The concave wall may be located between the top layer and the bottom layer. One or more blower connection features may be located within or proximate to the concave wall.

The blower connection feature may function to create an air seal between the blower and bottom layer. The blower connection feature may be shaped like a funnel, cylinder, or combination thereof. The blower connection feature may function to direct air to the open space and further to the ventilation holes. The blower connection feature may extend into the bottom layer. The blower connection feature may extend through a portion of the blower and a portion of the bottom layer. The blower connection feature may be a fastener. The blower connection feature may be a screw, nut, bolt, clip, mechanical attachment feature, or a combination thereof. The blower connection feature may connect the blower to the bottom layer, the concave wall, or both so that the blower is in fluid communication with an open space of the plenum.

The plenum may include an open space that is formed within a peripheral wall and between a top layer and a bottom layer. The plenum may have an open space that is formed or closed by the plenum being sandwiched between a cushion and a seat suspension so that the cushion forms the top wall. The plenum may be free of a fixed connection to a cushion. The plenum may be free of any fasteners that extend between the plenum and the cushion. The plenum may be sandwiched between the cushion and the seat suspension. The plenum may create an open space. Preferably, the plenum creates an open space so that fluid is movable along a rear side of the cushion. The plenum may resist crushing when an occupant sits in a vehicle seat. The plenum may have an open space that is self-supporting or that supports all or a portion of the cushion. The one or more baffles may assist in forming or maintaining the open space. The plenum may have an open space that is free of additional material to maintain the openness of the open space.

The open space may function to create an open area between the top layer and the bottom layer. The open space may prevent the bottom layer and the top layer from being moved into contact. The open space may be free of additional material. The open space may resist compression by one or more connection layers extending therethrough. The open may be an absence of material that is located between the top layer and the bottom layer. The open space may include one or more features such as a baffle or a connection layer that extend therethrough.

The one or more baffles may function to distribute air within the open space, distribute air to the ventilation holes, provide uniform distribution of air, or a combination thereof. The one or more baffles may create a path between the one or more ventilation holes and the blower so that fluid passes through each of the ventilation holes and not only the holes closest to the blower. The one or more baffles may be a portion of the top layer, the bottom layer, or both that extend into the open space to create a fluid barrier. The one or more baffles may be located within a plenum, extension, flexible region, extension, shoulder, or a combination thereof. The one or more baffles may be added into open space before the plenum is sealed. The one or more baffles may be curved, substantially straight, teardrop shaped, crescent shaped, serpentine shaped, have a curved portion, have a straight portion, or a combination thereof. The baffles may be rounded on either end. The tear drop baffles are defined as a baffle with a body that decrease in width from one end to the other end. The baffles that are tear drop shaped may have sides that are substantially straight, concave, convex, curved, or any combination thereof. For example, the teardrop shaped baffle may have substantially straight sides with rounded ends. For example, the teardrop shaped baffle may have a middle body that is less in diameter than either end of the baffle. The one or more baffles may radiate outwards away from the blower attachment feature. The one or more baffles may be located proximate to the blower attachment feature and assist in facilitating air between the blower and the one or more ventilation holes. For example, the baffles may assist the blower in moving equal amounts of air through a ventilation hole that is located within 10 cm of the blower as the blower moves through a ventilation hole that is between 25 cm and 40 cm away. The one or more baffles may be shaped in a way to assist the flow of air from the blower to the one or more ventilation holes in an even fluid speed. The one or more baffles may have a shape to promote laminar flow. For example, the baffles may be generally straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. The one or more baffles may be configured to prevent turbulent flow. For example, the baffles may be straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. For example, the baffles may increase in cross-sectional width as air moves away from the blower connection feature. For example, the baffles may increase in cross-sectional width as air moves towards to the blower connection feature. The one or more baffles may be a connection layer or may be in addition to a connection layer.

The blower functions to push air, pull air, or both. The blower may be movable with the cushion, the plenum, or both as an occupant sits on the cushion or leaves the cushion. The blower may be an axial fan. Preferably, the blower may be a radial fan. The blower may include one or more impellers that move air through the blower, the blower housing, the plenum, or a combination thereof. The blower includes an inlet and an outlet. The inlet may be on the bottom side or the top side. Preferably, the inlet is in the bottom side of the blower. The inlet or the outlet is connected to the plenum via the attachment ring, a clip, a blower connection feature, or a combination thereof so that air may be pushed or pulled into the plenum. The blower may be connected to a bottom layer of the plenum by one or more flanges. The inlet and outlet may allow air to move into and out of the housing.

The blower connection feature may function to create an air seal between the blower and bottom layer. The blower connection feature may be shaped like a funnel, cylinder, or combination thereof. The blower connection feature may include a flange, be a flange, or both that a blower connects. The blower connection feature includes a flange, a concave wall, or both. Preferably, the blower connection feature is one or more fasteners that connect a blower to the plenum. The blower connection feature may be a threaded member that extends through a portion of a housing of a blower and into the plenum. The blower connection feature may connect the blower to a bottom layer of the plenum so that the blower is aligned with the connection recess. The blower connection feature may suspend the blower from the plenum. The blower connection feature may function to direct air to the open space and further to the cushion holes.

The housing (e.g., blower housing) functions to connect the blower within a system, direct air to a predetermined location, or both. The housing may connect the blower to a seat, a cushion, a frame, or a combination thereof. The housing may be rigid. The housing may be flexible. The housing may include rigid regions and flexible regions. The housing may include one or more integral parts (e.g., a part that is formed with the housing) that connect the housing, the blower, or both to a cushion, a plenum, or both. The blower housing may be connected to the bottom layer of the plenum. The blower housing may include one or more housing connectors that are in contact with the concave wall. The housing may include parts that are added to the housing after the housing is formed and the parts may assist in connecting the housing, the blower, or both to the cushion, a plenum, or both. The housing may include one or more parts (e.g., clips, eyelets, or bands).

The one or more housing connectors function to prevent movement of the blower relative to the plenum. The one or more housing connectors may align the blower with the connection recess. The one or more housing connectors may space the blower apart from the plenum. The one or more housing connectors may be an extension of the housing. The one or more housing connectors may be located between the plenum and the housing. The one or more housing connectors contact a flange and prevent lateral movement of the blower relative to the bottom layer, the flange, or both. The one or more housing connectors may maintain the blower and the plenum relative to the cushion.

The one or more connection features of the blower function to connect a blower directly to the plenum. The one or more connection features may be an integral part of the housing. The one or more connection features and the housing may be formed at the same time so that the one or more connection features and the housing are connected together. The one or more connection features may be discrete from the housing. The one or more connection features may be cantilever and extend from the housing. The one or more connection features may be movable about a pivot point. The one or more connection features may be fixed (i.e., free of movement). The one or more connection features may be hook shaped, "J" shaped, or both. The one or more connection features may have a channel that locks the connection features to a plenum. The one or more connection features may have an open end and a closed end. The open end may receive a support that extends into the connection features and is locked within the closed end of the connection features. The one or more connection features may include a lock that prevents a support from being removed from the connection features.

The one or more cushions may function to support an occupant, a conditioning system, or both. The one or more cushions may extend over a bottom or a back of a frame to form a portion of a vehicle seat. The one or more cushions may extend over all or a portion of a distribution system. The one or more cushions may be made of an open cell foam, a closed cell foam, or both. The one or more cushions may be located between a trim layer and a frame. The one or more cushions may be located between an occupant and a conditioning system, a plenum, a blower, or a combination thereof. The cushion may include one or more supports, one or more seat suspensions, or both that assist in connecting a plenum, a blower, or both to the cushion. One or more cushions of the seat may include ventilation, active cooling, active heating, or a combination thereof. The seat may include one or more air movers (i.e., blower) in fluid connection to the one or cushions so that air may be blown onto the user or so that air may be pulled away from the user. The cushion may be connected to or part of a conditioning system, support, a seat suspension, or a combination thereof. The cushion may be a back cushion, a seat cushion, or both. The cushion may be made of foam. The cushion may be located above suspension, a support, or both. The cushion may have a forward surface that an occupant contacts and a rear side or "b" side. The cushion may have cushion holes that extend from a forward side to a rear side of a cushion.

The cushion holes may allow fluid to transport between a forward surface and a rear side of the cushion. The cushion holes may have a cross-section that increases or decreases between the forward side and the rear side. The cushion holes may have a constant cross-section from the forward side and the rear side. The cushion holes may align with an open space of the plenum. The cushion holes may be located in a body of the cushion, a bolster of a cushion, a head rest, or a combination thereof.

The body of the cushion may function to support an occupant. The body of the cushion may be a central portion of the cushion. A body of a seat may be located below an occupant's butt, thighs, or both. A body or a backrest may be located behind a back of an occupant. The body may include a bolster on one or more sides.

The bolsters of the cushion may be an area of a cushion located outside of the body. The bolsters may be a periphery of the cushion. The bolsters may contact an outside of a leg, an arm, or both. The bolsters may extend out of a plane from the body of the cushion so that the bolsters assist in retaining an occupant within a vehicle seat.

The rear of the cushion may be in communication with the distribution system, the plenum, or both. The rear may be covered by the plenum. The rear of the cushion and the plenum may form an open space. The rear of the cushion may include one or more cushion holes. The rear of the cushion may be supported by the plenum, the seat suspension, or both.

The seat suspension may movably support the plenum and the cushion. The seat suspension may be spaced apart from the cushion by the plenum. The seat suspension be connected to a support, the vehicle, or both. The seat suspension may be wires, springs, flexible materials, or a combination thereof that support the cushion relative to the seat support.

The seat suspension may be static. The seat suspension may be movable or have movable pieces or portions. The seat suspension may be adjustable so that the seat suspension may extend the leg regions of a cushion, arch the lumbar, massage an occupant, or a combination thereof. The seat suspension may be connected to one or more supports. The one or more supports may connect to a vehicle, a floor, a static member, or a combination thereof so that the seat and occupant may be supported.

The process may include one or more of the following steps. The plenum may be attached to the cushion. The blower may be connected to the plenum. The plenum, the blower, or both may be connected to the seat suspension. The cushion may be applied over the plenum after the plenum is connected to the blower, the seat suspension, or both.

The conditioning system function to provide comfort to an occupant. The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may provide conditioning via conduction, convention, evaporative cooling, or a combination thereof. For example, the condition system may provide conductive conditioning by contact being formed between an occupant and the conditioning system. The contact may be direct contact between a heater, a thermoelectric, a conditioned trim surface, a trim surface, or a combination thereof. Preferably, the contact is indirect contact between the occupant and the conditioning element (e.g., heater, thermoelectric). The contact may be with a trim layer that is conditioned. For example, the convection conditioning may be by air being directly moved towards or away from an occupant, along a surface in contact with an occupant, or both. Convective conditioning may be done by moving air from the seat into contact with the occupant, from the occupant into the seat, or along a structure that is heated or cooled. In another example, the evaporative cooling may be moving moist air away from an occupant so that evaporation is facilitated causing conditioning. The conditioning system may be located between two layers of the seat. The conditioning system may be part of a trim layer (e.g., cloth, leather, synthetic leather, or the like). Preferably, the insert of the conditioning system is connected to and becomes part of the trim layer, cushion, or both. For example, during installation of the trim layer the insert is installed without a need for separate steps of installing the insert and the trim layer. The insert may be located proximate to a cushion or backrest (e.g., a foam support for the user). The insert may reside above all or a portion above the cushion, below the cushion, or both. Preferably, the insert is substantially entirely located above the cushion. The insert may be located within a recess in a cushion. The insert may be connected to the cushion by an adhesive, peel and stick, hog rings, or a combination thereof. The cushion may be part of the monolithic structure of the insert (i.e., the insert and cushion may be formed at the same time). the A portion of the conditioning system (e.g., insert) may be located above the cushion and a portion of the conditioning system (e.g., blower, shield, connection insert, or a combination thereof) may be located below the cushion. The present conditioning system is particularly attractive for use in combination with a conditioned seat (e.g., a ventilated, actively cooled (such as by use of a thermoelectric device or module), or actively heated seat). The conditioning system may be integrated with the seat cover by way of sewing, gluing, other methods, a friction fit, being located between two static layers, or a combination thereof. The conditioning system may include one or more blowers and one or more inserts (i.e., ventilated trim bags); one or more heaters, one or more thermoelectric devices, or a combination thereof.

The one or more thermoelectric devices may function to heat a fluid, heat a surface, cool a fluid, cool a surface, or a combination thereof. Each thermoelectric device may include a first side and a second side. The first side may be hot, and the second side may be cool or vice versa. The first side and second side may be switched between heat and cool. The thermoelectric device may provide conductive cooling, conductive heating, convective heating, convective cooling, or a combination thereof. The one or more thermoelectric devices may be in direct contact with a trim layer, a conditioned trim surface, or a both so that an occupant may be heated, cooled, or both via conduction. For example, if conductive cooling is being used at a first side then the heat produced on the second side is wasted by air being flowed across the second side. The thermoelectric device may include one side located in an inlet fluid stream and a second side located in an outlet fluid stream. For example, the insert may include a loop that moves air towards the occupant and then away from the occupant and the inlet of the loop may move conditioned air and the outlet of the loop may waste conditioning that is created by the second side of the thermoelectric device. The second side may be or include a heat sink. The second side may include fins. The second side may include a block of metal. The second side may include both an element that heats or cools and transfers waste thermal temperature into a fluid stream. The one or more thermoelectric devices may be located within the insert, blower, a channel extending between and connecting the blower and insert, the cushion, a monolithic part of the insert, or a combination thereof.

The conditioning system may include an active heating element (i.e., heater), an active cooling element, cooling through convection, cooling through conduction, heating through convection, heating through conduction, or a combination thereof. The active heating element may be a resistive heating element. The heating element may be a PTC heater, a resistive wire, or both. The heating element may be printed on the lattice on a top of the lattice or both. The heating element may be a printed metal, metal filled material, carbon filled material, or a combination thereof. The heating element may be a combination of a conductive material (e.g., metal (e.g., silver, copper, nickel)) and a resistive layer (e.g., carbon or a carbon filled material, graphite, graphene, nanotubes). The heating element may be selectively printed on portions of the insert so that when power is applied the insert generates heat. The heater may be a combination heater and sensor or only a sensor. A sensor may be printed in a similar manner to that of the heater. The heating element may generate heat upon current flowing through the heating element. The heater may be located on a cover layer of the insert. Preferably, the heater is located under a cover layer of the insert. The heater may be embedded within or on an insert. A portion of the insert may be located within the insert so that the heater is connected to the insert via a portion of the insert surrounding a portion of the heater. The heater may be located between a spacer layer and a cover layer. The heater may be an integral part of the insert. A portion of the insert may be formed around the heater. The heater may be connected to the cover layer, the insert, or both so that the heater may be free of movement relative to the cover layer, the insert, the trim layer, the cushion, or a combination thereof. The heater may be connected to the spacer, the cover layer or both by one or more connection materials. The heater may be located between two connection materials. The heater may be embedded in a connection material. The heater may be connected to a rear side of the cover layer by a connection layer that is sewing, and a connection layer may extend over a rear side of the heater and a forward layer of the spacer layer. The heater may be a single resistive wire that is applied to the cover layer, the spacer layer, the insert, or a combination thereof in a pattern. The conditioning system may be free of a resistive heater. For example, a thermoelectric device may be used to produce heat. The conditioning system may include one or more air movers that assist in distributing heat, cooling, or both.

A conditioned seat may include one or more air movers (air movers and blowers are used interchangeably herein). The one or more blowers may move air through one or more inserts that are located within or overlay the backrest cushion, seat cushion, or both. The one or more inserts may distribute air from the blowers. The one or more blowers may be an axial fan, a radial fan, or both. Preferably, the one or more blowers are a radial fan. The one or more blowers, the insert, the conditioning system, or a combination thereof may include a Thermoelectric Device (TED). The TED may heat air as it enters the blowers or as it leaves the blowers. The TED may cool air as the air enters the blowers or as the air leaves the blowers. The one or more blowers may include a heating device, a cooling device, or both (i.e., a thermoelectric device (TED)). The TED may be used to heat air and/or cool air that is blown onto the user. The blowers and TED may be placed in the seat or on the seat in many different configurations or in communication with a vehicle seat insert. For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes. The TED and heater may both produce heat at the same time; however, the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user. The air may be blown through the insert, a heater, perforations in the seat cover (e.g., trim layer), holes or perforations in a cushion, or a combination thereof. Some examples air permeable seats and heating device are U.S. Pat. Nos. 6,064,037 and 6,869, 140 both of which are incorporated by reference herein for all purposes. The TED may produce heat and the blower may blow the hot air while the heater contemporaneously heats the seat; thereby, providing both conduction heating and convection heating. One or more blowers may move air across the TED so that conditioned air is moved through a trim layer and into contact with an occupant.

The trim layer may function to support the insert, form a layer of the insert, or both. The trim layer may cover the cushion, the seat, or both. The trim layer may assist an insert in directing air to predetermined locations. The trim layer may be a fluid permeable material and may allow air to flow from the insert to an occupant or from an occupant into the insert. The trim layer may be made of or include a fluid impermeable material that includes holes or perforations that direct air to a predetermined location (e.g., leather, a polymer film layer on a cloth seat). The trim layer may be cloth, leather, a synthetic material, or a combination thereof. The trim layer may directly contact an occupant upon an occupant sitting within a vehicle seat. The trim layer may extend between an occupant and a cushion.

The cushion may function to support an occupant and provide conditioning to the occupant. The cushion may receive one or more inserts, one or more blowers, a conditioned trim surface, or a combination thereof. Each cushion may include one or more conditioned trim surfaces, bolsters, or both. The cushion may be free of bolsters. The cushion may be made of foam, an open cell foam, a closed cell foam, a polymer, a netting, a solid material, a material with porous holes, or a combination thereof. The cushion may be lattice. The cushion may be part of the monolithic structure of the insert (i.e., a single structure may be formed). The cushion may assist to distribute fluid to a user. The cushion may be located below or hold a portion of an insert. The cushion may assist in supporting the blower.

The blower functions to push air, pull air, or both. The blower may be movable with the cushion, the insert, or both as an occupant sits on the cushion or leaves the cushion. The blower may be an axial fan. Preferably, the blower may be a radial fan. The blower may include one or more impellers that move air through the blower, the blower housing, the insert, or a combination thereof. The blower includes an inlet and an outlet. The inlet may be on the bottom side or the top side. Preferably, the inlet is in the bottom side of the blower. The inlet may take air from a location near the occupant, the cabin, the engine compartment, from a thermoelectric device, or a combination thereof. The outlet may be located proximate to the occupant, expel air into the cabin, into the engine compartment, out of a vehicle, or a combination thereof. The blower may be connected to the cushion and free of direct connection with the insert. The blower may be connected via a shield, a connection insert, a foam connection, or a combination thereof. The blower may be located on a b-side of a vehicle seat, a cushion, or both. All or a portion of the blower may be located within an insert. The blower may be connected to the insert. The blower may be in fluid communication with the insert. The blower may be connected to the insert via a channel, a tail, or both. The inlet or the outlet of the blower may be connected to the insert via an attachment device.

The one or more attachment devices may function to connect a blower to the insert, cushion, or both. The one or more attachment devices may connect one or more blowers to a cushion, a frame of a seat, an insert, or a combination thereof. The blower may be suspended below the attachment device. The blower may be connected to the insert by a tail. The tail may extend from a side of the insert around a portion of the cushion so that the blower may be located distal from the insert. The blower may be connected to the insert via a monolithic part of the insert. The attachment device may be a monolithic part of the insert. For example, while the insert is being formed the attachment device or a housing for the blower may be formed. In another example, as the insert is being printed by a three-dimensional printer or additive manufacturing process the insert may be formed with an attachment device or may be formed around all or a portion of a blower. The one or more attachment devices may reside entirely below a cushion. The one or more attachment devices may reside entirely within a cushion or entirely within an insert. The one or more attachment devices may be located partially below a cushion and partially extend into a cushion. The one or more attachment devices may be located entirely within a through hole, channel, or both in the cushion. The one or more attachment devices may be rigid. The one or more attachment devices may be made of an air impermeable material. The one or more attachment devices may be pliable. The one or more attachment devices may elastically deform. The one or more attachment devices may move with the cushion, the insert, or both so that the insert is not felt by an occupant. The one or more attachment devices may mimic the stiffness of the cushion, the insert, or both so that the blower moves with the cushion, the insert, or both. The one or more attachment devices may be made of or include a polymer, plastic, a closed cell material, a plastic film, a polyester film, metal, or a combination thereof. The one or more attachment devices may be air impermeable. The one or more attachment devices may be flexible.

The conditioning system may be used in conjunction with an occupant sensor. An occupant sensor may be used on any seat in conjunction with a conditioning system. Preferably, an occupant senor may only be used on passenger seats. The occupant senor may be any type of occupant senor that senses a passenger in a vehicle seat. The occupant senor may be a membrane sensor, a capacitive sensor, a force sensor, a mass sensor, or a combination thereof. The occupant sensor may be a sensor wire. The occupant sensor may be in contact with the insert. Preferably, the occupant sensor is located on a top of a cushion. All or a portion of the occupant sensor may be located within an insert, incorporated into a monolithic insert, or both. The occupant sensor may be located between the trim layer and the insert. The occupant sensor may be connected to the trim layer or integrated into the trim layer and then insert connected below the occupant sensor. The occupant sensor may be connected to the insert and then both the insert and occupant sensor connected to the trim layer. For example, the occupant sensor may be placed on or in the insert while the insert is being manufactured and then additional portions of the insert may be printed around the occupant sensor. The occupant sensor may have a mirror shape to the shape of the insert.

The one or more inserts may function to create an open space between the trim layer and the cushion. The one or more inserts may prevent the trim layer and the cushion from being moved into contact. The one or more inserts may include one or more vent holes. The insert may be a mesh material. The insert may resist compression. The insert may form a space for air to move through the insert. One example of a preferred material of the insert may be a lattice structure that is three-dimensionally printed or additive manufacturing process, and the lattice structure varies over portions of the monolithic structure so that permeability, compression, size, material composition, or a combination thereof are varied. The insert may be one or more layers of material. The lattice may be a homogeneous layer. The lattice may be two homogeneous layers that are separated by a barrier. The lattice may be two or more non-homogeneous layers. The two or more non-homogeneous layers may be separated by one or more barrier layers. Homogeneousness or non-homogeneousness of the layers may be in composition, material make up, structure, orientation, openness, permeability, or a combination thereof. The lattice may have a constant permeability in an X-direction, Y-direction, x-direction, or a combination thereof. The lattice may have a lattice constant. The lattice constant may be permeability (e.g., thermal permeability), an elastic constant (e.g., compressibility), or both. The lattice constant may be constant in the x-direction (e.g., thickness), in plane (e.g., x- and y-directions), or both. The insert may include two layers of spacer layer. When two or more lattices are present one or both of the lattices may include one or more vent holes. The vent holes may extend through a first lattice layer, a second lattice layer, or both. The vent holes may extend from a rear surface to a forward surface of the insert so that the vent holes assist in directing fluid to a predetermined location. The vent holes may align with each other, vent holes in the trim layer, or both. A first lattice layer material may be stiffer than a second lattice layer of the insert. A first lattice layer of may extend under a second lattice layer and the second lattice layer may be softer than the first lattice layer so that the second lattice layer prevents an occupant from feeling components within the vehicle seat. A first lattice layer may be more pliable than a second lattice layer. The first lattice layer and the second lattice layer may have the same permeability. The first lattice layer may be a support layer. The second lattice layer may be a conditioned lattice. The insert (e.g., first lattice layer or second lattice layer) may have an air permeability of about 7000 L/dm$^2$/min; about 6000 L/dm$^2$/min; or about 5000 L/dm$^2$/min. The insert may have a permeability of about 5000 L/dm$^2$/min or less and the second spacer layer may have a permeability of about 3000 L/dm$^2$/min or less. The insert may have a permeability of about 500 L/dm$^2$/min or more, 1000 L/dm$^2$/min or more, or about 1500 L/dm$^2$/min or more. The second lattice layer may extend over the first lattice layer. The first lattice layer and the second lattice layer may be connected together, formed at the same time, formed during the same process, or a combination thereof. For example, the first lattice layer may be formed with a first material, a first geometric configuration, or both and the second lattice layer may be formed with a second material, a second geometric configuration, or both. The first lattice layer and the second lattice layer may be formed without having to stop a machine forming the insert. The second lattice layer may be less rigid, have less read through, be more compliable, or a combination thereof. The second lattice layer may provide comfort to an occupant, prevent an occupant from feeling a first lattice layer, or both. A permeability of a first lattice layer to a permeability of a second lattice layer may have a ratio of about 1:1 or more, about 1.2:1 or more, about 1.5:1 or more, about 1.75:1 or more, about 2:1 or more, or about 4:1 or less. The first lattice layer may be less permeable than then second lattice layer. The second lattice layer may be less permeable than the first lattice layer. The first lattice layer may have less open space than the lattice spacer layer or vice versa. Voids or openings in the second lattice layer may be larger than voids or openings in the first lattice layer. A first lattice layer may have more voids or openings than the second lattice layer. The insert may be an open cell foam. A second lattice layer may have smaller pores than a first lattice layer and the second lattice layer may have more pores than the second lattice layer. The insert, the first lattice layer, the second lattice layer, or a combination thereof may have a compression stress. The compression stress of the insert, the first lattice layer, the second lattice layer, or a combination thereof may be about 5 kPa or more, about 7 kPa or more, about 10 kPa or more. The compression stress of the insert, the first lattice layer, the second lattice layer, or a combination thereof may be about 20 kPa or less or about 15 kPa or less. The compression stress of the insert, the first lattice layer, the second lattice layer, or a combination thereof may vary by about ±2 or more, ±3 or more, or about ±4 or more. The compressibility of the first lattice layer may be about 2 kPa more than the second lattice layer. The compressibility of the first lattice layer may be about 3 kPa more than the second lattice layer. The compressibility of the first lattice layer may be about 4 kPa more than the second lattice layer. The first lattice layer may be thinner than the second lattice layer. The first lattice layer may be a same thickness as the second lattice layer. The first lattice layer may be thicker than the second lattice layer. The first lattice layer, the second lattice layer, or both may be a printed lattice structure. Preferably, the first lattice layer is a lattice structure that creates open space that air may pass through.

The insert may function to receive and distribute air. The insert may function to connect to the trim layer and distribute air to or from an occupant. The insert may function to maintain an open space when an occupant is located on the seat, on the insert, or both. The insert may include one or sealed edges (e.g., seams). The insert may include open edges. The insert may connect to the cushion. The insert may complete a shape of the cushion. The insert may connect to the cushion and form one or more structures of a cushion. For example, the cushion may be planar, and the insert may add contours, bolsters, a lumbar support, or a combination thereof. The insert when forming part of the cushion may increase the permeability to areas of a seat that may not have been traditionally conditioned. The insert may be free of a rear layer, a cover layer, or both. The insert may receive air from an air mover and distribute the air to predetermined locations. The insert may create an open space. The ventilated insert may resist crushing when an occupant sits in a vehicle seat. For example, the insert may not completely seal off and air may flow through an entire volume of the insert. The insert may be one portion and formed as one monolithic piece. The insert may be multiple insert portions. The insert may be one monolithic piece that is formed during one process (e.g., three-dimensional printing or additive manufacturing). The insert may be one monolithic piece that is formed of a plurality of different materials.

The insert may be made of one material and the structural configuration of the material may be adjusted throughout the insert so that one or more layers, regions, volumes, or a combination thereof are formed within the insert. The insert may include or be connected to a conditioned trim surface, bolsters, a lattice structure, a support lattice, conditioned lattice, an air gap volume, a conditioned volume, a barrier, an embedded structure, port, or a combination thereof.

The lattice may function to support an occupant while creating open spaces for a fluid to travel through so that an occupant may be conditioned (e.g., heated or cooled). The lattice may be an open cell structure. The lattice may be interconnected elements with voids located between the elements. The lattice may have an openness of about 50 percent or more, about 70 percent or more, about 80 percent or more, about 90 percent or more, about 92 percent or more, or even about 95 percent or more. The lattice may have an openness of about 100 percent or less, about 99 percent or less, about 98 percent or less, or about 97 percent or less (i.e., ±1 percent). The openness may be an amount of open space relative to an amount of material forming the voids. For example, if a structure has an openness of 90 percent when an area of the lattice structure is viewed 10 percent would be covered by material and 90 percent would be free of material. Similarly, if a volume was considered, 10 percent of the total volume would be filled with material and 90 percent would be located between the material or free of material. The lattice may have a repeatable pattern. The lattice may have a random pattern. The lattice may be geometric. The lattice may be non-geometric. The lattice may vary over an area, a region, a layer, a thickness, or a combination thereof. The two-dimensional shape of the lattice may be diamond, square, oval, round, hexagon, pentagon, decagon, octagon, star, or a combination thereof. A three-dimensional shape of the lattice may be a sphere, cube, cone, tetrahedron, cuboid, dodecahedron, icosahedron, octahedron, torus, pyramid, ellipsoid, hexagonal, pentagonal, a pentagonal pyramid, octagonal, or a combination thereof. The lattice may be made of one uniform type of material. The lattice may be made of a plurality of different types of material. The lattice may have different spacing, voids, permeability, or a combination thereof depending on desired fluid movement. The lattice may have solid components that entirely prevent fluid flow through regions or parts of the insert. The lattice may include a plurality of different types of lattice. Each type of lattice may provide a different function. Some lattice may support the occupant, attachment devices, blowers, embedded structures, heaters, or a combination thereof. The rails of the lattice may be made of or include, plastic, a polymer, an elastomer, styrene butadiene, latex, acrylonitrile butadiene styrene (ABS), polylactic acid (PLA), polyvinyl alcohol (PVA), polyethylene terephthalate (PET), polyethylene cotrimethylene terephthalate (PETT), high impact polystyrene (HIPS), polystyrene, nylon, wood filament, sandstone filament, metal, magnetic iron, conductive carbon, conductive polylactic acid, carbon fiber, thermoplastic elastomer (TPE), amphora 3D filament, epoxy, polycarbonate, glass filled polyamide, rubber, silicone, a reinforcement structure, fiber reinforcement, or a combination thereof. The lattice may be a composite of different material so that the lattice constant may vary from location to locate within the insert. For example, each layer may be formed of a different material or composite so that a non-homogeneous structure may be formed. The composites may be integrally connected together forming a monolithic structure. For example, the structure may be three-dimensionally printed and as each layer is being printed the composition of the materials may be changed so that each layer has a different lattice constant, or the lattice constant varies within a layer. The lattice may be a three-dimensional structure that is a combination of planar portions and connecting portions.

The planar portions function to form a top, bottom, sides, a support structure, a structure that rests on a cushion, is in contact with a trim layer, or a combination thereof. The planar portions may extend generally parallel to an opposing planar portion. The planar portions may extend parallel to a trim layer, a cushion, or both. The planar portions may extend within a single plane. The planar portions may be horizontal. The planar portions may support an occupant. There may be a plurality of planar portions. A first planar portion may be connected to a second planar portion. The first planar portion and the second planar portion may be generally parallel. The first planar portion and the second planar portion may be connected by one or more connecting portions. A plurality of planar portions may be connected together by a plurality of connecting portions. The lattice may include two planar portions and one connecting portion. The lattice may include three planar portions and two connecting portions.

The connecting portions may function to connect two planar portions. The connecting portions may extend vertically. The connecting portions may extend between two or more planes. The connecting portions may extend through one or more planes, two or more planes, three or more planes, or even four or more planes. The connecting portions may extend vertically. The connecting portions may extend at an angle relative to vertical, at an angle relative to horizontal, or both. The connecting portions may extend at an angle of about 0 degrees or more, 5 degrees or more, 10 degrees or more, 15 degrees or more, 25 degrees or more, 45 degrees or more, or even 60 degrees or more relative to vertical. The connecting portions may extend at an angle of about 90 degrees or less or about 75 degrees or less relative to vertical. The connecting portion may have a plurality of interconnecting rails that form the lattice. The rails may be a solid structure with air located between opposing rails. The rails may be the portion of the connecting portion to provide support. The rails may be the portion of the connecting portion to move, expand, contract, permit air to move through, or a combination thereof. The rails may be made of the same material as the planar portion to create the lattice structure. The rails may be located in one section (e.g., a rail may extend within the support lattice or the conditioned lattice but not both). The lattice may have a support lattice and a conditioned lattice.

The support lattice may function to provide a support region between the cushion and the conditioned lattice. The support lattice may be open and allow air to freely flow to the conditioned lattice. The support lattice may have a higher degree of openness then the conditioned lattice. The openness of the support lattice may be greater than the conditioned lattice by about 5 percent or more, about 10 percent or more, about 15 percent or more, about 20 percent or more, about 25 percent or more, or even about 30 percent or more (e.g., ±1 percent) the openness of the conditioned lattice. The openness of the support lattice may be greater than the conditioned lattice by about 50 percent or less, about 40 percent or less, or about 35 percent or less. The openness may be the amount of area exposed between the rails of the lattice. For example, the openness may be measured by taking 1 $m^2$ of material and placing the material in water to see which material displaces more water. The support lattice may displace less water than the conditioned lattice (e.g., 10 percent less) and thus be 10 percent more open. The support lattice may have a lower spring constant than that of the conditioned lattice. For example, the support lattice may compress more than the conditioned lattice since fluid may not be passing through the support lattice or because the support lattice is more open. The support lattice may form a barrier between the cushion and the conditioned lattice so that thermal energy is not passed to the cushion. The support lattice may prevent read through. For example, the support lattice may deform and prevent a wire, an embedded structure, a massager (when off), a lumbar support (when off), a vehicle frame, a blower, blower vibration, a housing, or a combination thereof from being felt by an occupant when an occupant is seated within the vehicle seat. The support lattice may surround all or a portion of an embedded structure (e.g., any structure that is added within the insert and the insert is formed around all or a portion of the structure so that all or a portion of the structure is located within the insert). The support lattice may extend along a first side of an embedded structure and the conditioned lattice may extend along a second side of an embedded structure. The embedded structure may be located within or on the conditioned lattice and the support lattice may deform to prevent an occupant from feeling the embedded structure. The support lattice may extend from the cushion to the trim layer. Preferably, regions of the support lattice may extend from the cushion to the trim layer and regions of the support lattice may be covered by conditioned lattice. The support lattice may be free of contact with the trim layer. Portions of the support lattice may contact the trim layer and portions of the support lattice may be free of contact with the trim layer. The support lattice may be located between the conditioned lattice and the cushion. The support lattice may be formed in a shape. The support lattice may include "L" shaped portions, "I" shaped portions, "T" shaped portions, almond shaped portions, pear shaped portions, a support lattice may be located between two conditioned lattice structures. The support lattice may be complementary in shape to the conditioned lattice. The conditioned lattice may be interspersed within the conditioned lattice. For example, the conditioned lattice may be generally "U" shaped, and the support lattice may surround the conditioned lattice so that the lattice is generally square or rectangular in shape. The support lattice may extend along a bottom, a side, an edge, a top, or a combination thereof of the conditioned lattice. For example, the support lattice may extend along a bottom, a first side, a second side, a third side, and a fourth side of the conditioned lattice so that the insert is a geometric shape. Air may flow through the support lattice. Air may flow through a portion of a layer of support lattice and then to a conditioned lattice where the air is distributed. The support lattice may be free of conditioned air passing therethrough. The support lattice and the conditioned lattice may be in contact and the support lattice may be interspersed throughout the conditioned lattice. The support lattice and the conditioned lattice may be separated by a barrier.

The conditioned lattice may function to provide conditioning to an occupant. The conditioned lattice may provide convective conditioning, conductive conditioning, pull conditioning, push conditioning, conditioning from a thermoelectric device, or a combination thereof. The conditioned lattice may allow air to flow therethrough to desired regions. The conditioned lattice may create an open space for fluid to flow through. The conditioned lattice may be located over the support lattice. The conditioned lattice may be more rigid than the support lattice. The conditioned lattice may be stiffer, less open, less deformable, or a combination thereof than the support lattice. The support lattice, when an occupant is located thereon may compress but may maintain open space so that fluid can flow through the conditioned lattice. The conditioned lattice may form a bolster. The conditioned lattice may permit air to enter the insert, exit the insert, or both. The conditioned lattice may extend through a through hole in the cushion. The conditioned lattice may be in communication with a blower. The conditioned lattice may include one or more embedded structure. The conditioned lattice may be located over, under, along, surround, or a combination thereof, one or more embedded structures or preferably a plurality of embedded structures. The conditioned lattice may surround a portion of the support lattice. For example, layers of conditioned lattice may sandwich the support lattice. The conditioned lattice may create channels within the insert for air to flow through. The conditioned lattice, the support lattice, or both may have a shape that is honeycomb, corrugation, pyramidal, tetrahedral, 3D-Kagome, diamond, square, diamond collinear, square collinear, or a combination thereof. The conditioned lattice and the support lattice may be separated by a barrier.

The barrier may function to prevent fluid from moving from one location to another location. The barrier may prevent air from moving from the conditioned lattice into the support lattice or vice versa. Preferably, the barrier may extend between the conditioned lattice and the support lattice. The barrier may retain substantially all of the fluid within the conditioned lattice. The barrier may be made of the same material as the lattice, the conditioned lattice, the support lattice, or a combination thereof. The barrier may be any of the materials discussed herein but formed so that the barrier is free of holes, perforations, voids, or a combination thereof. The barrier may be made of a different material that the support lattice, the conditioned lattice, or both. The barrier may be formed by changing materials from the support lattice or the conditioned lattice. The barrier may be different than both the support lattice and the conditioned lattice. The barrier may be a planar portion of the insert. The barrier may extend within one or more, two or more, or even three or more planes. The barrier may be formed when the support lattice, the conditioned lattice, or both are formed. The barrier may be a solid wall or layer that prevents fluid penetration. The barrier may be free of a lattice structure. The barrier may both physically separate two or more layers or lattices and pneumatically separate two or more layers or lattices. The barrier may seal all or a portion of the insert. The barrier may be free of holes, open space, perforations, or both. The barrier may maintain a space between an air gap volume and a conditioned volume.

The one or more air gap volumes may function to create an insulating layer between the conditioned volume and structure of the vehicle seat. The air gap volume may function to reduce a total volume that is conditioned so that less volume is heated or cooled. The air gap volume may result in a faster thermal response (when compared to a traditional volume of space that provides conditioning to an occupant). The air gap volume may be free of air flow. The air gap volume may not be in communication with a blower or a fan. The air gap volume may be fluidly separate from a conditioned volume. The air gap volume may be cover on one or more sides or surfaces by a barrier layer that prevents air from entering into the air gap volume. The air gap volume may be encapsulated by a barrier layer. The one or more air gap volumes may reduce an area or volume that is conditioned. The one or more air gap volumes may reduce an area or volume that acts as a heat sink or cold sink so that more conditioning is moved into contact with an occupant. The air gap volumes may be located under, over, along, between, or a combination thereof of the one or more conditioned volumes. The one or more air gap volumes may be about 10 percent or more, 20 percent or more, 30 percent or more, 40 percent or more, or even 50 percent or more of the total volume of the insert. The air gap volumes may be about 95 percent or less, about 85 percent or less, about 75 percent or less or about 65 percent or less of the total volume of the insert. The air gap volume may surround a channel, include a channel, include a thermoelectric, include an embedded structure, or a combination thereof. The air gap volume may be in direct contact with a conditioned volume.

The conditioned volume may function to provide conditioning to an occupant, cool an occupant, heat an occupant, or a combination thereof. The conditioned volume and the air gap volume may be about 100 percent of the insert (i.e., within 2 percent). The conditioned volume and the air gap volume minus the barrier and the embedded structure may equal 100 percent. The conditioned volume may be about 10 percent or more, about 20 percent or more, about 30 percent or more, about 40 percent or more, or even about 50 percent or more of the total volume of the insert. The conditioned volume may be about 95 percent or less, about 85 percent or less, about 75 percent or less, about 65 percent or less, or about 55 percent or less of the total volume of the insert. The conditioned volume may be a volume that air flows through. Preferably, the conditioned volume may be a volume that conditioned air flows through. The conditioned volume may extend along the trim layer to provide conductive conditioning (e.g., heating or cooling) to the trim layer. The conditioned layer may be pear shaped, tear dropped shape, or both. The conditioned layer may have a greater width at the trim layer than a location distal from the trim layer. The conditioned volume may be shaped to be inserted into a cushion and retained in place. For example, the conditioned volume may be "T" shaped so that the conditioned volume is prevented from being moved through the cushion. The conditioned volume may extend along a portion of the trim layer and may push or pull conditioning through the trim layer so that conditioning is provided. The conditioned volume may be free of direct contact with a cushion, a seat frame, or both. The conditioned volume may be less open than the air gap volume. The conditioned volume may be more rigid than the air gap volume. The conditioned volume may be in communication with, located above, located under, surround, or a combination thereof the heating wires, barrier, blower, embedded structures, a port, or a combination thereof. The conditioned volume may include or be located proximate to one or more conditioned trim surfaces.

The one or more conditioned trim surfaces may function to provide conductive conditioning to an occupant. The one or more conditioned trim surfaces may be conditioned (e.g., heated or cooled) by a thermoelectric, a heating wire, conditioned air, or a combination thereof so that the conditioned trim surface provides conductive conditioning. The conductive trim surface may be a portion of a normal trim surface that is conditioned, and the occupant comes into contact with. The conductive trim surface may be a metal, a foil, a metalized material, or a combination thereof that conductively provides conditioning to an occupant. The conditioned trim surface may be located within the trim layer. The conditioned trim surface may be located on a rear surface of the trim layer. The conditioned trim surface may include metal, a conductive material, or both. The conditioned trim surface may act as a heat sink to provide cooling conditioning. The one or more conditioned trim surfaces may be in direct contact with a thermoelectric. Preferably, the one or more conditioned trim surfaces are in direct contact with a first side of a thermoelectric. The one or more conditioned trim surfaces may provide passive conditioning (e.g., the conditioned trim surfaces may not be turned on and off). The insert may have a single conditioned trim surface that extends along an entire occupant contact region. The insert may have a plurality of conditioned trim surfaces and the plurality of conditioned trim surfaces may be located proximate to each other to provide conditioning in desired regions (e.g., under legs, a buttock, along a spine, along the lower back). The one or more conditioned trim surfaces may work in conjunction with one or more embedded structures.

The one or more embedded structures may function to provide conditioning, massage, support, comfort, or a combination thereof. The one or more embedded structures may be located within the insert, along a top region of the insert, or both. The one or more embedded structures may have a portion that is covered by or included within the insert. For example, when the lattice is being formed, an embedded structure may be located within or on the partially formed insert and then the insert may continue to be formed over, around, along, adjacent to, or a combination thereof the embedded structures. The embedded structures may move the conditioned lattice, the conditioned volume, or both. The embedded structures may condition the conditioned lattice, the conditioned volume, or both. The embedded structures may be pneumatically operated, electrically operated, hydraulically operated, or a combination thereof. The embedded structures may be a resistive heating wire, a lumbar support, a massager, a blower, a thermoelectric, bladder, a bellow, a port, an air bladder, a hydraulic bladder, a mechanical mechanism, a sensor, a biometric sensor (e.g., heart rate monitor), a ball massager, a rail massager, a massager that moves along the occupant, a pod (e.g., a mechanism that senses or massages), an occupant sensor, or a combination thereof. Each insert may include a plurality of embedded structures. For example, the insert may include a heating wire, a thermoelectric, a lumbar support and massagers. The embedded structures may expand and contract. The embedded structures may move, rotate, have a part that moves, have a part that rotates, or a combination thereof. The embedded structures may have a portion that is located within the insert. The embedded structures may be connected to the insert by a portion of the insert being formed over the embedded structure. The embedded structure may be connected to or in communication with one or more ports.

The one or more ports may function to operate or control one or more of the embedded structures. Each embedded structure may include its own port. The embedded structures may be connected in series. The ports may extend from a location external of the insert to a location internal of the insert. The ports may provide electricity, a signal, fluid, air, or a combination thereof. The one or more ports may allow a user to operate each of the embedded structures. The one or more ports may be or include a tube, a wire, or both.

The conditioning system taught herein may be created by a method. The method may include a step of connecting an insert to a cushion. Connecting a tube or wire to a port. Inserting a tube or wire in a port. Connecting a conditioned trim surface to an insert, a trim layer, or both. Placing the conditioned trim surface in communication with a first side of a thermoelectric. Connecting the insert to a blower. Connecting the insert, a blower, or both to one or more channels. Connecting one or more thermoelectric devices to a blower, a channel, a conditioned trim surface, or a combination thereof. The conditioning system may include one or more inserts.

The insert may be formed by a three-dimensional printing process or an additive manufacturing process. A support lattice may be formed then a conditioned lattice may be formed. The support lattice and conditioned lattice may be formed in parallel, in series, at the same time, or a combination thereof. The method may include a step of changing materials. The method may include a step of changing geometric shapes or configurations. The insert may have a support lattice with a first structure and then a conditioned lattice with a second structure. A barrier layer may be formed in parallel with the support lattice, the conditioning lattice, or both. The barrier layer may formed in series with the support lattice, the conditioning lattice, or both. The method may include a step of printing a first structure with a first head, printing a second structure with a second head, and printing a third structure with a third head. One head may be used to create each structure. Material may be changed as the heads move between structures or layers without an interruption in printing. Two or more materials may be mixed together to form one structure and then one material may be used to form a second structure. The method may include a step of applying a first material and then applying a second material (or even third, fourth, or fifth materials). The method may include a step of changing materials within a layer of lattice (e.g., support lattice, conditioned lattice). For example, the lattice may become more rigid as the lattice approaches the trim layer. A density of rods within a layer of lattice may be varied over a thickness or region of the insert. One or more embedded structures may be placed on or in a partially formed insert. The embedded structures may be partially or fully covered by lattice so that the embedded structures may be connected to the insert. The embedded structures may be connected to the insert by extending material on or over a portion of the embedded structure. The embedded structures may be covered by lattice so that the embedded structures may move. The insert may be one monolithic part that is formed by continuous operation of a three-dimensional printer without operation of the printer stopping. Operation of the printer may be stopped before completion of the part and then resumed to continue to create the monolithic part. The insert may be formed via additive manufacture. The insert may be formed with any of the materials discussed herein for the portions of the insert. The insert may have multiple layers or lattices with different permeabilities and resistances. The insert may be formed so that a portion of the insert thermally separates the insert a cushion or a seat. The method may include a step of printing a heater, a sensor, or both. The method may include a step of changing materials, changing composites, or both. The method may include a step of printing a metallic material, a metal, a carbon material, or a combination thereof.

FIG. 1 illustrates a side view of a portion of a vehicle seat 1 that includes an air distribution system 48 and a cushion 20. The cushion 20 includes a support portion 22 or a-side, a rear side 24 or b-side, and one or more cushion holes 26 that extend through a thickness of the cushion 20. The air distribution system 48 includes a plenum 50 that is attached to, in contact with, or rests upon the bottom or b-side 24 of the cushion, to a seat suspension 28 of the seat 1, or a seat support 19 that is connected to a vehicle. The plenum 50 comprises one or more ventilation holes 54 that are at least partially aligned with or in fluid communication with the one or more cushion holes 26. The air distribution system 48 includes a blower 80 is connected to the plenum 50. During use, the blower 80 is configured to move air between an occupant in the seat 1 or cushion 20 and the blower 80 via the plenum 50, the one or more ventilation holes 54, and the one or more cushion holes 26.

Figure 2:
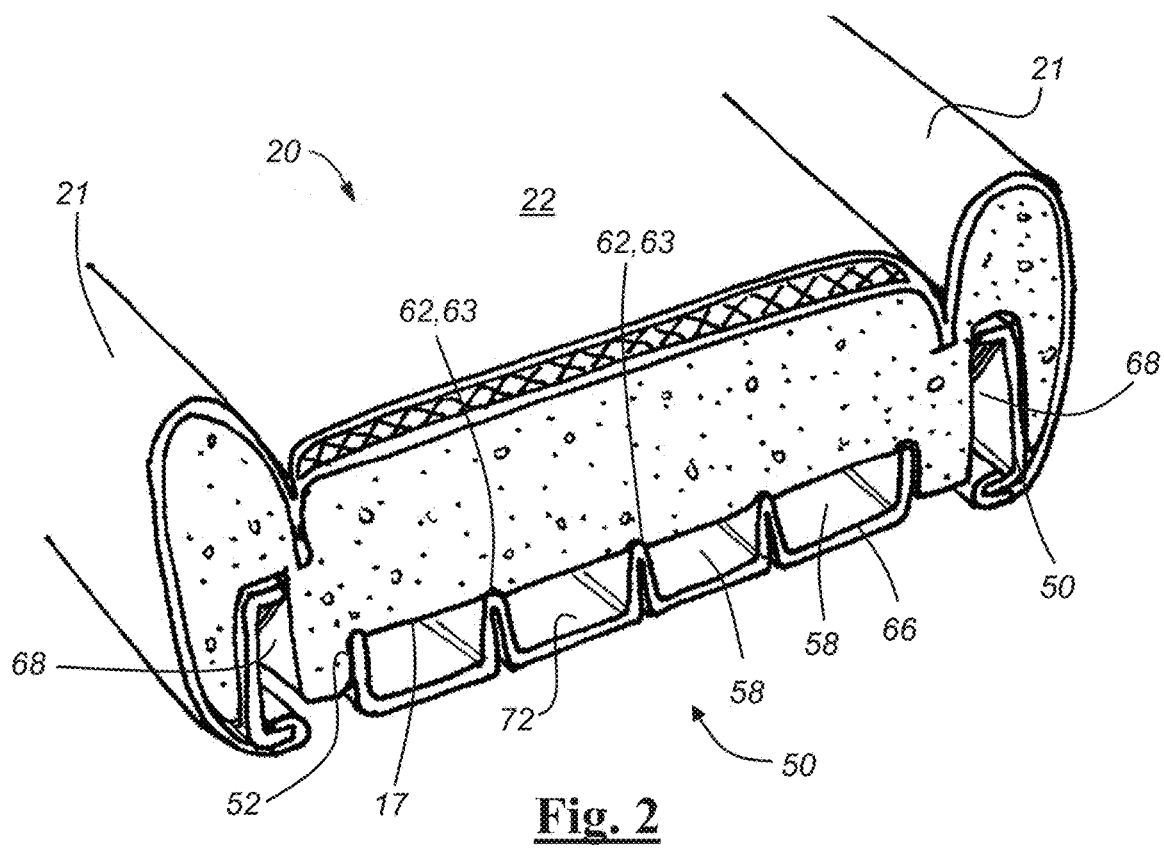
FIG. 2 is cross-sectional view of a cushion of a vehicle seat and a distribution system connected to the vehicle seat.

FIG. 2 is a cross-sectional view of a cushion 20 and plenum 50. The cushion 20 includes a support portion 22 and bolsters 21. The plenum 50 includes a body 66 and extensions 68. The plenum 50 includes a peripheral wall 52 that extends at least partially around a perimeter of the body 66 and extends in a direction away from a bottom wall 72 of the plenum 50 towards a bottom surface 17 of the cushion 20. The extensions 68 extend from each side or edge of the body 66. The plenum 50 includes one or more baffles 62 located within the peripheral wall 52. Each of the baffles 62 have a top surface 63, a portion of which is in contact with a bottom surface 17 of the cushion 20 to create an open space 58 between the bottom wall 72 of the plenum 50 and the bottom surface 17 the cushion 20 so that fluid can move between the plenum 50 and cushion 20. The baffles 62 have a tapered portion 65, illustrated in FIG. 3, that are not in contact with or free of contact with the bottom surface 17 of the cushion 20.

Figure 3:
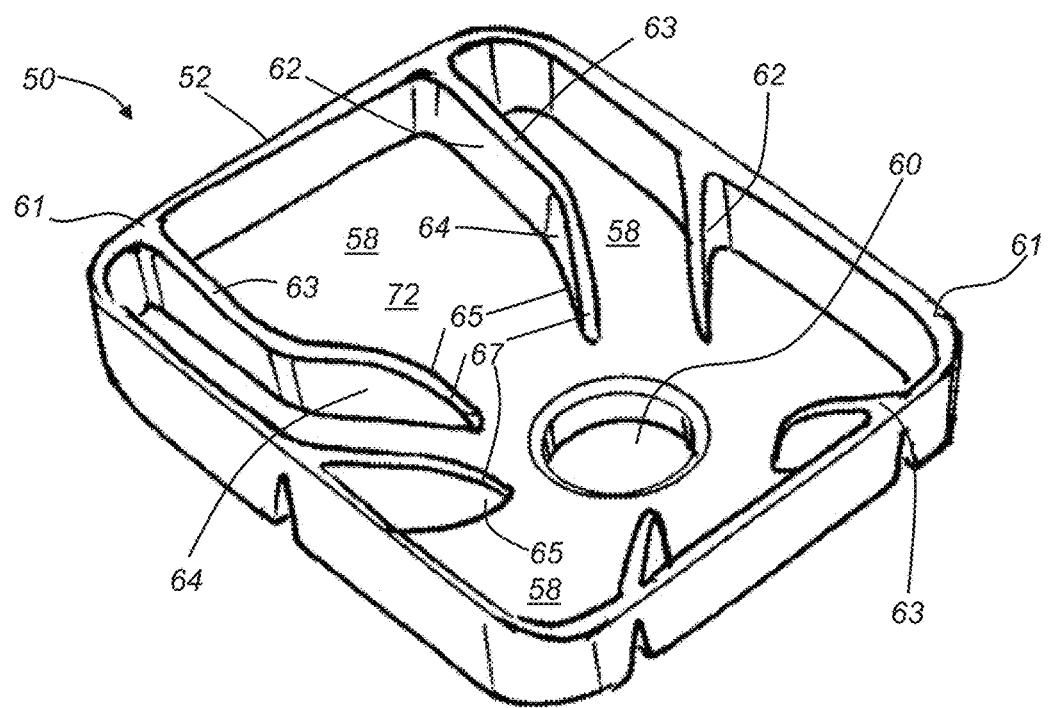
FIG. 3 a perspective view of a plenum.

FIG. 3 is a perspective view of a plenum 50. The plenum 50 includes a perimeter or peripheral wall 52 that extends around a perimeter of the bottom wall 72. A plurality of baffles 62 or fins extend away from the bottom wall 72 and extend inwardly from the peripheral wall 52 towards a connection recess 60 for connecting to a blower or air mover to the plenum 50. The baffles 62 include a taper 65 at one end that is not connected to the peripheral wall 52 that tapers in a direction of a connection recess 60 for receiving a blower (not shown). The baffles 62 have a curved or bent portion 64 that curves or bends towards the connection recess 60 to assist with distributing air flow to or from the air mover connected to the recess 60. The distal end of the taper 65 of the baffles 62 is spaced apart from the connection recess 60 meaning that there is a gap between the connection recess 60 and where the distal end of the taper 65 terminates. The baffles 62 have a top surface 63 in a region that is not tapered or does not include the taper 65. The peripheral wall 52 has a top surface 61. The top surfaces 61, 63 of the peripheral wall 52 and baffles 62 are configured to contact or connect to a bottom surface 17 of the cushion 22 thereby enclosing the plenum 50 and the one or more open spaces 58. The top surface 67 of the baffles 62 in a region of the taper 65 is spaced apart from or free of contacting the bottom surface 17 of the cushion 22. Each of the open spaces 58 are defined between the bottom surface 17 of the cushion, the bottom wall 58 of the plenum the peripheral wall 52 and one or more baffles 62.

Figure 4:
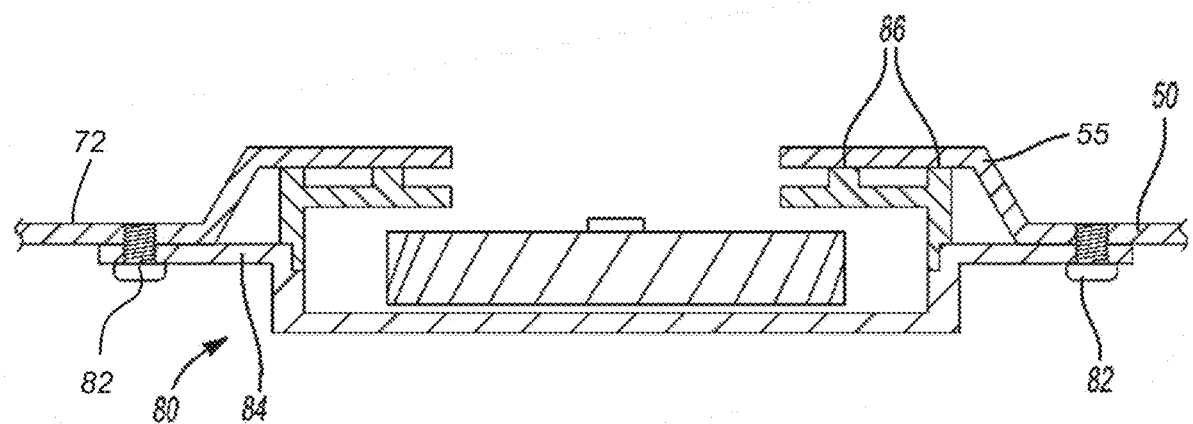
FIG. 4 is a cross-sectional view of a blower connected to a plenum.

FIG. 4 illustrates a blower 80 connected to a wall of a plenum 50. The plenum 50 includes a flange 55 that receives or connects with the blower 80 so that a portion or all of blower 80 is recessed with respect to the lower wall 72 and is thus low-profile or inset into the plenum 50. The blower 80 includes a blower housing 84 connected to the plenum 50 by blower connection features 82. The blower housing 84 also includes a housing connector 86 that contacts the plenum 50 and as shown the flange 55.

Figure 5:
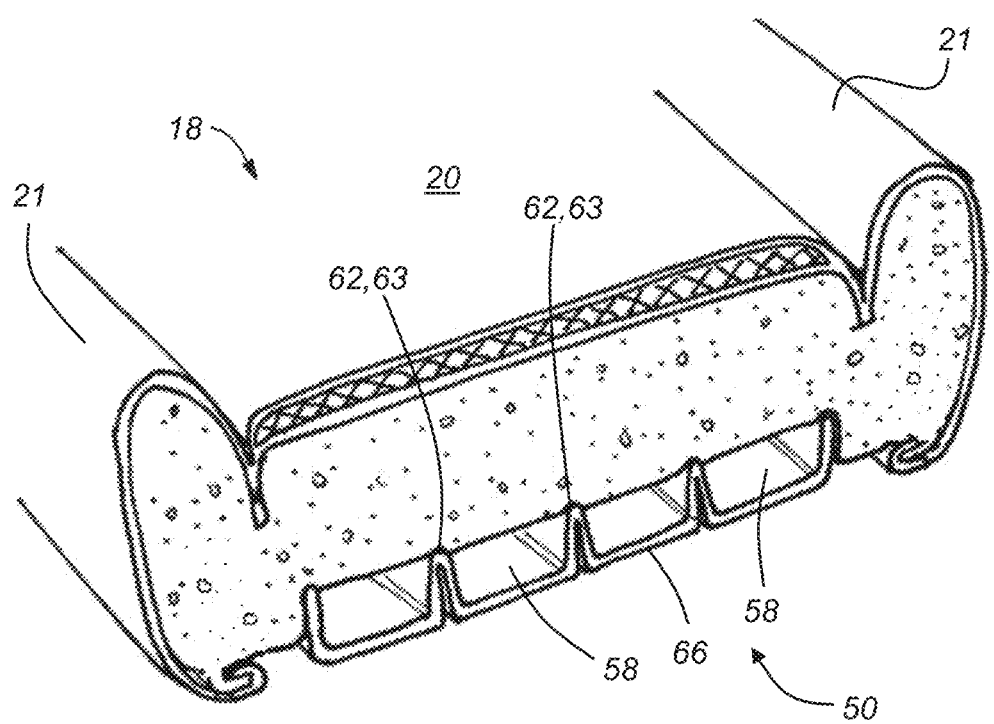
FIG. 5 is cross-sectional view of a cushion of a vehicle seat and a distribution system connected to the vehicle seat.

FIG. 5 is a cross-sectional view of a cushion 20 of a vehicle seat and plenum 50. The cushion 20 includes a body portion 20 and bolsters 21. The plenum 50 includes a body 66 that creates an open space 58. As shown, the plenum 50 includes baffles 62 that have a top surface 63 that are in contact with the cushion 20 and create an open space 58 so that fluid can move between the plenum 50 and cushion 20.

Figure 6:
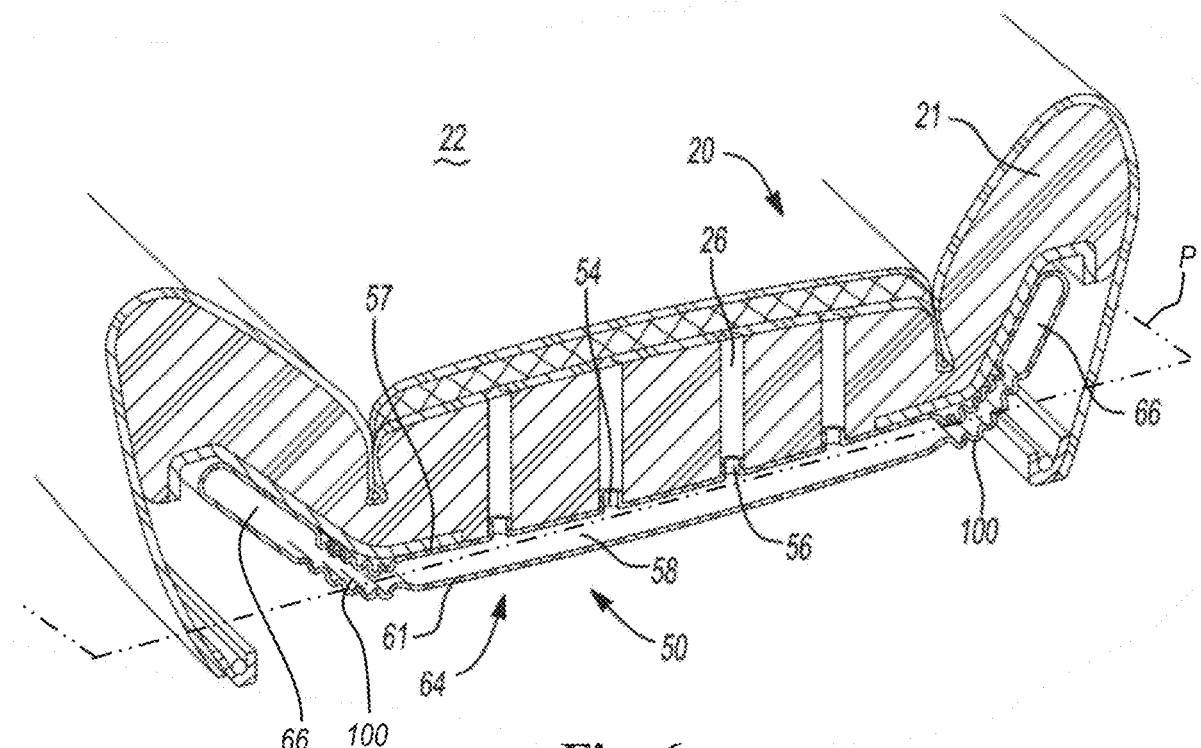
FIG. 6 is cross-sectional view of a cushion of a vehicle seat and a distribution system connected to the vehicle seat.

FIG. 6 is a cross-sectional perspective view of a plenum 50 and cushion 20. The cushion 20 has a support portion 22 and a bolster portion 21. The plenum 50 includes a body 64 and extensions 66 that are connected to the body 64 by flexible regions 100. The body 64 is located within a plane P. The extensions 66 are movable out of the plane P (i.e., above the plane P in FIG. 2) of the body 64 via the flexible regions 100, thereby providing for allowing the plenum 50 to adapt to the different contours and regions of the cushion 20, like the support portion 22 and the bolster portion 21.

The plenum 50 includes a top layer or surface 57 and a bottom layer or surface 61 with an open space 58 defined therebetween to promote movement of fluid through the ventilation holes 54 defined in the body 64 and/or extensions 66 that are in communication with the cushion holes 26 via the ducts 56.

Figure 7:
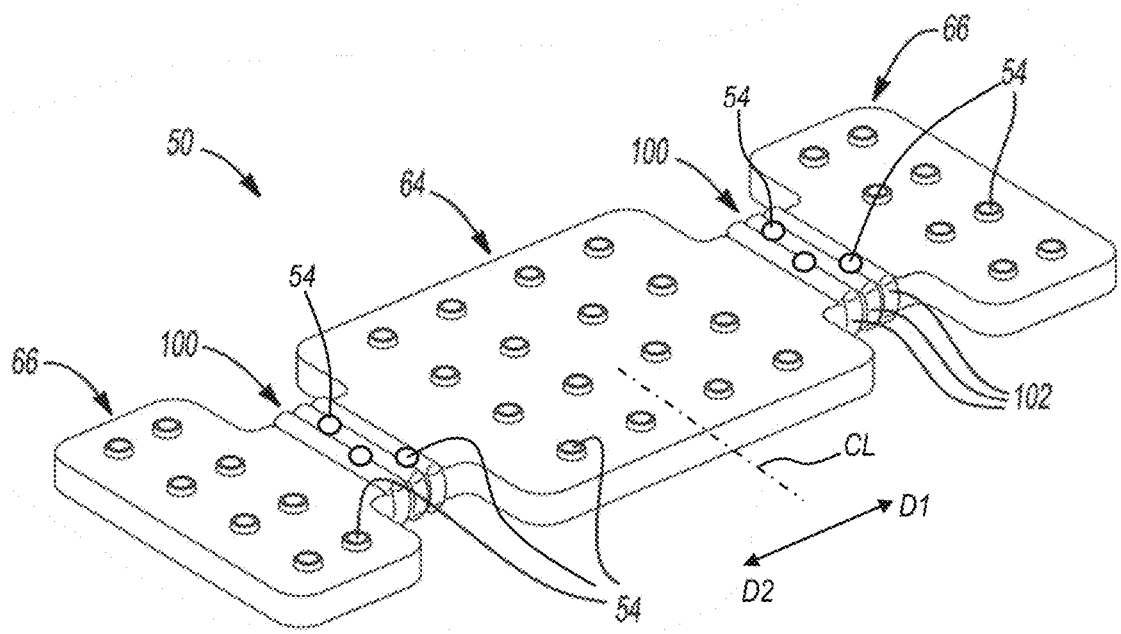
FIG. 7 is a perspective view of a plenum.

FIG. 7 is a perspective view of a plenum 50 including a body 64 and a pair of extensions 66 connected to the body 64 by flexible regions 100. The body 64, the extensions 66, and/or the flexible regions 100 may include one or more ventilation holes 54. The flexible regions 100 include a plurality of expansion members 102 that assist in moving the extensions 66 relative to the body 64 or a center line CL of the body 64, the plenum 50, the vehicle seat, or a combination thereof. The expansion members 102 may allow the extensions 66 to move out of a plane of the body 64 (as shown in FIG. 6) and/or expand or contract away from or towards the body 64, for example, along directions D1 and D2 (or in a direction perpendicular or angled thereto) relative to a center line CL of the body 64, the plenum 50, the vehicle seat 1, or a combination thereof. The expansion members 102 can be expanded to increase a length of the expansion members 102 and/or a distance between the body 64 and the extensions 66. The expansion members 102 can be decreased or collapsed to decrease or reduce a length of the expansion members 102 and/or a distance between the body 64 and the extensions 66. The expansion members 102 may or may not include ventilation holes 54.

The flexibility of the expansion members 102 and/or flexible regions 100 may advantageously provide for adapting a single plenum 50 for various seats or cushions that have different sizes, depths, widths, and/or heights, for example. The plenum 50 (i.e., the body 64, one or more of the extensions 66, and/or the flexible region(s) 100 may include one or more connection recesses for connecting a blower to the plenum 50.

Figure 8A:
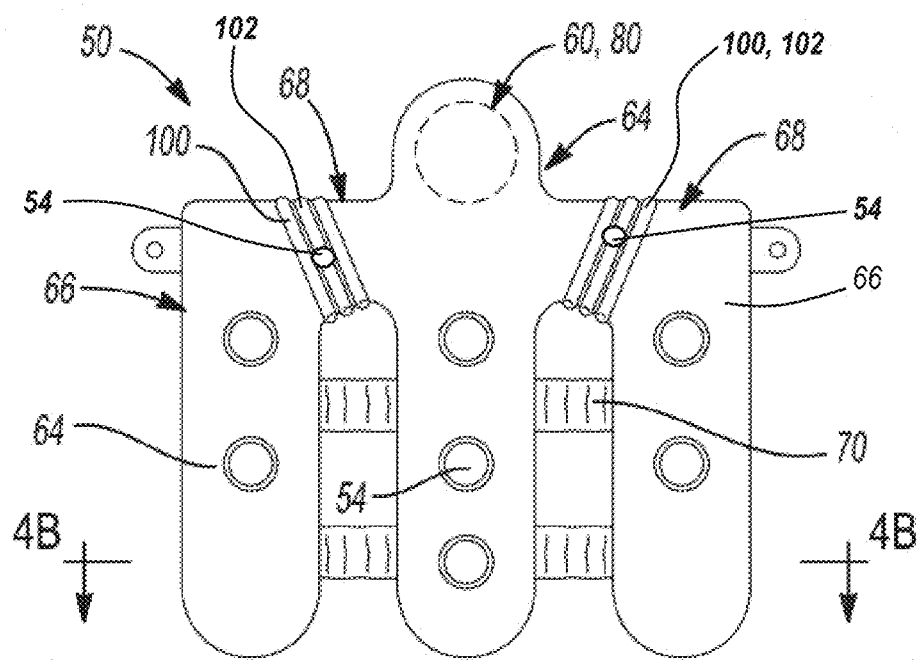
FIG. 8A is a top view of a plenum.

FIG. 8A illustrates a plenum 50 including a body 64 having shoulders 68 that are connected to extensions 66. The shoulders 68 include flexible regions 100 that connect the shoulders 68 to the extensions 66. The flexible regions 100 include expansion members 102 that allow the extensions 66 to move relative to the body 64 or a center line CL of the body 64, the plenum 50, the vehicle seat, or a combination thereof. The body 64, the extensions 66, the shoulders 68, the flexible regions 100, or a combination thereof may have or may be free of ventilation holes 54.

The body 64 includes a connection recess 60 that receives and/or is in fluid communication with a fluid outlet of a blower 80 for supplying air into the plenum 50, the body 64, shoulders 68, and/or extensions 66. Connection members 70 extend between the extensions 66 and the body 64 so that the extensions 66 are movable relative to the body 64 but are constrained to the body 64.

Figure 8B:
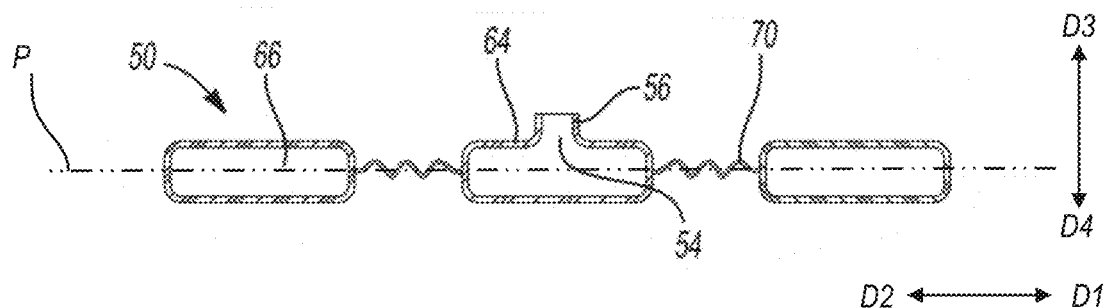
FIG. 8B is a cross-sectional view of the plenum of FIG. 8A along line 4B.

FIG. 8B illustrates a cross-sectional view of the plenum 50 of FIG. 8A, taken along line 4A in FIG. 8A. The plenum 50 includes a body 64 with ducts 56 extending from the ventilation holes 54. The plenum 50 also includes an extension 66 on each side of the body 64. The extensions 66 and the body 64 are connected together by connection members 70. The flexible regions 100 and/or the connection members 70 enable or provide for the extensions 66 and the body 66 to be moved relative to each other, for example, in directions D1, D2 within a plane P of the body 64; in directions D3, D4 out of the plane P of the body; and/or in any direction in between.

Figure 9:
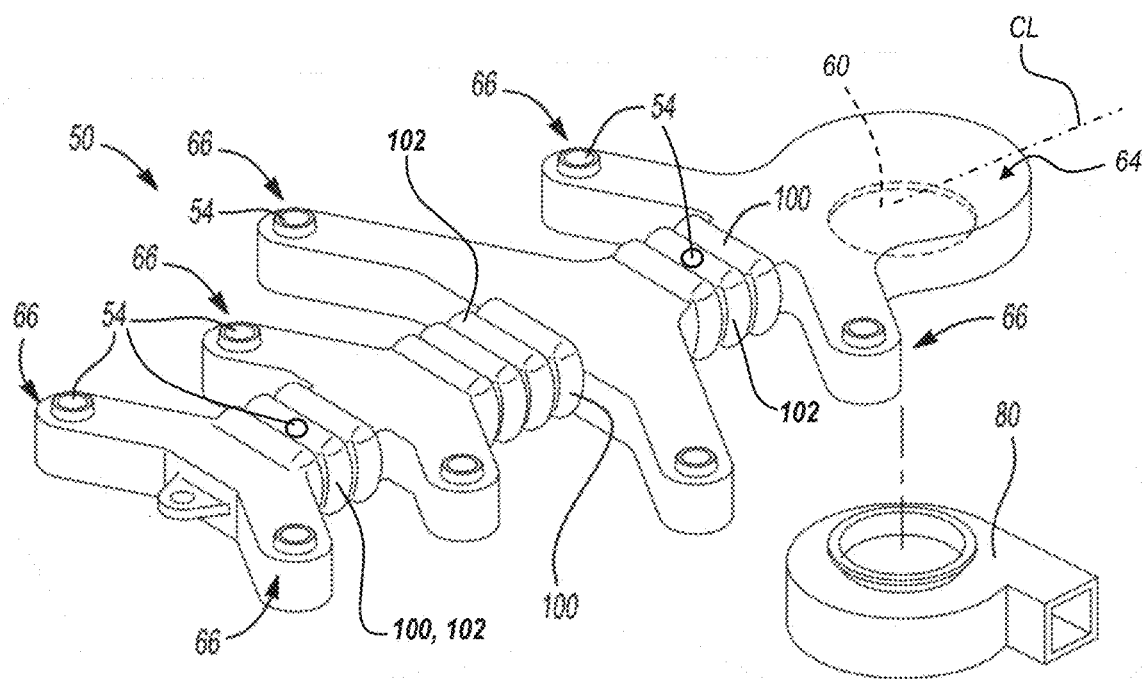
FIG. 9 is a perspective view of a plenum and a blower.

FIG. 9 illustrates a plenum 50 that includes a body 64 and a plurality of extensions 66. One or more of the body 64 and the extensions 66 include ventilation holes 54. The extensions 66 are connected to the body 64 and to each other together via flexible regions 100 so that extensions 66 can move relative to each other extensions 66 and the body 64 within or out of a plane of the body. The flexible regions 100 include expansion members 102 that allow the extensions 66 to move relative to the body 64 or a center line CL of the body 64, the plenum 50, the vehicle seat, or a combination thereof. The expansion members 102 may have or may be free of ventilation holes 54. A blower 80 is shown moving air into a connection recess 60 or opening defined in the body 64.

Figure 10A:
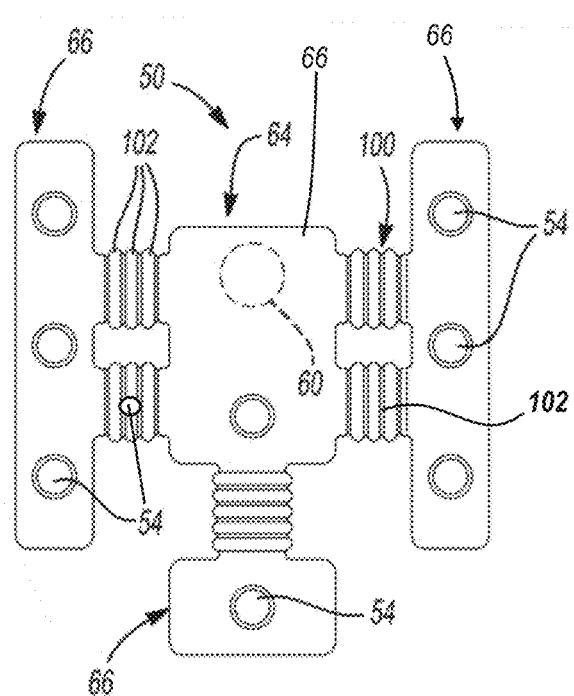
FIG. 10A is a top view of a plenum.

FIG. 10A illustrates a plenum 50 having a body 64 with two extensions 66 that extend to bolsters 21 of the seat (FIG. 6) and one extension 66' that extends to a lower back or leg region of the seat. Each of the two extensions 66 are connected to opposing edges of the body 64 by two flexible regions 100 or expansion members 102. Each of the three extensions 66, 66' are connected to the body 64 by one or more flexible regions 100. The flexible regions 100 are made up of one or more expansion members 102. The body 64 includes a connection recess 60 to connecting to an air outlet of a blower or air mover, and the body 64 and extensions 66 include ventilation holes 54.

Figure 10B:
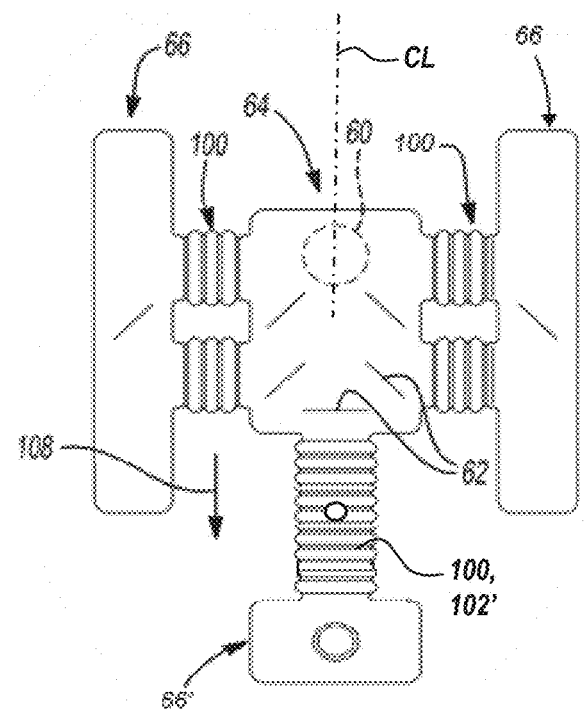
FIG. 10B is a top view of internal components of the plenum of FIG. 10A.

FIG. 10B is a top view of the plenum 50 of FIG. 10A with the upper layer 57 of the plenum 50 removed. The plenum 50 includes a body 64 including baffles 62 and a connection recess 60. The body 64 is connected to extensions 66 by one or more flexible regions 100. The extensions 66 and corresponding expansion members 102 extending below a bolster are in a relaxed or not extended state, and one extension 66' and corresponding expansion members 102' below the lower back or legs is extending or expanded or moved or expanded in the direction 108 to an extended or expanded state, which is shown generally along the center line CL of the body 64, plenum 50, seat 1, or a combination thereof. The extensions 66 and/or the flexible regions 100 include baffles 62.

Figure 11:
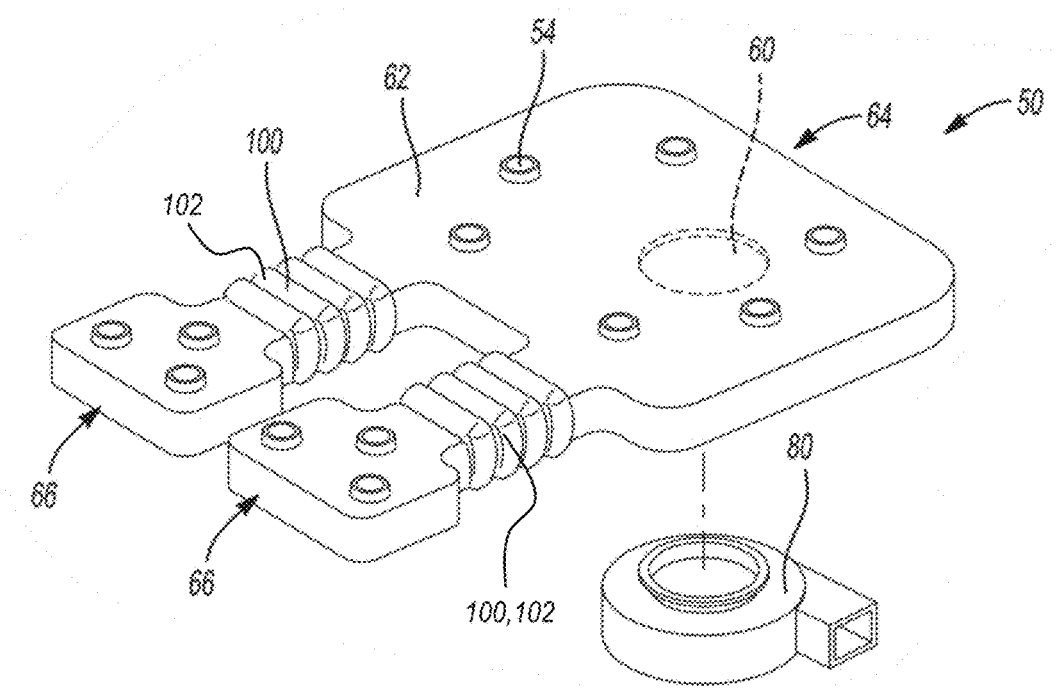
FIG. 11 is a perspective view of a plenum and a blower.

FIG. 11 illustrates a plenum 50 a having a body 64 and extensions 66 connected to the body 64 by flexible regions 100 having expansion members 102. The body 64 includes a connection recess 60 for connecting to a blower 80 or air mover. The body 64, the extensions 66, and/or the flexible regions 100 include one or more ventilation holes 54 that are separated by baffles 62 to distribute fluid to each of the ventilation holes 54.

Figure 12:
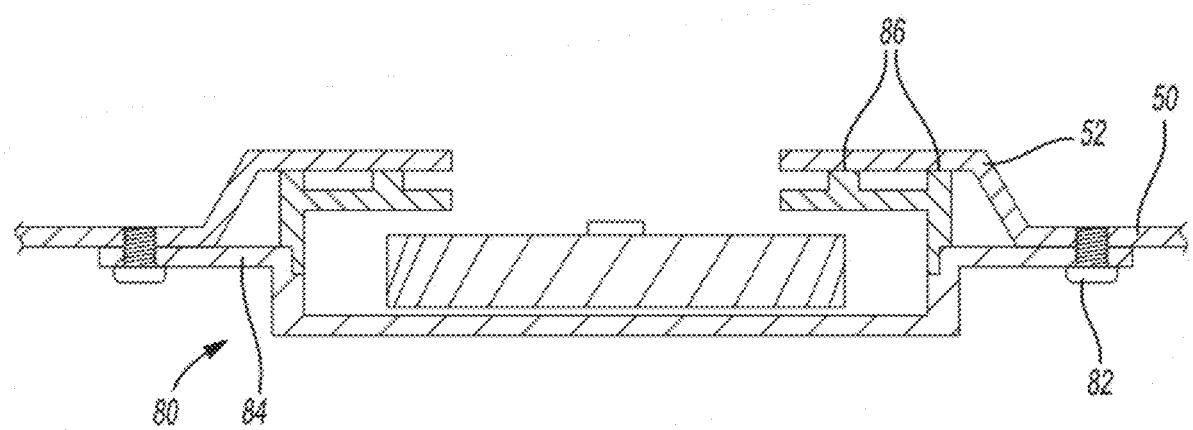
FIG. 12 is a cross-sectional view of a blower connected to a plenum.

FIG. 12 illustrates a blower 80 connected to a wall of a plenum 50, which may be the bottom wall 61 (FIG. 6). The plenum 50 includes a concave wall 52 that receives the blower so that the blower 80 is low profile and sits at least partially within a plane of the plenum 50. The blower 80 includes a blower housing 84 connected to the plenum 50 by blower connection features 82. The blower housing 84 also includes a housing connector 86 that contacts the plenum 50 and as shown the concave wall 52.

An air distribution system may comprise: a plenum configured to attach to a cushion of a vehicle seat, the plenum comprising: a body; one or more extensions; one or more expansion members connecting the one or more extensions to the body; and one or more ventilation holes defined in the body and/or in the one or more extensions; wherein the one or more expansion members are configured to expand or contract relative to the body. The one or more expansion members may comprise a conduit through which air is moved between the body and the one or more extensions. A length of the expansion members may decrease when the expansion member contracts. The one or more expansion members may include one or more ventilation holes. The one or more expansion members may be free of ventilation holes. The plenum may comprise two extensions, and each extension may be located on an opposing edge of the body. The one or more extensions may be connected to the body with two or more expansion members. The plenum may comprise two extensions that are connected to a common edge of the body. The plenum may comprise three extensions, and the extensions are connected to each other with an expansion member. The body may comprise a connection recesses for connecting an air mover to the air distribution system. The air distribution system may comprise an "M" shape. The one or more expandable members may be laterally movable, longitudinally movable, movable rotationally, can be arced, or a combination thereof relative to the body. The air distribution system may comprise one or more flexible regions that can be flexed into a "J" shape, a "U" shape, a "C" shape, or a combination thereof. One or more of the one or more extensions may comprise one or more connection members that connect an extension to an extension, connect an extension to a body, or both.

Figure 13:
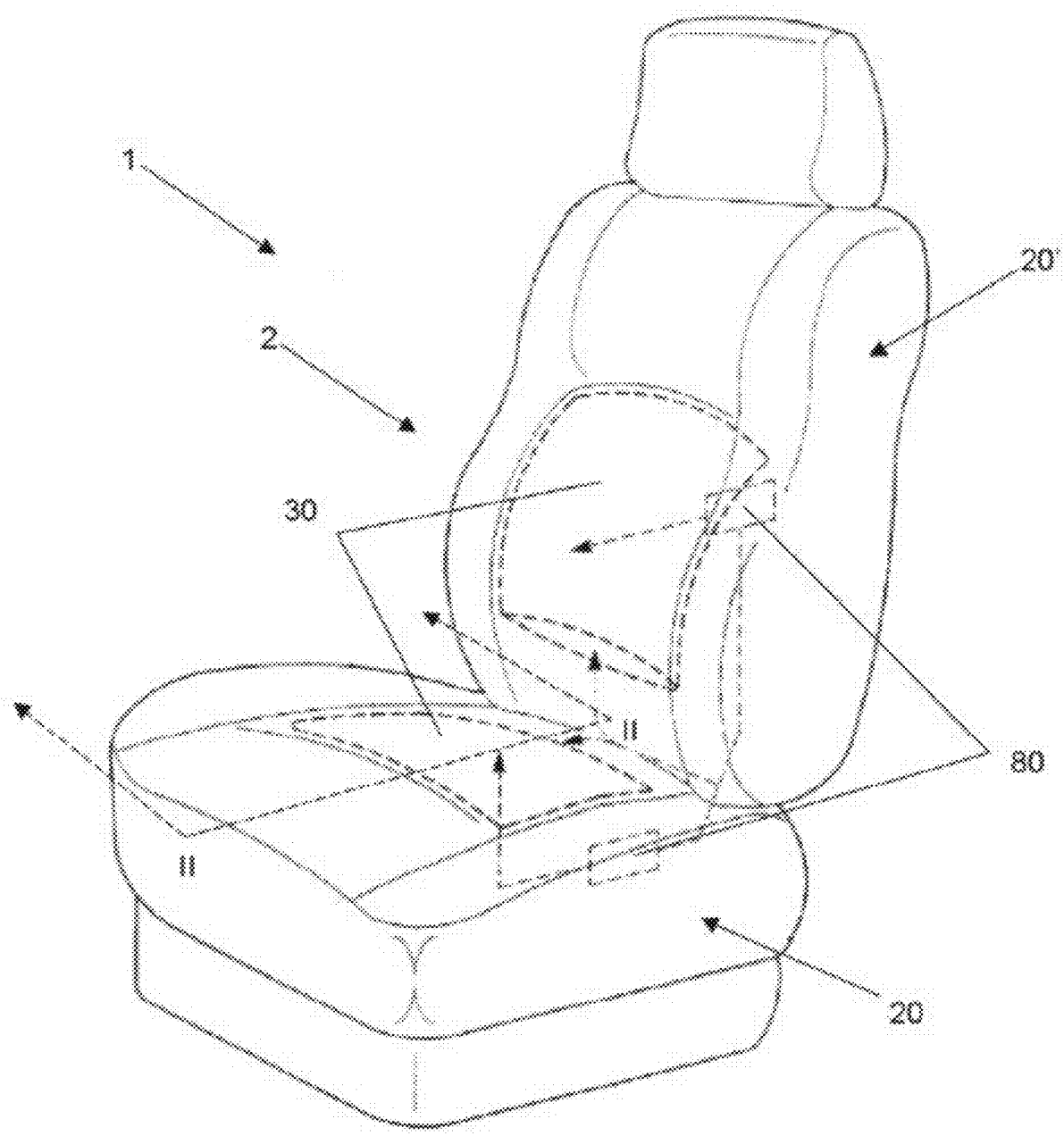
FIG. 13 is a perspective view of a seat including an insert.

FIG. 13 is a perspective view of a vehicle seat 1. The vehicle seat 1 includes a seat cushion 20 and a back cushion 20'. The vehicle seat 1 comprises a conditioning system 2. The conditioning system 2 comprises an insert 30 disposed over the seat cushion 20. The conditioning system 2 comprises an insert 30 disposed over the back cushion 20'. Each of the inserts 30 are in fluid communication with a blower 80. One or more blowers 30 may be connected to each insert 30. One or more blowers 30 may be connected to both inserts 30 associated with the cushions 20, 20'.

Figure 14A:
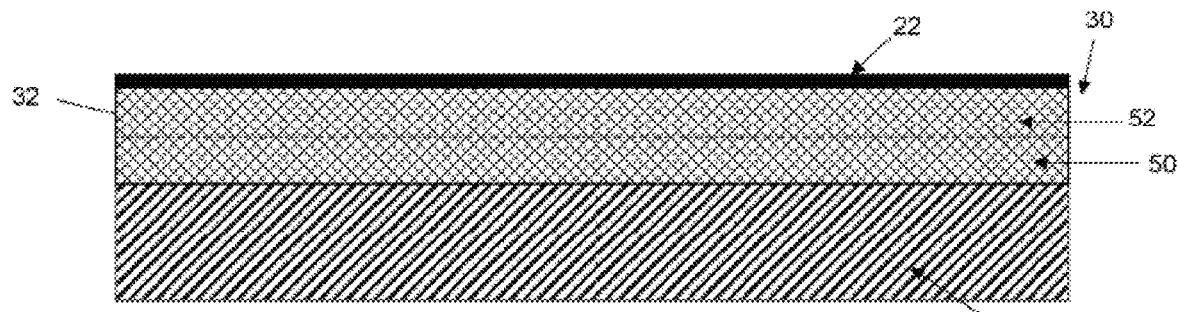
FIG. 14A is a cross-sectional view of the insert of FIG. 13 cut along lines II-II.

FIG. 14A illustrates a cross-sectional view of an insert 30 and cushion 20 of FIG. 13 taken along lines II-II. FIG. 14A may also or may instead be a cross-sectional view of insert 30 and cushion 20' of FIG. 1.

The vehicle seat 1 comprises a trim layer 22. The trim layer 22 may be a layer or surface of the vehicle seat 1 that is in contact with an occupant in the vehicle seat 1. In other words, the trim layer 22 may have an outer surface or A surface that is visible to the occupant and/or in contact with the occupant when supported or seated in the seat 1. The insert 30 is located below or under the trim layer 22. The insert 30 may be sandwiched between the cushion 20 and the trim layer 22.

The insert 30 comprises a lattice 32. The lattice 32 may comprise or be is divided into two portions or sections, namely: an air gap portion or volume 50 that is located proximate or adjacent to the cushion 20 and a conditioned portion or volume 52 that is located on top of the air gap portion and proximate or adjacent to the trim layer 22. The air gap portion or volume 50 and the conditioned portion or volume 52 may have a thickness or cross section that is substantially the same size and/or shape, or a thickness or cross section of each portion of volume 50, 52 may be different.

Figure 14B:
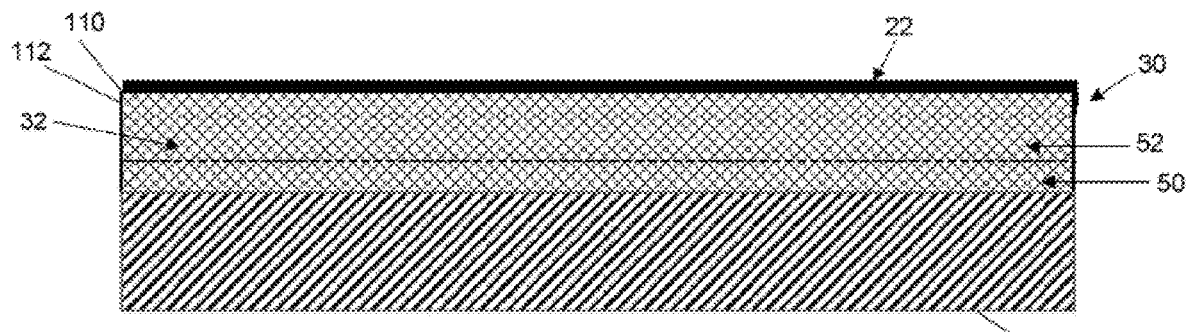
FIG. 14B is a cross-sectional view of an insert.

FIG. 14B illustrates a cross-sectional view of an insert 30 and cushion 20 (and/or cushion 20') of FIG. 13 taken along lines II-II. The insert 30 is located below the trim layer 22. A heater 110 and sensor 112 are located below the trim layer 22 and are part of the insert 30. The insert 30 includes a lattice 32 that comprises or is divided into two portions or sections, namely: an air gap portion or volume 50 that I s located proximate to the cushion 20 and a conditioned portion or volume 52 that is located proximate to the trim layer 22.

Figure 15:
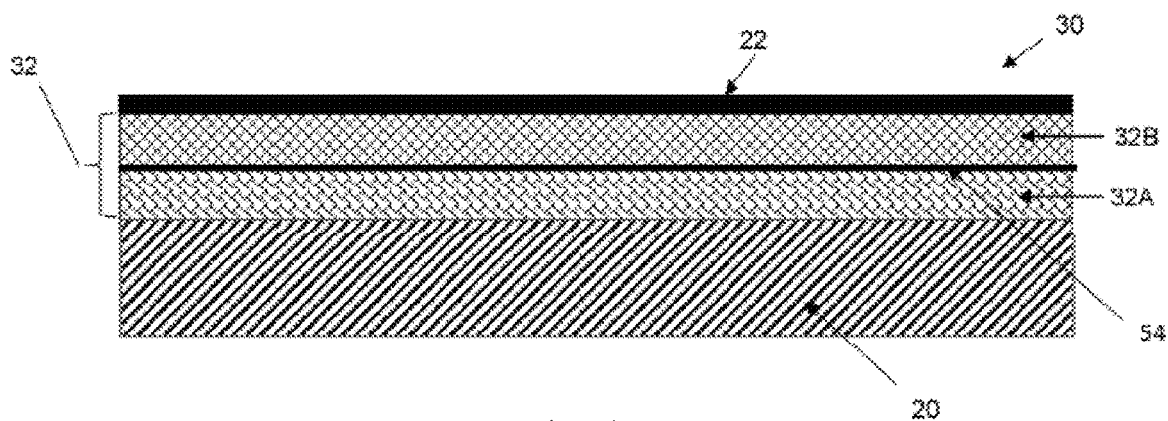
FIG. 15 is a cross-sectional view of an insert having two regions with different structures.

FIG. 15 illustrates a cross-sectional view of an insert 30 located below a trim layer 22 and above a cushion 20. The insert 30 includes lattice 32. The lattice 32 comprises or is divided into two portions, namely: a support lattice 32A located proximate to the cushion 20 and a conditioned lattice 32B that is located above the support lattice 32A and below the trim layer 22. A barrier 54 is located between the support lattice 32A and the conditioned lattice 32B, which functions to prevent air from passing from the conditioned lattice into the support layer 32A or vice versa.

Figure 16:
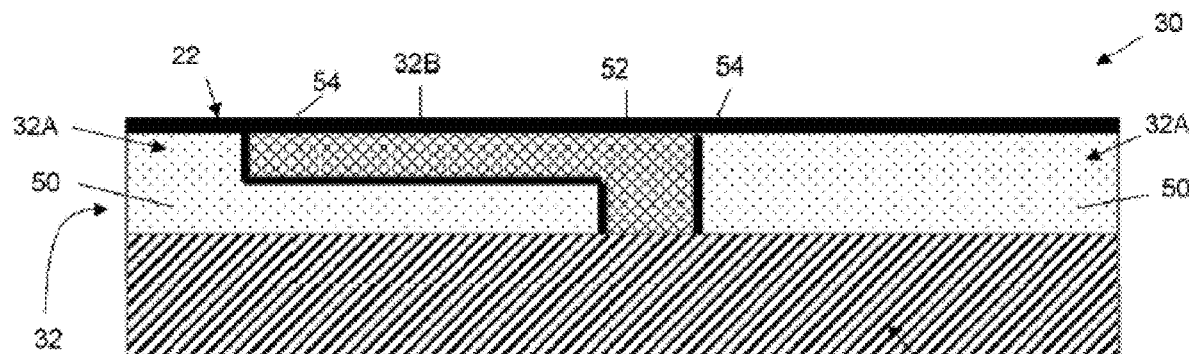
FIG. 16 is a cross-sectional view of an insert having regions with different permeability.

FIG. 16 illustrates a cross-sectional view of an insert 30 located below a trim layer 22 and above a cushion 20. The insert 30 includes lattice 32. The lattice 32 includes a conditioned lattice 32B that extends between two support lattices 32A for moving conditioned air towards or away from an occupant in the vehicle seat 1. A barrier 54 extends around a perimeter of the conditioned lattice structure 32B so that air is prevented from exiting the conditioned lattice 32B and entering the support lattice 32A or vice versa. The support lattice 32A creates an air gap volume 50 around a conditioned volume 52, which is shown/located in the conditioned lattice 32B.

Figure 17:
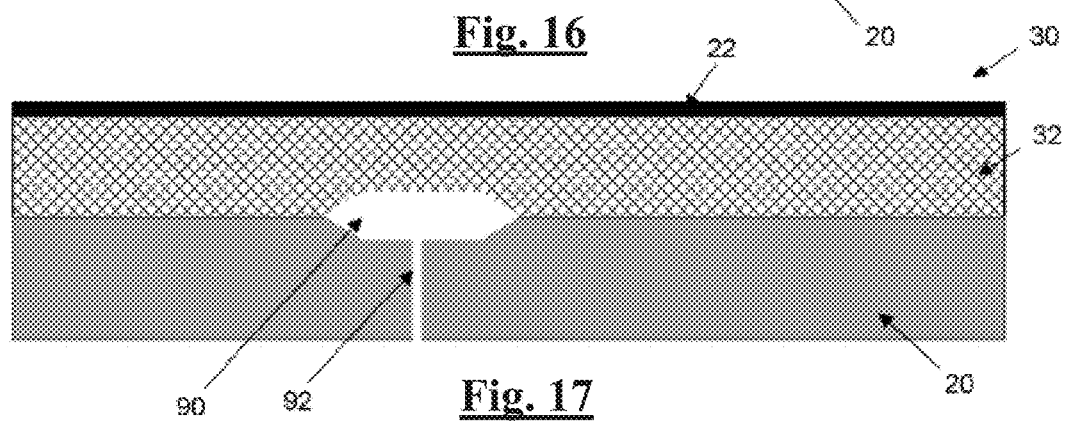
FIG. 17 illustrates an insert including an embedded structure located therein.

FIG. 17 illustrates a cross-sectional view of an insert 30 located below a trim layer 22 and above a cushion 20 (and/or cushion 20'). The insert 30 includes lattice 32 that allows air to flow between a blower and an occupant in the vehicle seat 1. An embedded structure 90 is located between the lattice 32 and the cushion 20. The embedded structure 90 includes a port 92 for controlling the embedded structure 90.

Figure 18A:
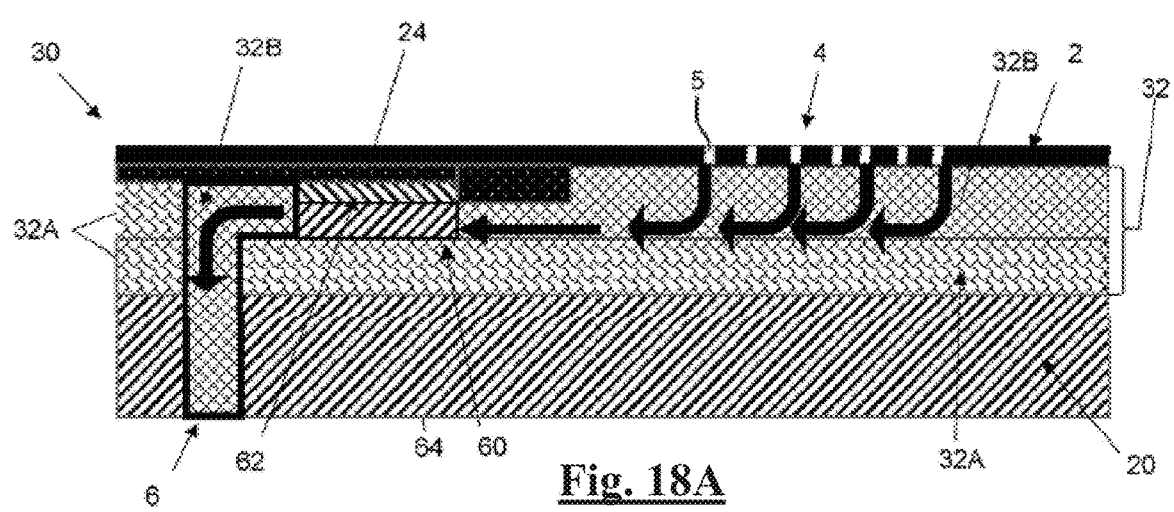
FIG. 18A illustrates an insert including multiple regions with different permeability and an embedded structure that is a thermoelectric device.

FIG. 18A illustrates a cross-sectional view of an insert 30 located below a trim layer 22 and above a cushion 20. The insert 30 includes lattice 32. The lattice 32 includes a support lattice 32A located between the cushion 30 and a conditioned lattice 32B. Air flows into/through the trim layer 22, through pores or openings 5, which act as an inlet 4 over a second side 64 of a thermoelectric device 60 removing the waste energy and out the outlet 6. A first side 62 of the thermoelectric 60 is in communication with a conditioned trim surface 24 that provides conductive conditioned through the trim layer 22 to an occupant in the vehicle seat 1.

Figure 18B:
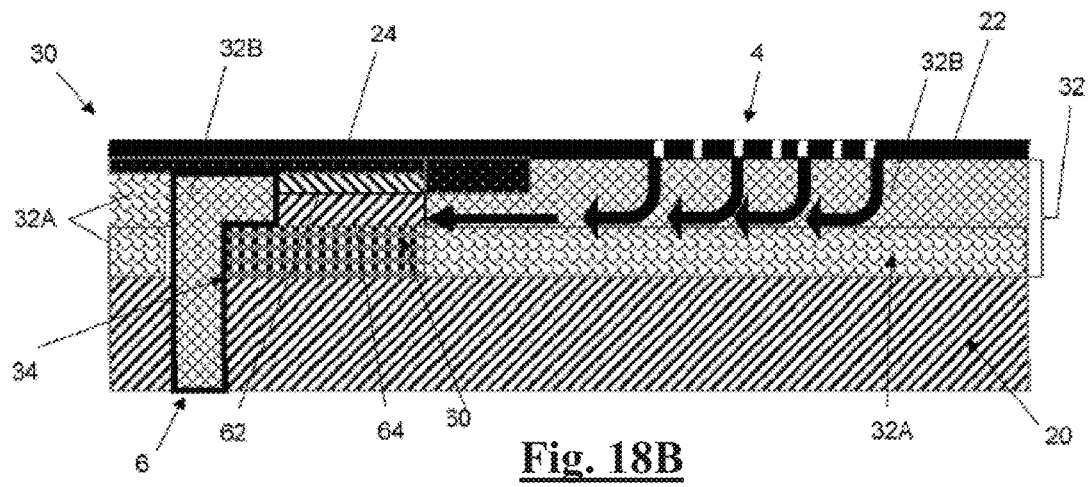
FIG. 18B illustrates an insert including multiple regions with different permeability and an embedded structure located within a pocket.

FIG. 18B illustrates a cross-sectional view of an insert 30 located below a trim layer 22 and above a cushion 20. The insert 30 includes lattice 32. The lattice 32 includes a support lattice 32A located between the cushion 30 and the conditioned lattice 32B. Air flows into and through the trim layer 22, which acts as an inlet 4 over a second side 64 of a thermoelectric device 60 removing the waste energy and out the outlet 6. The thermoelectric device 60 is located above a pocket 34 that has a higher degree of flexibility than the support lattice 32A and the conditioned lattice 32B so that the thermoelectric device 60 is not felt by an occupant in the vehicle seat 1 through the trim surface 22. A first side 62 of the thermoelectric device 60 is in communication with a conditioned trim surface 24 that provides conductive conditioned through the trim layer 22 to an occupant.

Figure 19:
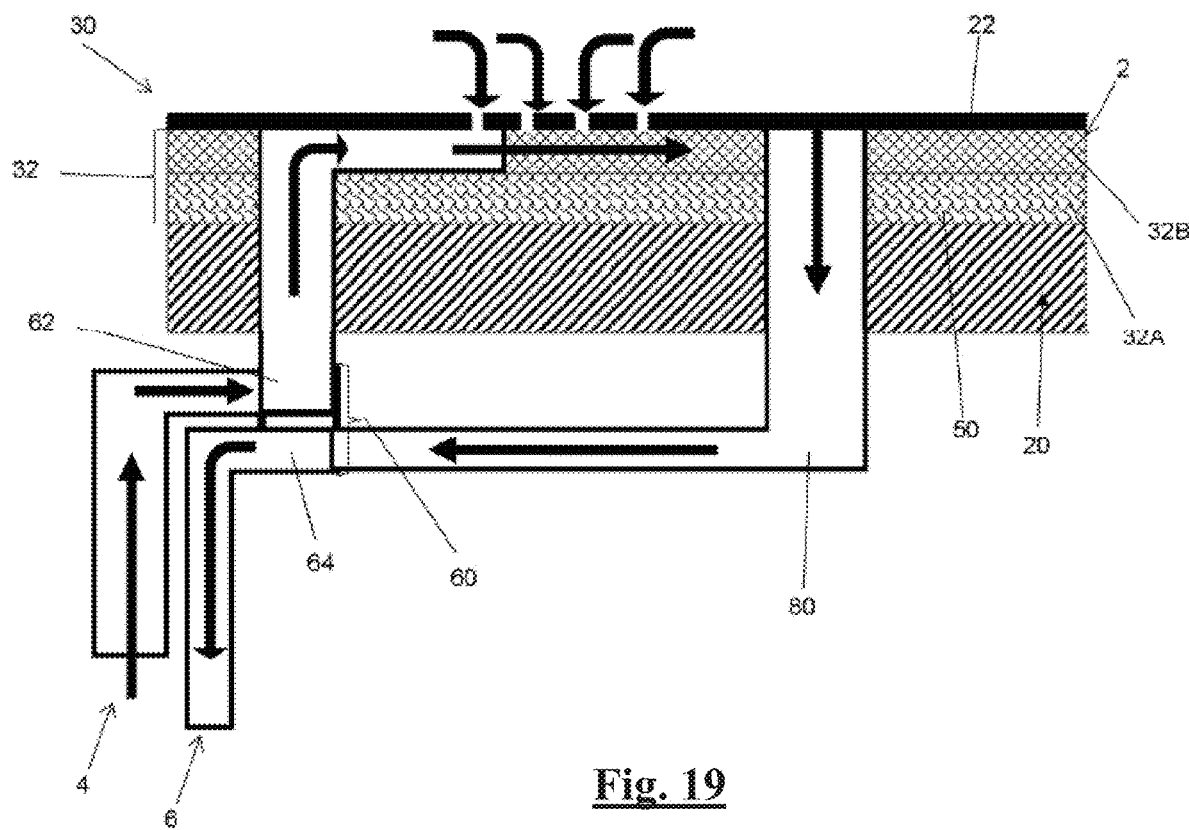
FIG. 19 illustrates a conditioning system including a blower and a thermoelectric device connected to an insert taught herein.

FIG. 19 illustrates a cross-sectional view of an insert 30 of a conditioning system 2. The insert 30 being located below a trim layer 22 and above a cushion 20. As the air moves through the conditioned lattice 32B, air is drawn away from an occupant and through the trim layer 22. The insert 30 includes lattice 32. The lattice 32 includes a support lattice 32A located between the cushion 30 and the conditioned lattice 32B that acts as an air gap volume 50 that reduces the total volume to be conditioned. Air is moved by a blower 80 into the inlet 4 across a first side 62 of a thermoelectric device 60 through the conditioned lattice 32B and along the trim layer 22 so that the trim layer is conditioned. The air then moves away from the trim layer 22 and across a second side 64 of the thermoelectric device and out the outlet remove waste air from the second side 64 of the thermoelectric device 60.

Figure 20:
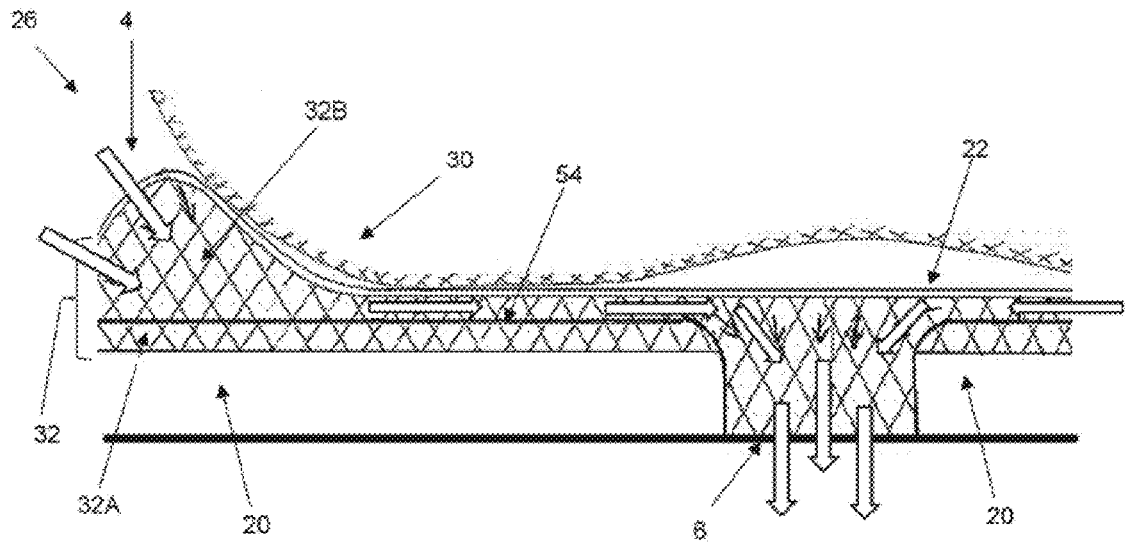
FIG. 20 illustrates an insert having two regions of different permeability and including bolsters.

FIG. 20 illustrates a cross sectional view of an insert 30 located below a trim layer 22. The insert 30 is located over a cushion 20 and the insert includes a bolster 26 that extends outward from the cushion 20 to partially wrap or support the occupant. The bolster 26 is defined by or formed by or comprises a lattice 32 that includes both a support lattice 32A and a conditioned lattice 32B. As shown, a barrier 54 is located between the support lattice 32A and the conditioned lattice 32B so that the conditioned lattice 32A is free of air flow but forms an air gap between the cushion 20 and the conditioned lattice 32B. The bolster 26 includes an inlet 4 through which the air is moved or drawn into the conditioned lattice 32B through the trim layer 22 and then along the trim layer 22 and then out of an outlet 6 away from an occupant.

Figure 21:
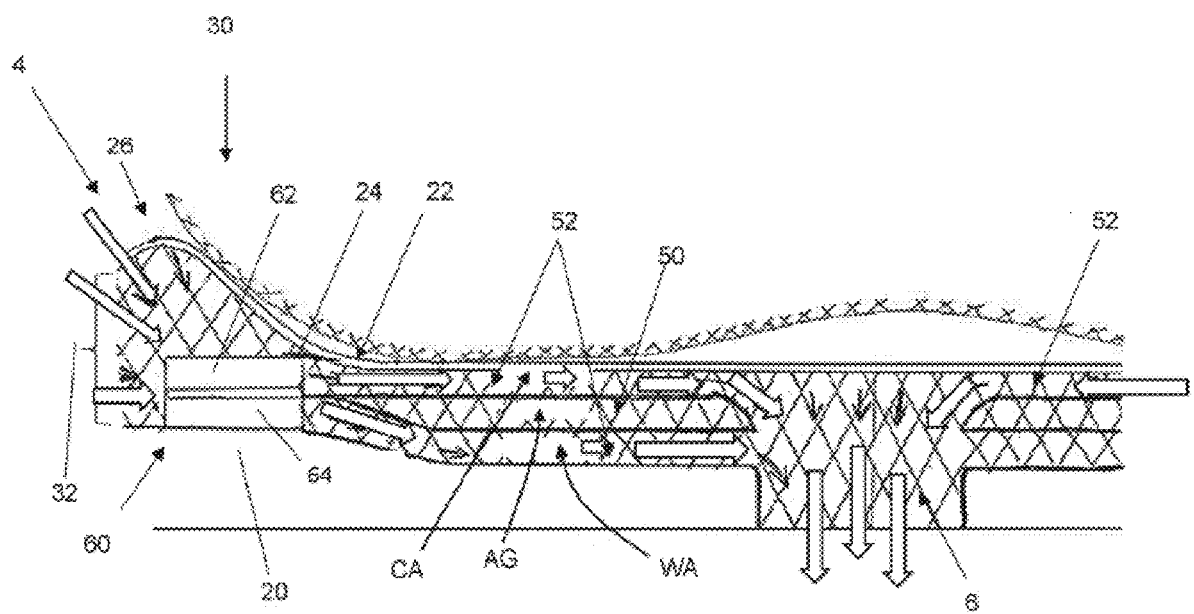
FIG. 21 illustrates an insert including a horizontal embedded structure, regions with different permeability, and bolsters.

FIG. 21 illustrates a cushion 20, the insert 30, and a lattice 32 within a bolster 26. The cushion 20 and the insert 30 are a single, integral monolithic part. The bolster 26 includes an inlet 4 and a thermoelectric device 60. As air is pulled into the inlet 4 towards the outlet 6, the air is moved across both the first side 62 and the second side 64 of the thermoelectric device 60 so that air along the first side 62 is conditioned (conditioned means the air may be cold air AC) and moved towards the occupant in the vehicle seat 1, and air that moves along the second side 64 is not conditioned (not conditions means the air may be warm air WA) is moved into the outlet 6 and away from the occupant in the seat 1 and does not condition the occupant. The air that is moved along the first side 62 is moved through a conditioned volume 52 of the lattice 32 that is in communication with the trim layer 22 to create a conditioned trim surface 24. An air Gap AG is defined or provided between the two conditions portions 52 or conditioned latices 32B layers.

The air exiting the first side 62 flows along a first flow path and the air exiting the second side 64 flows along a second flow path. The first path and the second path are separated by an air gap AG. The first flow path is adjacent to the trim layer 22. The first flow path and the second flow path that are spaced apart by the air gap AG diverge into a single flow path at the outlet 6.

Figure 22:
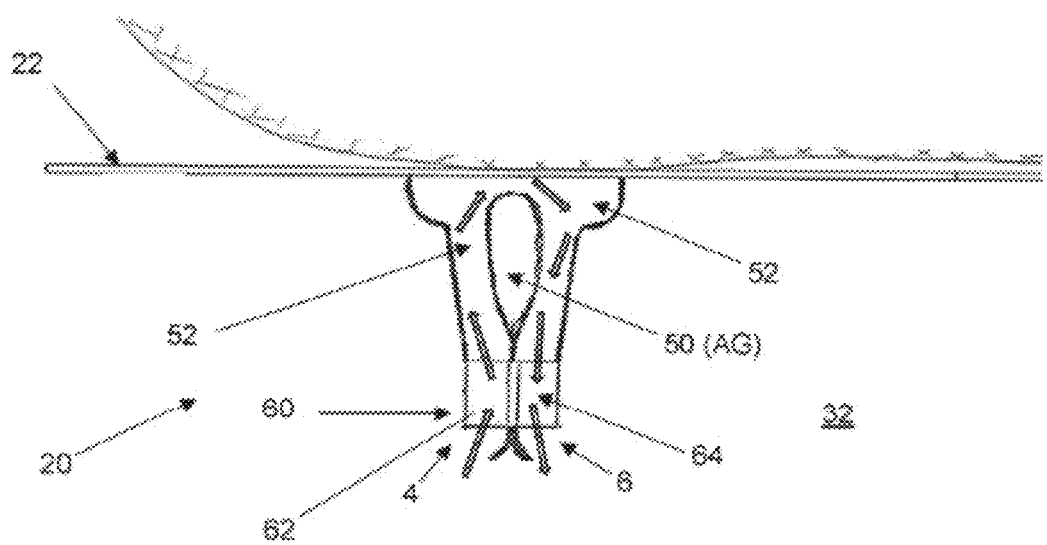
FIG. 22 illustrates an insert having a vertical embedded structure and regions with different permeability located within the cushion.

FIG. 22 illustrates a cushion 20 below a trim layer 22 with a lattice 32 located within the cushion 20. The insert 32 includes a thermoelectric device 60 with a first side 62 and a second side 64. As shown, air is moved into the inlet 4 across the first side 62 and into contact with the trim layer 22 to provide conditioning to or through the trim layer 22, and then the air flows across the second side 64 and exits through the outlet 6. The air circulates through a conditioned volume 52 of the lattice 32. The conditioned volume 52 surrounds an air gap AG volume 50.

The air flows in a direction towards the trim layer 22 that is provided adjacent to the insert and then flows in a direction away from the trim layer 22.

Figure 23:
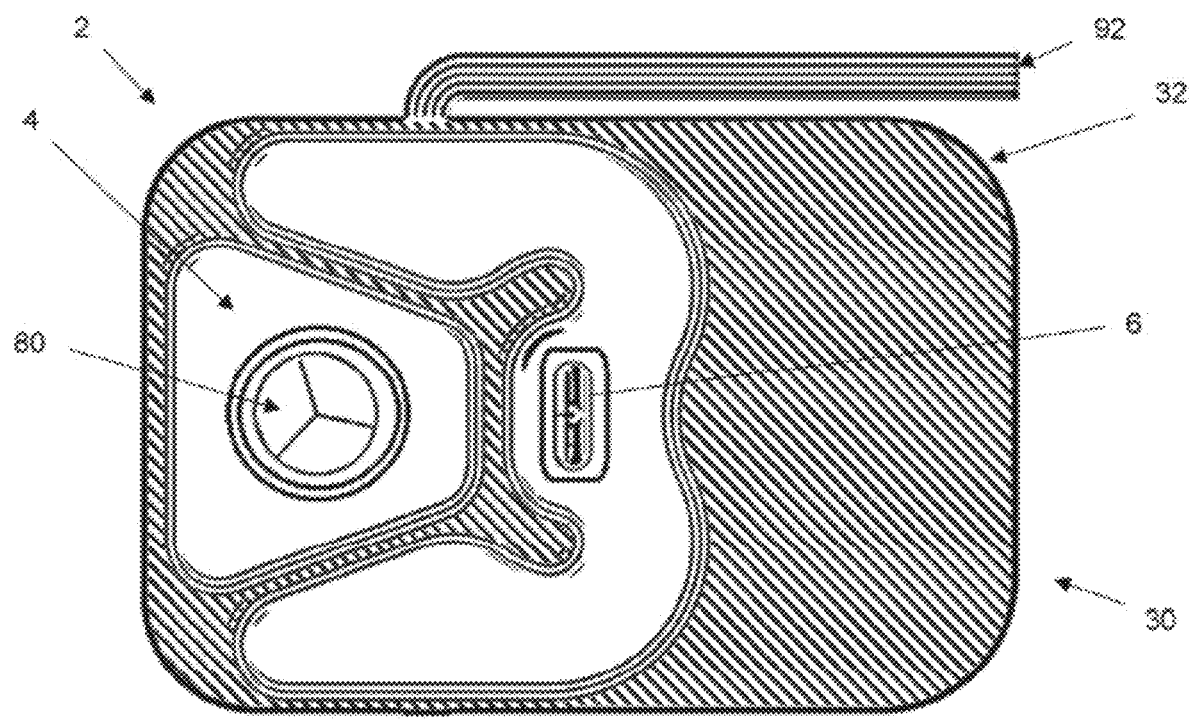
FIG. 23 is a top view of an insert.

FIG. 23 is a top view of a conditioning system 2. The conditioning system 2 includes a blower 80 with an air inlet 4 and an air outlet 6. The conditioning system 2 includes an insert 30 that includes lattice 32. Ports 92 extend into the conditioning system 2 to operate embedded structures (not shown).

Figure 24:
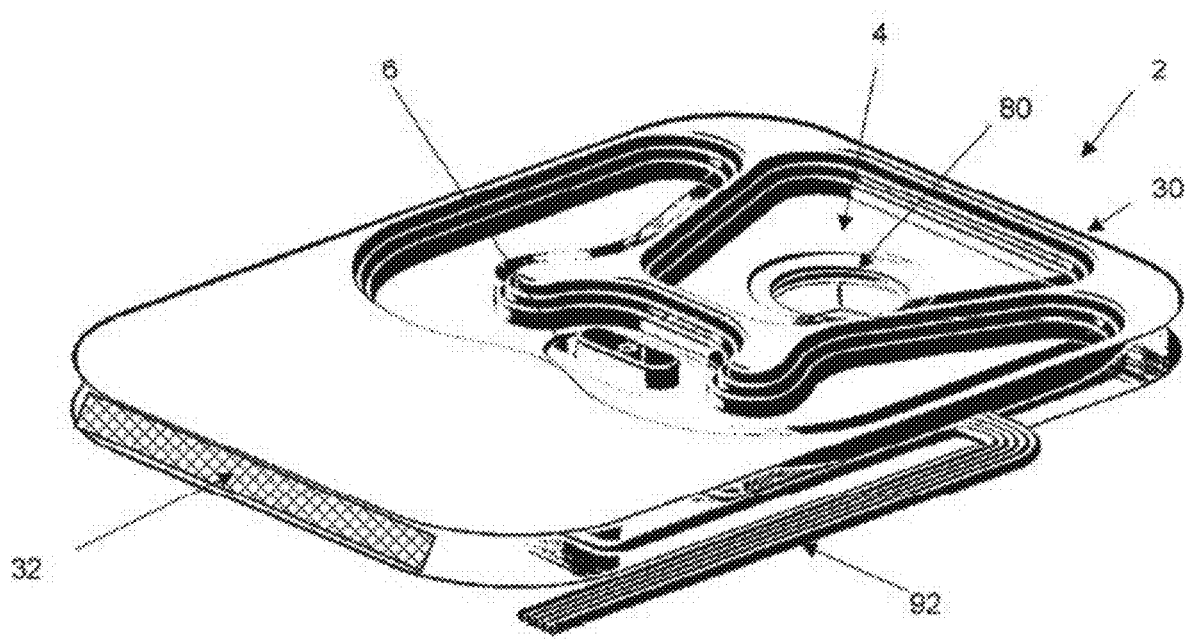
FIG. 24 is a perspective view of the insert in FIG. 23.

FIG. 24 is a perspective view of an insert 30 of a conditioning system 2 with the lattice 32 of the insert 30 being visible. A blower 80 having an inlet 4 and an outlet 6 is shown. A plurality of ports 92 extend into the lattice 32 of the insert 30.

Figure 25:
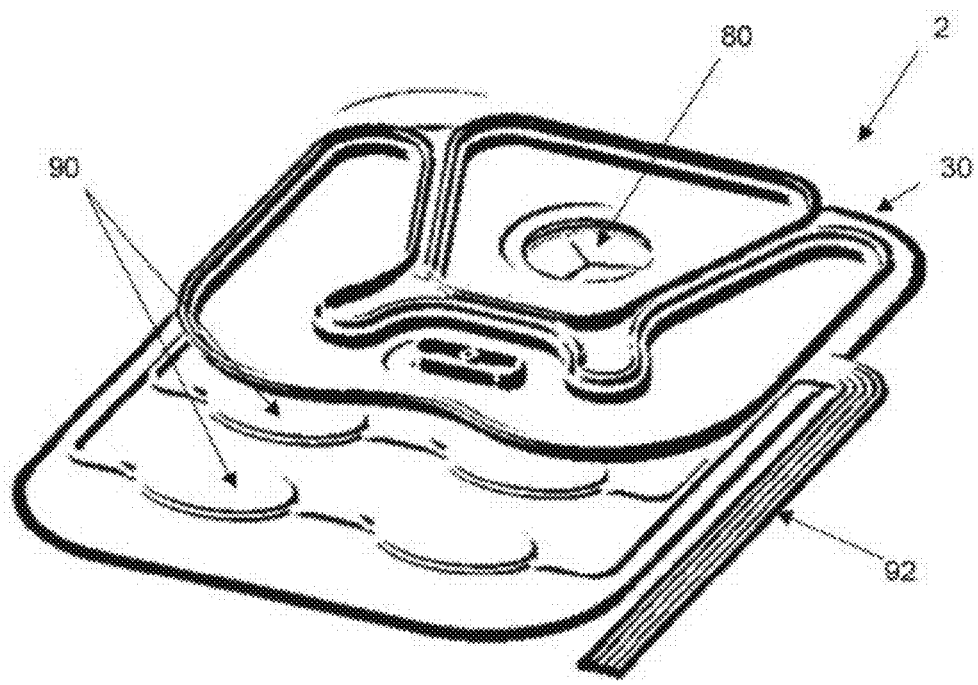
FIG. 25 is a perspective view of the insert in FIG. 23 with a top layer removed so that the embedded structures are exposed.

FIG. 25 is a top view of the insert 30 of the conditioning system 2 with a top layer removed so that the embedded structures 90 are visible. The embedded structures 90 are connected to the ports 92. The blower 80 is shown located within the insert 30.

Figure 26:
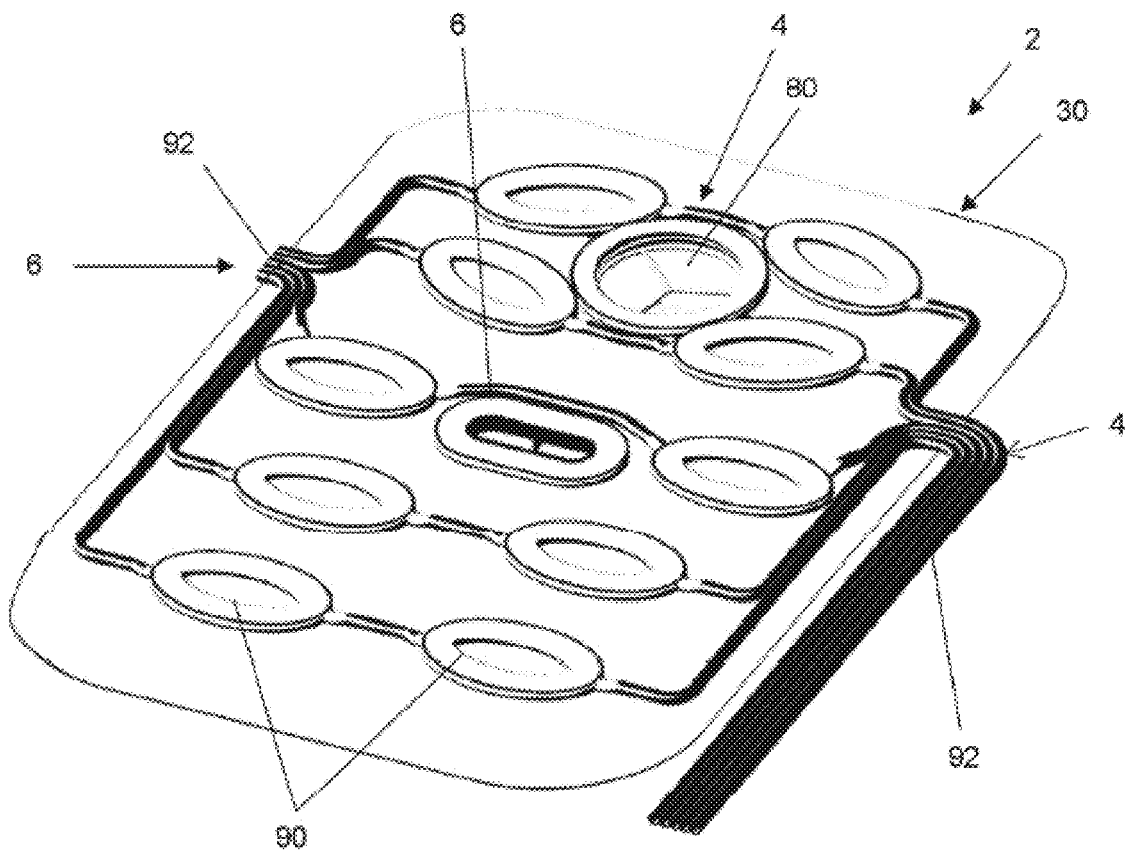
FIG. 26 is a perspective view of the insert of FIG. 23 with all of the embedded structures exposed.

FIG. 26 illustrates the insert 30 of the conditioning system 2 within an entire top layer removed to expose the embedded structures 90 and the connection between the plurality of ports 92 and the embedded structures 90. As shown, some of the plurality of ports 92 are inlet 4 ports 92 and some of the plurality of ports are outlet 6 ports 92. The blower 80 is in communication with an inlet 4 and an outlet 6 to provided conditioned air through the insert 30.

Figure 27:
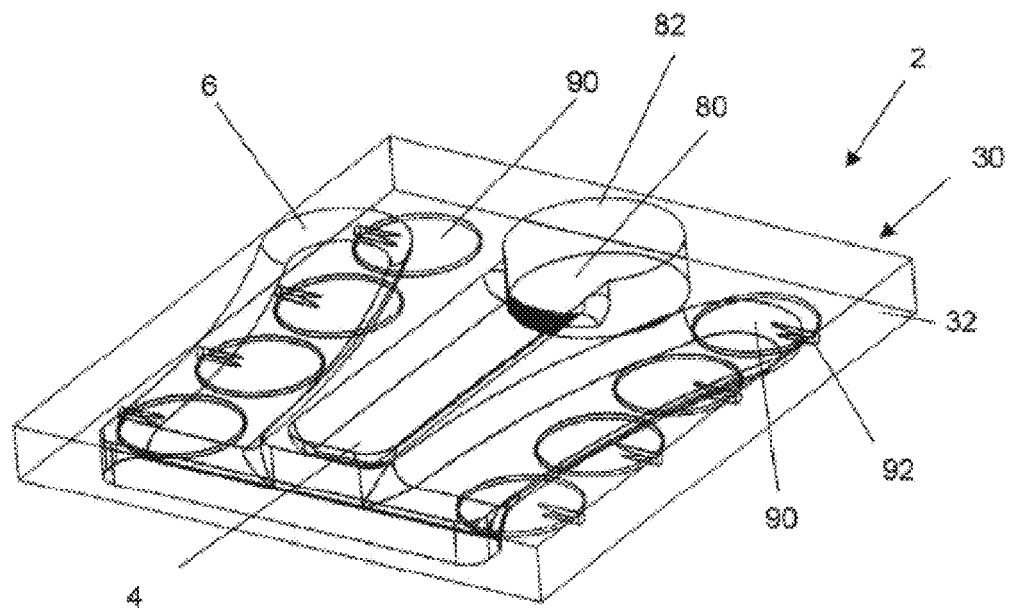
FIG. 27 is a transparent perspective view of an insert.

FIG. 27 illustrates an insert 30 of a conditioning system 2 shown in transparent so that features of the insert 30 are visible. The insert 30 is formed of lattice 32 which extends around a plurality of embedded structures 90, ports 92, and a blower 80. The lattice 32 forms an inlet 4 and an outlet 6 that the air is moved through so that the blower 80 provided conditioning to an occupant. As shown the inlet 4 and the outlet 6 are channels within the insert.

Figure 28A:
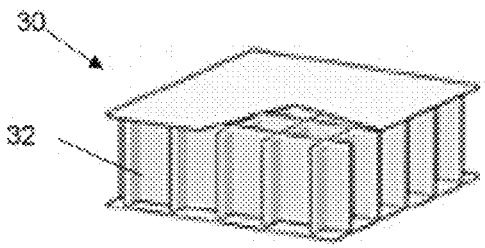
FIG. 28A is a lattice having a square or honeycomb shape.

FIG. 28A is an insert 30 have a lattice 32 with a honeycomb shape that is a plurality of interconnected squares.

Figure 28B:
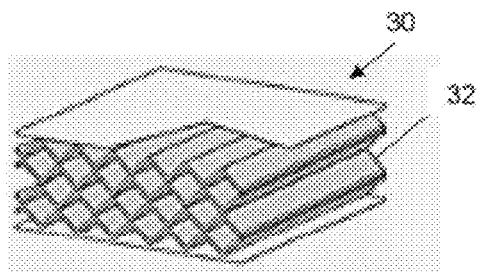
FIG. 28B is a lattice having a corrugation shape.

FIG. 28B is an insert 30 having a lattice 32 with a corrugation shape.

Figure 28C:
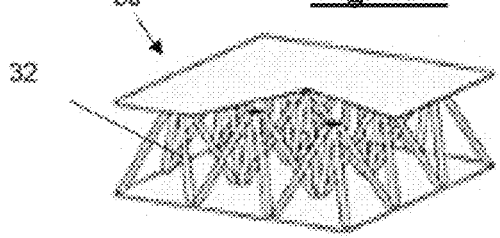
FIG. 28C is a lattice having a pyramidal shape.

FIG. 28C is an insert 30 having a lattice 32 forming a pyramid shape and having a more open structure when compared to FIGS. 28A and 28B.

Figure 28D:
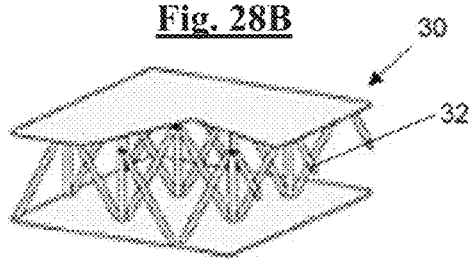
FIG. 28D is a lattice having a tetrahedral shape.

FIG. 28D is an insert 30 having a lattice 32 with a tetrahedral shape and having a more open structure when compared with FIGS. 28A-28C.

Figure 28E:
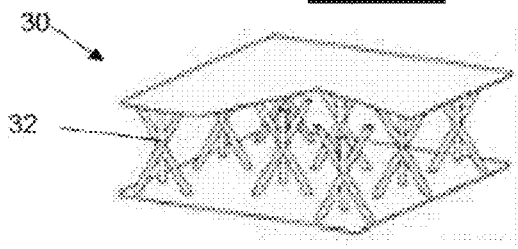
FIG. 28E is a lattice having a 3D-Kagome shape.

FIG. 28E is an insert 30 having a lattice 32 with a 3D-Kagome shape that has more open structure when compared with FIGS. 28A-28D.

Figure 28F:
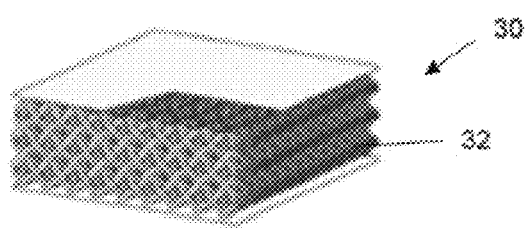
FIG. 28F is a lattice having a diamond textile shape.

FIG. 28F is an insert 30 having a lattice 32 with a diamond textile shape and structure.

Figure 28G:
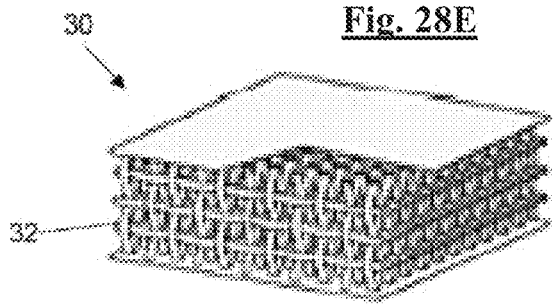
FIG. 28G is a lattice having a square textile shape.

FIG. 28G is an insert 30 having a lattice 32 with a square textile shape and structure.

Figure 28H:
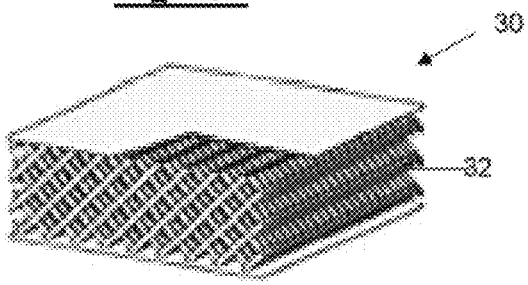
FIG. 28H is a lattice having a diamond collinear shape.

FIG. 28H is an insert 30 having a lattice 32 with a diamond collinear shape and structure.

Figure 28I:
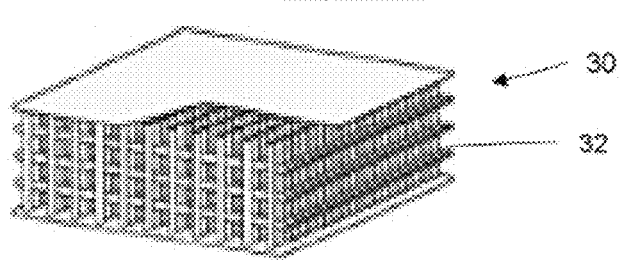
FIG. 28I is a lattice having a square collinear shape.

FIG. 28I is an insert 30 having a lattice 32 with a square collinear shape and structure.

Figure 29A:
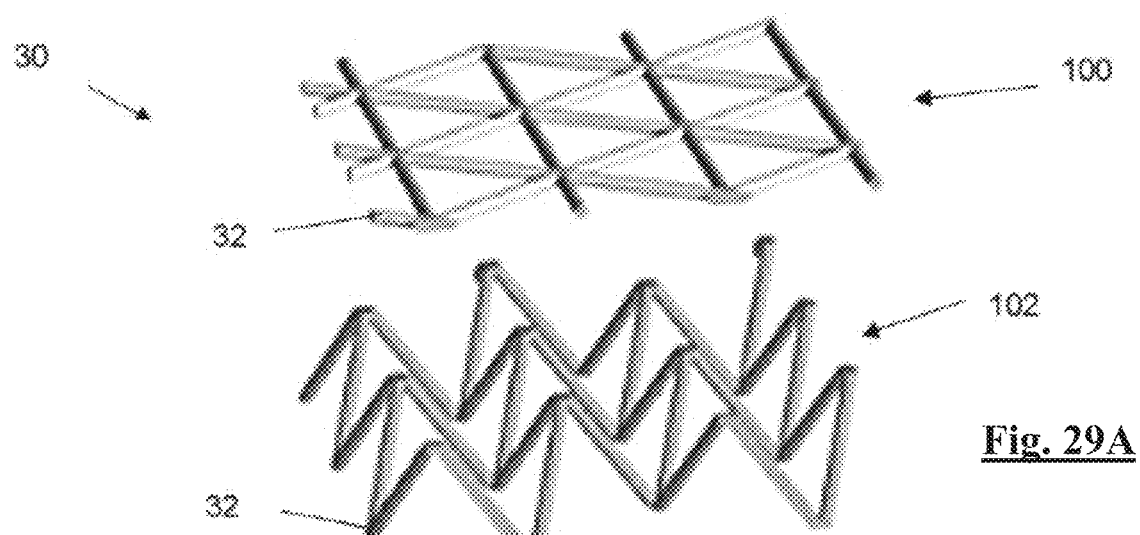
FIG. 29A is an exploded view of a lattice with a tetrahedral shape.

FIG. 29A shows an exploded view of a lattice 32 of an insert 30. The lattice 32 is a tetrahedral shape with a top planar portion 100 and a bottom planar portion 100 with a connecting portion 102 therebetween forming the three-dimensional tetrahedral shape of the insert 30.

Figure 29B:
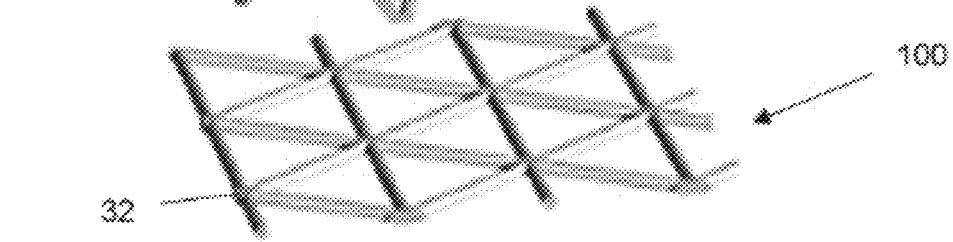
FIG. 29B is a three-dimensional view of a lattice with a tetrahedral shape.
Figure 29B:
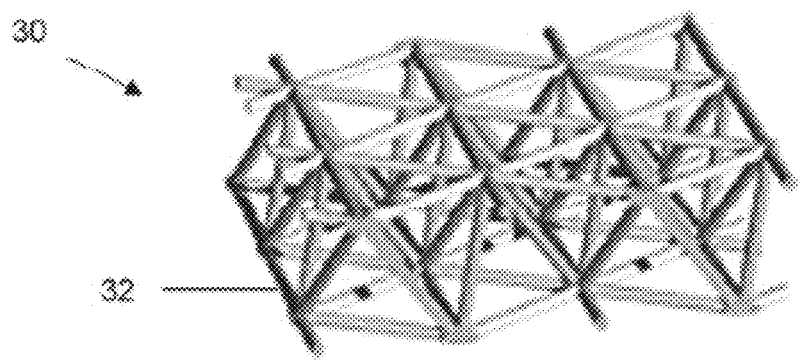

FIG. 29B illustrates the three-dimensional shape of the lattice 32 within the insert 30.

Figure 30A:
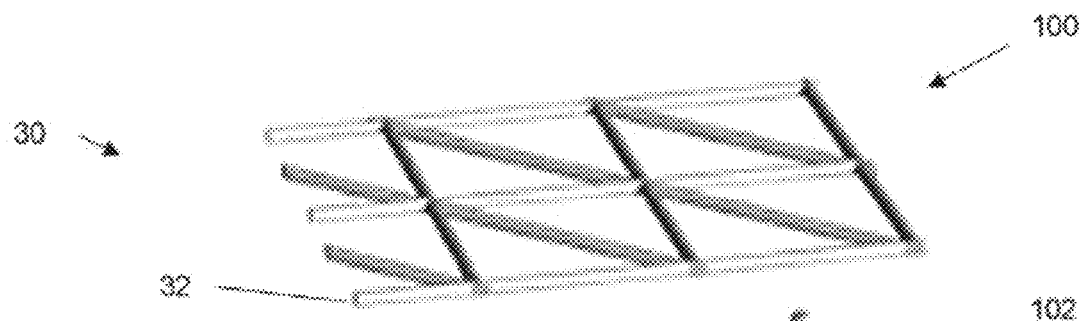
FIG. 30A is an exploded view of a lattice with a pyramidal shape.
Figure 30A:
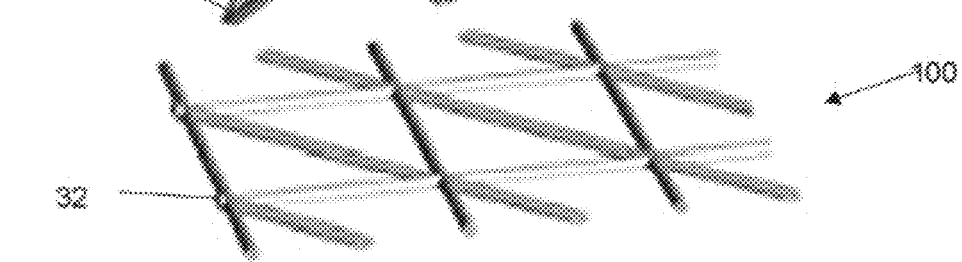

FIG. 30A shows an exploded view of a lattice 32 of an insert 30. The lattice 32 is a tetrahedral shape with a top planar portion 100 and a bottom planar portion 100 with a connecting portion 102 therebetween forming the three-dimensional pyramidal shape of the insert 30.

Figure 30B:
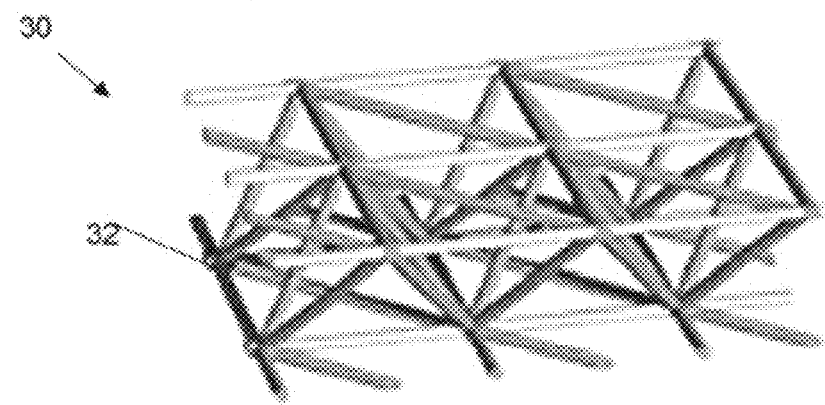
FIG. 30B is a three-dimensional view of a lattice with a pyramidal shape.

FIG. 30B illustrates the three-dimensional shape of the lattice 32 within the insert 30.

Figure 31A:
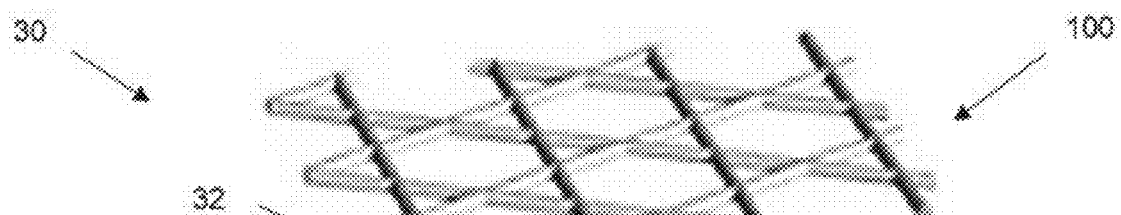
FIG. 31A is an exploded view of a lattice with a 3D Kagome shape.
Figure 31A:
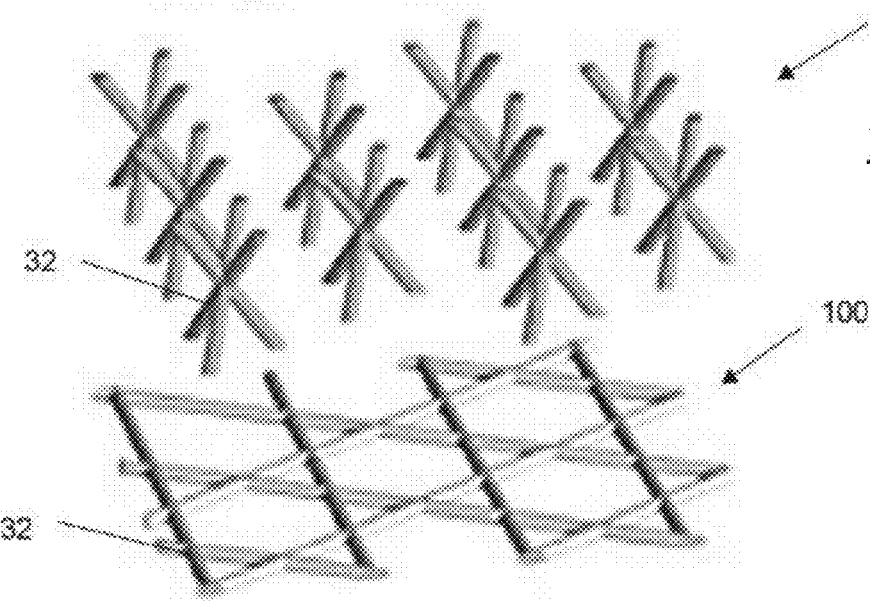

FIG. 31A shows an exploded view of a lattice 32 of an insert 30. The lattice 32 is a tetrahedral shape with a top planar portion 100 and a bottom planar portion 100 with a connecting portion 102 therebetween forming the three-dimensional 3-D Kagome shape of the insert 30.

Figure 31B:
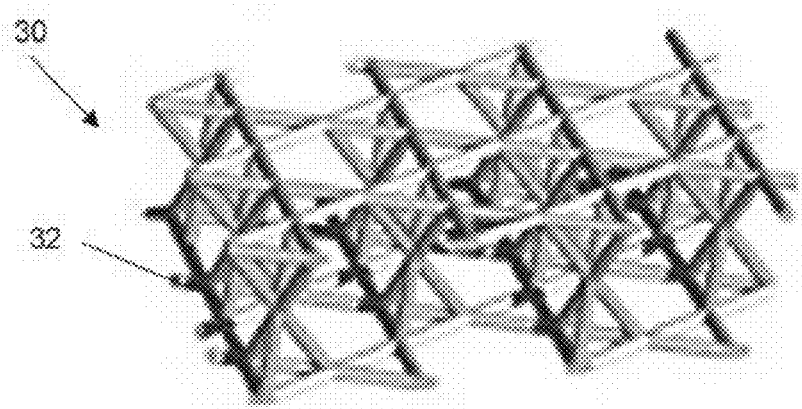
FIG. 31B is a three-dimensional view of a lattice with a 3D Kagome shape.

FIG. 31B illustrates the three-dimensional shape of the lattice 32 within the insert 30.

Figure 32A:
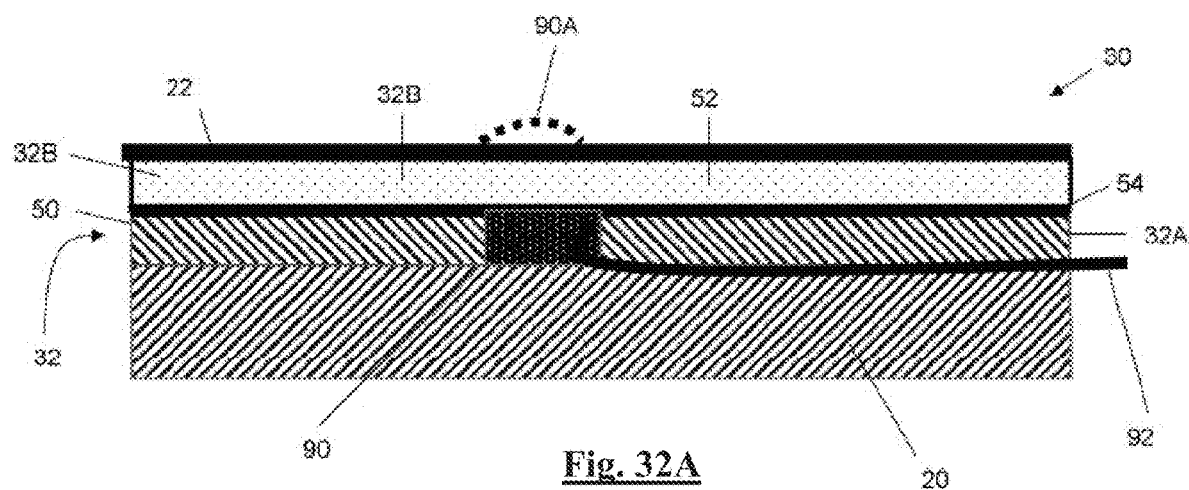
FIG. 32A illustrates a lattice structure incorporating barrier layers and ports for embedded structures.

FIG. 32A illustrates an insert 30 including a lattice 32 located above a cushion 20. The lattice 32 is located between a trim layer 22 and the cushion 20, although the cushion may also be made of a lattice. The lattice includes a support lattice 32A separated from a conditioned lattice 32B by a barrier 54. The support lattice 32A creates an air gap volume 50 that is free of conditioned air. The support lattice 32A also incorporates a port 92 that extends into communication with the embedded structure 90. The embedded structure 90 as shown also has an activated embedded structure 90A.

Figure 32B:
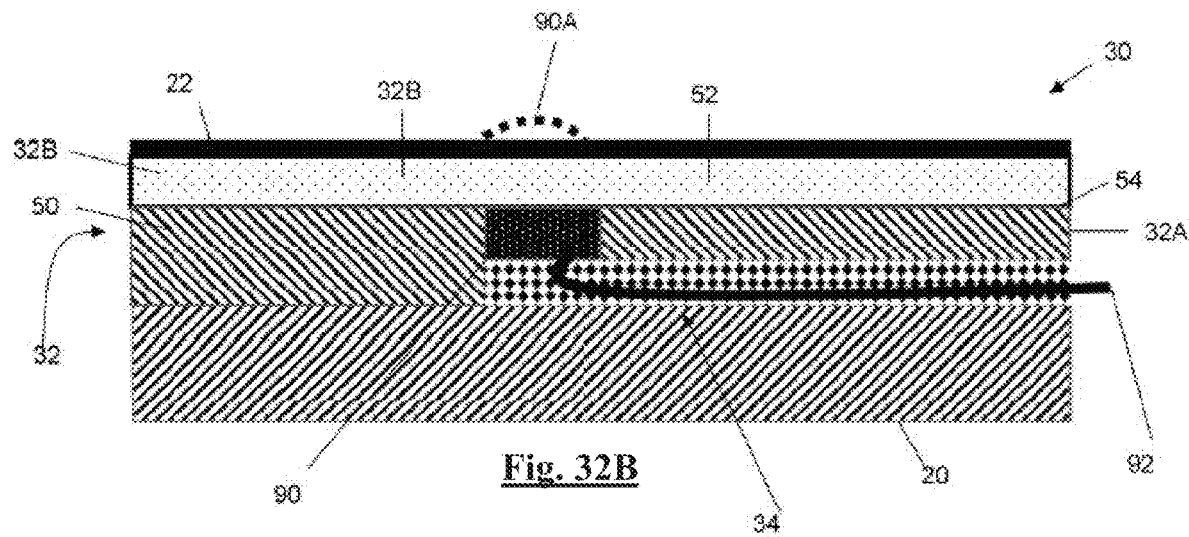
FIG. 32B illustrates a lattice structure incorporating ports for embedded structures.

FIG. 32B illustrates an insert 30 including a lattice 32 located above a cushion 20. The lattice 32 is located between a trim layer 22 and the cushion 20, although the cushion may also be made of a lattice. The lattice includes a support lattice 32A and a conditioned lattice 32B. The support lattice 32A creates an air gap volume 50 that is substantially free of conditioned air. The pocket 34 is located below the support lattice 32A and the pocket 34 includes a port 92 that extends into communication with the embedded structure 90. The embedded structure 90 as shown also has an activated embedded structure 90A.

Figure 33A:
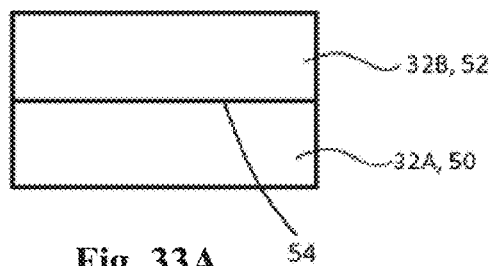
FIGS. 33A-33J illustrate representative views of support lattice (e.g., insulating layer) and conditioned lattice (e.g., a/c layer) in conjunction with barrier layers.
Figure 33F:
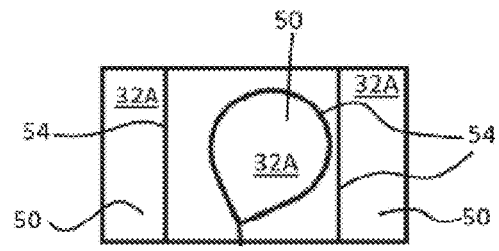
Figure 33B:
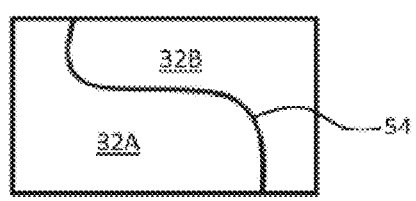
Figure 33G:
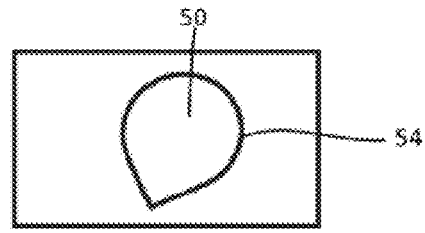
Figure 33C:
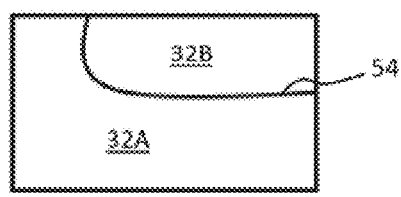
Figure 33H:
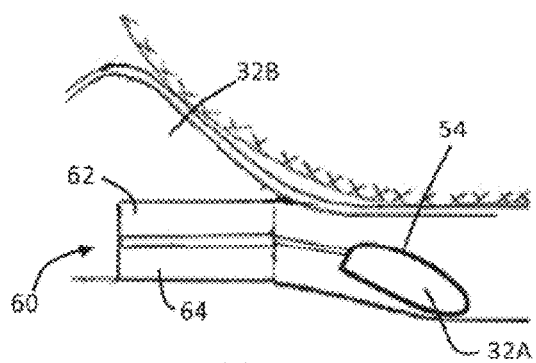
Figure 33D:
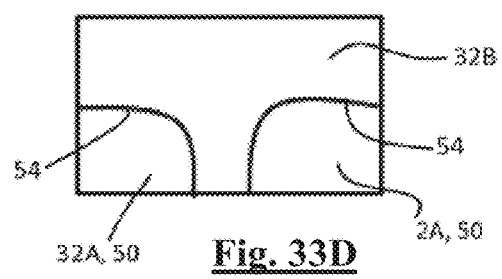
Figure 33I:
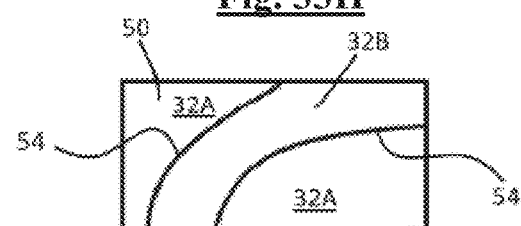
Figure 33E:
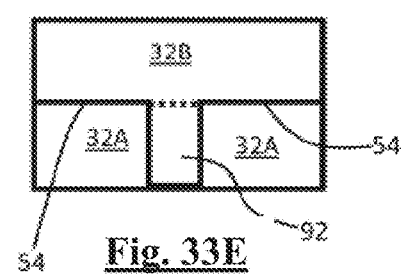
Figure 33J:
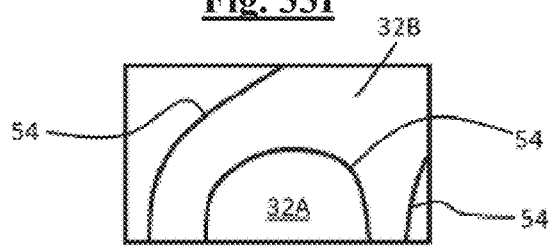

FIGS. 33A-33J illustrate various configurations of the barrier layers 54, conditioned lattice (a/c layer) 32B, air gap volume 50, support lattice (insulating layer) 32A. FIG. 33E also includes a conduit or port 92.

An insert may comprise a lattice structure comprising: one or more layers of a support lattice; and one or more layers of a conditioned lattice comprising a permeability that is greater than or equal to a permeability of the one or more layers of the support lattice. the lattice structure is one monolithic structure. A barrier layer may be located between the one or more layers of the support lattice and the one or more layers of the conditioned lattice. The barrier layer may be configured to prevent air from moving between the one or more layers of the conditioned lattice and the one or more layers of the support lattice. the insert comprises a thermo-electric device having a first side and a second side. The air may be moved across the first side to condition the air and then moves towards an occupant in a vehicle seat. The air that is moved across the second side may move away from the occupant in the vehicle seat. An air gap may be provided between two layers of the conditioned lattice. The air that is moved across the first side may be heated. The air that is moved across the first side may be cooled. The air that is moved across the first side may flow towards a trim layer to create a conditioned trim surface. The insert may be provided adjacent a vehicle cushion. The air exiting the first side flows along a first flow path and the air exiting the second side flows along a second flow path, wherein the first path and the second path are separated by an air gap. The first flow path may flow adjacent a trim layer to condition the tri layer. The first flow path and the second flow path may diverge into a single flow path. The air may flow in a direction towards a trim layer provided adjacent to the insert and then flows in a direction away from the trim layer.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. An air distribution system comprising:
   a plenum comprising:
   i. a bottom wall;
   ii. a peripheral wall connected to the bottom wall and extending around a periphery of the plenum to define one or more open spaces in the plenum; and
   iii. one or more connection recesses in the bottom wall adapted to connect to a blower;

wherein a top surface of the peripheral wall is configured to contact a bottom surface of a cushion of a vehicle seat to enclose the one or more open spaces,
wherein the plenum includes one or more baffles, and
wherein the one or more baffles include a top surface that contacts the bottom surface of the cushion.

2. The air distribution system of claim 1, wherein at least one of the one or more baffles include a taper that reduces a height of the one or more baffles relative to the bottom wall.

3. The air distribution system of claim 2, wherein the taper extends in a direction towards the one or more connection recesses.

4. The air distribution system of claim 2, wherein the taper reduces in height until the at least one of the one or more baffles terminates.

5. The air distribution system of claim 1, wherein at least one of the one or more baffles include a curved or bent portion that curves or bends in a direction of the one or more connection recesses.

6. The air distribution system of claim 1, wherein the plenum includes a body and one or more extensions.

7. The air distribution system of claim 6, wherein the body and the one or more extensions are connected together.

8. The air distribution system of claim 6, wherein the body and the one or more extensions are separate pieces.

9. The air distribution system of claim 6, wherein the one or more extensions extend into a bolster of the cushion, in a region of the cushion proximate to a leg contact region of an occupant, or both.

10. The air distribution system of claim 6, wherein the one or more extensions are movable relative to the body.

11. The air distribution system of claim 1, wherein the one or more connection recesses and the bottom wall are coplanar.

12. The air distribution system of claim 1, wherein the bottom wall includes a concave wall including the one or more connection recesses so that at least a portion of the blower is located in a plane that is closer to the cushion than the bottom wall is located to the cushion when the plenum is connected to the cushion.

13. The air distribution system of claim 12, wherein the blower includes a blower housing that is connected to the bottom wall of the plenum.

14. The air distribution system of claim 1, wherein the one or more baffles radiate outwards away from the blower.

* * * * *